United States Patent
Van Lengerich et al.

(10) Patent No.: US 10,159,268 B2
(45) Date of Patent: Dec. 25, 2018

(54) REDUCED SODIUM FOOD PRODUCTS

(71) Applicant: GENERAL MILLS, INC., Minneapolis, MN (US)

(72) Inventors: Bernhard H. Van Lengerich, Plymouth, MN (US); Olaf Gruess, Maple Grove, MN (US); Joachim Hans, Holzminden (DE); Lars Ole Haustedt, Potsdam (DE); Andreas Hochheimer, Regensburg (DE); Micheal Krohn, Lorsch (DE); Jens-Peter Muller, Berlin (DE); Christine M. Nowakowski, Plymouth, MN (US); Suzanne Denise Pecore, Pasenda, CA (US); Candace Michelle Rathjen-Nowak, St. Michael, MN (US); Lia Scarabottolo, Peschiera Borromeo (IT); Karsten Siems, Michendorf (DE)

(73) Assignee: GENERAL MILLS, INC., Minneapolis, MN (US)

(*) Notice: Subject to any disclaimer, the term of this patent is extended or adjusted under 35 U.S.C. 154(b) by 659 days.

(21) Appl. No.: 14/820,891

(22) Filed: Aug. 7, 2015

(65) Prior Publication Data
US 2015/0342233 A1   Dec. 3, 2015

Related U.S. Application Data

(63) Continuation of application No. PCT/US2014/015230, filed on Feb. 7, 2014, and a
(Continued)

(51) Int. Cl.
A23L 7/117 (2016.01)
A23L 1/237 (2006.01)
(Continued)

(52) U.S. Cl.
CPC ............ *A23L 1/2375* (2013.01); *A23L 7/117* (2016.08); *A23L 23/00* (2016.08); *A23L 27/40* (2016.08); *A23L 27/45* (2016.08); *A23V 2002/00* (2013.01)

(58) Field of Classification Search
None
See application file for complete search history.

(56) References Cited

U.S. PATENT DOCUMENTS

| 4,160,862 A | 7/1979 | Zenitz |
| 4,843,080 A | 6/1989 | Szantay et al. |

(Continued)

FOREIGN PATENT DOCUMENTS

| AU | 2008-221548 A1 | 4/2010 |
| CA | 2544227 A1 | 10/2007 |

(Continued)

OTHER PUBLICATIONS

Van Lengerich: Reduced sodium food products; WO2014124214A1; PCT/US2014/015230.*

(Continued)

*Primary Examiner* — Patricia A George
(74) *Attorney, Agent, or Firm* — Mueting, Raasch & Gebhardt, P.A.

(57) ABSTRACT

Naturally-derived compounds having various structures elicit the perception of salty taste, enhance the perception of salty taste of a salt, or act at one or more sodium channels. Food products may include such naturally-derived compounds, which may be used to reduce the sodium content, while imparting a similar level of saltiness.

5 Claims, 2 Drawing Sheets

| Compound | Conc. | 12 | 13 | 83 | 10 | 37 | 36 | 45 | 18 | 56 | 82 | 3 | 84 | 41 | 48 | 53 | 44 | 62 | 43 |
|---|---|---|---|---|---|---|---|---|---|---|---|---|---|---|---|---|---|---|---|
| 12 | 1 ppm | X | X | X | X | X | X | X | X | X | X | X | X | X | X | X | X | X | X |
| 13 | 10 ppm | 3.4 | X | X | X | X | X | X | X | X | X | X | X | X | X | X | X | X | X |
| 83 | 1 ppm | 3.2; 4.2 | 3.7; 4.5 | X | X | X | X | X | X | X | X | X | X | X | X | X | X | X | X |
| 10 | 1 ppm | 3.9 | 3.1 | 3.9 | X | X | X | X | X | X | X | X | X | X | X | X | X | X | X |
| 37 | 10 ppm | 3.0; 4.4 | 3.5 | 4.1 | 4.1 | X | X | X | X | X | X | X | X | X | X | X | X | X | X |
| 36 | 0.1 ppm | 3.9 | 3.8 | 3.5 | 3.3; 3.4 | 3.1 | X | X | X | X | X | X | X | X | X | X | X | X | X |
| 45 | 10 ppm | 3.6; 3.9 | 3.4; 4.1 | 2.4; 3.4 | 3.4 | 3.3 | 4 | X | X | X | X | X | X | X | X | X | X | X | X |
| 18 | 10 ppm | 2.6; 4.0 | 3.1 | 3.2; 3.9 | 3.3 | 3.8 | 3.4 | 2.7; 3.3 | X | X | X | X | X | X | X | X | X | X | X |
| 56 | 10 ppm | 2.6 | 3.4 | 3.8 | 4.1 | 3.4; 4.4 | 3.1; 3.7 | 3.1 | 3.4 | X | X | X | X | X | X | X | X | X | X |
| 82 | 1 ppm |  |  |  | 3.2 |  |  |  |  |  | 3.4 | X | X | X | X | X | X | X | X |
| 3 | 0.1 ppm |  |  |  |  |  | 3.5 |  |  |  |  | X | X | X | X | X | X | X | X |
| 84 | 1 ppm |  | 3.8 |  | 3.2 |  |  | 3.5 |  | 3.4 |  | X | X | X | X | X | X | X | X |
| 41 | 10 ppm |  |  |  | 3.3 |  |  |  | 3 | 3.1 |  |  | X | X | X | X | X | X | X |
| 48 | 10 ppm |  |  |  |  | 3.4 | 3.3 |  |  |  | 3.3 |  |  | X | X | X | X | X | X |
| 53 | 1 ppm |  | 3.0 |  |  |  |  | 2.9 |  | 3.0 |  |  |  |  | X | X | X | X | X |
| 44 | 10 ppm | 3.2 |  |  |  | 3.3 | 3.1 |  |  |  |  |  |  | 3 | 2.8 | X | X | X | X |
| 62 | 10 ppm |  |  | 3.0 | 3.1 |  |  |  | 3.0 | 2.9 |  |  | 2.9 |  |  |  | X | X | X |
| 43 | 10 ppm | 3.1 |  |  |  | 3.2 |  |  |  |  |  | 3.1 | 3.1 |  | 3.1 |  |  |  | X |

Related U.S. Application Data continuation of application No. PCT/US2014/015207, filed on Feb. 7, 2014, and a continuation of application No. PCT/US2014/015211, filed on Feb. 7, 2014, and a continuation of application No. PCT/US2014/015216, filed on Feb. 7, 2014, and a continuation of application No. PCT/US2014/015220, filed on Feb. 7, 2014, and a continuation of application No. PCT/US2014/015227, filed on Feb. 7, 2014, and a continuation of application No. PCT/US2014/015234, filed on Feb. 7, 2014, and a continuation of application No. PCT/US2014/015239, filed on Feb. 7, 2014, and a continuation of application No. PCT/US2014/015240, filed on Feb. 7, 2014, and a continuation of application No. PCT/US2014/015244, filed on Feb. 7, 2014, and a continuation of application No. PCT/US2014/015192, filed on Feb. 7, 2014, and a continuation of application No. PCT/US2014/015200, filed on Feb. 7, 2014.

(60) Provisional application No. 61/762,781, filed on Feb. 8, 2013, provisional application No. 61/762,792, filed on Feb. 8, 2013, provisional application No. 61/762,798, filed on Feb. 8, 2013, provisional application No. 61/762,804, filed on Feb. 8, 2013, provisional application No. 61/763,244, filed on Feb. 11, 2013, provisional application No. 61/763,274, filed on Feb. 11, 2013, provisional application No. 61/763,300, filed on Feb. 11, 2013.

(51) Int. Cl.
*A23L 27/40* (2016.01)
*A23L 23/00* (2016.01)

(56) References Cited

U.S. PATENT DOCUMENTS

| | | | |
|---|---|---|---|
| 5,232,684 A | 8/1993 | Blumberg et al. |
| 5,494,919 A | 2/1996 | Morriello et al. |
| 5,620,989 A | 4/1997 | Harrison et al. |
| 5,648,365 A | 7/1997 | Sunkara et al. |
| 5,719,148 A | 2/1998 | Bishop et al. |
| 5,807,852 A | 9/1998 | Doll et al. |
| 5,854,268 A | 12/1998 | Baker et al. |
| 5,874,479 A | 2/1999 | Martin |
| 5,919,614 A | 7/1999 | Livesey et al. |
| 5,948,460 A | 9/1999 | Kang et al. |
| 5,998,440 A | 12/1999 | Castro et al. |
| 6,025,374 A | 2/2000 | Castro et al. |
| 6,110,939 A | 8/2000 | Janssens et al. |
| 6,159,529 A | 12/2000 | Uchida et al. |
| 6,221,669 B1 | 4/2001 | Livesey et al. |
| 6,303,620 B1 | 10/2001 | Hansen et al. |
| 6,309,663 B1 | 10/2001 | Patel et al. |
| 6,328,771 B1 | 12/2001 | Moreton |
| 6,348,200 B1 | 2/2002 | Nakajima et al. |
| 6,500,479 B2 | 12/2002 | Bhaggan et al. |
| 6,521,621 B1 | 2/2003 | Janssens et al. |
| 6,691,780 B2 | 2/2004 | Nguyen et al. |
| 6,821,998 B2 | 11/2004 | McMaster et al. |
| 6,929,809 B2 | 8/2005 | Ghosh et al. |
| 7,001,621 B2 | 2/2006 | Beindorff et al. |
| 7,410,970 B2 | 8/2008 | Janssens et al. |
| 7,541,369 B2 | 6/2009 | Angibaud et al. |
| 7,572,913 B2 | 8/2009 | McKerracher et al. |
| 7,846,422 B2 | 12/2010 | Oshino et al. |
| 7,994,204 B2 | 8/2011 | Ono et al. |
| 8,022,225 B2 | 9/2011 | Ono et al. |
| 8,058,243 B2 | 11/2011 | Diamandis et al. |
| 8,101,208 B2 | 1/2012 | Lakkis et al. |
| 8,143,259 B2 | 3/2012 | Colburn et al. |
| 8,226,965 B2 | 7/2012 | Baker et al. |
| 8,309,538 B2 | 11/2012 | Reilly |
| 8,389,031 B2 | 3/2013 | Boghani et al. |
| 8,394,833 B2 | 3/2013 | Mann et al. |
| 8,399,493 B2 | 3/2013 | Imogai et al. |
| 8,420,152 B2 | 4/2013 | Kim et al. |
| 8,455,033 B2 | 6/2013 | Boghani et al. |
| 8,460,657 B2 | 6/2013 | Nykjaer et al. |
| 8,715,982 B2 | 5/2014 | Ying et al. |
| 9,247,758 B2 | 2/2016 | Tsuchiya et al. |
| 2001/0039286 A1 | 11/2001 | Dinnell et al. |
| 2004/0202735 A1 | 10/2004 | Moore et al. |
| 2005/0025844 A1 | 2/2005 | Boldt |
| 2005/0031717 A1 | 2/2005 | DeSimone et al. |
| 2005/0042341 A1 | 2/2005 | Thomas et al. |
| 2005/0176775 A1 | 8/2005 | Devadas et al. |
| 2005/0261201 A1 | 11/2005 | Polvino et al. |
| 2005/0272772 A1 | 12/2005 | Burbaum |
| 2006/0034872 A1 | 2/2006 | Woolf |
| 2006/0128721 A1 | 6/2006 | Janssens et al. |
| 2006/0135443 A1 | 6/2006 | Khodadoust et al. |
| 2006/0159818 A1 | 7/2006 | Kunieda |
| 2006/0188549 A1 | 8/2006 | Block et al. |
| 2006/0188613 A1 | 8/2006 | Lorenzi et al. |
| 2006/0204601 A1 | 9/2006 | Palu et al. |
| 2007/0059351 A1 | 3/2007 | Murrell et al. |
| 2007/0093552 A1 | 4/2007 | Matsuyama et al. |
| 2007/0104809 A1 | 5/2007 | Coyne et al. |
| 2007/0105789 A1 | 5/2007 | Khodadoust et al. |
| 2007/0184137 A1 | 8/2007 | Palu et al. |
| 2007/0218146 A1 | 9/2007 | Palu et al. |
| 2007/0248621 A1 | 10/2007 | Lowther et al. |
| 2007/0253928 A1 | 11/2007 | Roy et al. |
| 2007/0253930 A1 | 11/2007 | Roy et al. |
| 2007/0287991 A1 | 12/2007 | McKay et al. |
| 2008/0026128 A1 | 1/2008 | Yamaguchi et al. |
| 2008/0070924 A1 | 3/2008 | Janssens et al. |
| 2008/0096859 A1 | 4/2008 | Sullivan et al. |
| 2008/0103202 A1 | 5/2008 | Ferguson et al. |
| 2008/0124753 A1 | 5/2008 | Lee et al. |
| 2008/0153780 A1 | 6/2008 | Meyer |
| 2008/0207640 A1 | 8/2008 | Polvino |
| 2008/0241117 A1 | 10/2008 | Gaffar et al. |
| 2008/0267891 A1 | 10/2008 | Zaidel et al. |
| 2008/0268001 A1 | 10/2008 | Zaidel et al. |
| 2008/0268092 A1 | 10/2008 | Dacanay |
| 2008/0317923 A1 | 12/2008 | Ley et al. |
| 2009/0155180 A1 | 6/2009 | Jump et al. |
| 2009/0192231 A1 | 7/2009 | Lemons |
| 2009/0253782 A1 | 10/2009 | Ratan |
| 2009/0312255 A1 | 12/2009 | Dosch et al. |
| 2009/0317536 A1 | 12/2009 | Cambeen et al. |
| 2010/0034944 A1 | 2/2010 | Beyazova et al. |
| 2010/0047181 A1 | 2/2010 | Meyer |
| 2010/0047398 A1 | 2/2010 | Vasquez et al. |
| 2010/0311678 A1 | 2/2010 | Bean et al. |
| 2010/0068221 A1 | 3/2010 | Terdu et al. |
| 2010/0080867 A1 | 4/2010 | Bhowmik et al. |
| 2010/0099766 A1 | 4/2010 | Zhang et al. |
| 2010/0099772 A1 | 4/2010 | Bean et al. |
| 2010/0112186 A1 | 5/2010 | Tanizawa et al. |
| 2010/0173993 A1 | 7/2010 | Sawyer et al. |
| 2010/0179130 A1 | 7/2010 | Schneider et al. |
| 2010/0196536 A1 | 8/2010 | Palzer et al. |
| 2010/0209573 A1 | 8/2010 | Jo et al. |
| 2010/0249045 A1 | 9/2010 | Babul |
| 2010/0272878 A1 | 10/2010 | Dubbelman et al. |
| 2010/0278991 A1 | 11/2010 | Haught et al. |
| 2010/0292175 A1 | 11/2010 | Wessjohann et al. |
| 2010/0292755 A1 | 11/2010 | Jones et al. |
| 2011/0027451 A1 | 2/2011 | Shimono et al. |
| 2011/0028382 A1 | 2/2011 | Miller |
| 2011/0045069 A1 | 2/2011 | Ley et al. |
| 2011/0045138 A1 | 2/2011 | Bhowmik et al. |
| 2011/0052763 A1 | 3/2011 | Nir et al. |
| 2011/0086134 A1 | 4/2011 | Bhowmik et al. |
| 2011/0086818 A1 | 4/2011 | Bean |
| 2011/0104329 A1 | 5/2011 | Boghani et al. |
| 2011/0104361 A1 | 5/2011 | Miyazawa et al. |

(56) References Cited

U.S. PATENT DOCUMENTS

| | | |
|---|---|---|
| 2011/0189161 A1 | 8/2011 | Kenneth et al. |
| 2011/0206764 A1 | 8/2011 | Holmes et al. |
| 2011/0229563 A1 | 9/2011 | Cain et al. |
| 2011/0237674 A1 | 9/2011 | Zhang et al. |
| 2011/0280990 A1 | 11/2011 | Gebreselassie et al. |
| 2011/0311545 A1 | 12/2011 | Patwardhan et al. |
| 2012/0027693 A1 | 2/2012 | Bean et al. |
| 2012/0034368 A1 | 2/2012 | Okazaki et al. |
| 2012/0077745 A1 | 3/2012 | Polvino |
| 2012/0121737 A1 | 5/2012 | Vielhaber et al. |
| 2012/0172429 A1 | 7/2012 | Woolf et al. |
| 2012/0201945 A1 | 8/2012 | Iwahata et al. |
| 2012/0214809 A1 | 8/2012 | Thompson et al. |
| 2012/0263808 A1 | 10/2012 | Warnock |
| 2012/0315354 A1 | 12/2012 | Palzer et al. |
| 2013/0004601 A1 | 1/2013 | Vedel et al. |
| 2013/0039956 A1 | 2/2013 | Dietz |
| 2013/0045318 A1 | 2/2013 | Watanabe et al. |
| 2013/0095213 A1 | 4/2013 | Walters |
| 2013/0096209 A1 | 4/2013 | Shekdar et al. |
| 2013/0101667 A1 | 4/2013 | Thompson et al. |
| 2013/0115320 A1 | 5/2013 | Perry et al. |
| 2013/0115321 A1 | 5/2013 | Perry et al. |
| 2013/0302497 A1 | 11/2013 | Bhowmik et al. |
| 2014/0004243 A1 | 1/2014 | Tahara et al. |
| 2014/0234526 A1 | 8/2014 | Yasumatsu et al. |
| 2014/0377381 A1 | 12/2014 | Brennan et al. |
| 2015/0342233 A1 | 12/2015 | Van Lengerich et al. |

FOREIGN PATENT DOCUMENTS

| | | |
|---|---|---|
| CN | 1347664 A | 5/2002 |
| CN | 1435123 A | 8/2003 |
| CN | 1736485 A | 2/2006 |
| CN | 1820646 A | 8/2006 |
| CN | 1857343 A | 11/2006 |
| CN | 1857580 A | 11/2006 |
| CN | 1857586 A | 11/2006 |
| CN | 101095800 A | 1/2008 |
| CN | 101214278 A | 7/2008 |
| CN | 101254226 A | 9/2008 |
| CN | 101318985 A | 12/2008 |
| CN | 101696377 A | 4/2010 |
| CN | 101862312 A | 10/2010 |
| CN | 101949904 A | 1/2011 |
| CN | 101974399 A | 2/2011 |
| CN | 101999627 A | 4/2011 |
| CN | 102021106 A | 4/2011 |
| CN | 102058082 A | 5/2011 |
| CN | 102210441 A | 10/2011 |
| CN | 102326768 A | 1/2012 |
| CN | 102396758 A | 4/2012 |
| CN | 102423352 A | 4/2012 |
| CN | 102907615 A | 2/2013 |
| CN | 102934746 A | 2/2013 |
| CN | 102948645 A | 3/2013 |
| CN | 102972552 A | 3/2013 |
| CN | 102972558 A | 3/2013 |
| CN | 102987068 A | 3/2013 |
| CN | 102987123 A | 3/2013 |
| CN | 102987128 A | 3/2013 |
| CN | 103141575 A | 6/2013 |
| DE | 39 24 607 A1 | 1/1991 |
| DE | 4217842 A1 | 12/1993 |
| DE | 2000-8343 U1 | 9/2000 |
| DE | 69730081 T2 | 7/2005 |
| DE | 102004038396 A1 | 3/2006 |
| EP | 1 933 642 B1 | 12/2011 |
| EP | 2578210 A1 | 4/2013 |
| EP | 2615930 A2 | 7/2013 |
| IN | 1715/DEL/2004 A | 7/2006 |
| JP | 03161470 A | 7/1991 |
| JP | 03014575 B2 | 2/2000 |
| JP | 2000-171423 A | 6/2000 |
| JP | 2002-125616 A | 5/2002 |
| JP | 2002-345430 A | 12/2002 |
| JP | 2002-370922 A | 12/2002 |
| JP | 03394737 B2 | 4/2003 |
| JP | 3575705 B2 | 10/2004 |
| JP | 2005-013138 A | 1/2005 |
| JP | 2005-015684 A | 1/2005 |
| JP | 2005-075785 A | 3/2005 |
| JP | 2005-298449 A | 10/2005 |
| JP | 2006-124322 A | 5/2006 |
| JP | 2006-180875 A | 7/2006 |
| JP | 2006-238814 A | 9/2006 |
| JP | 2006-246857 A | 9/2006 |
| JP | 2007-232574 A | 9/2007 |
| JP | 2008-532514 A | 8/2008 |
| JP | 04277294 B2 | 6/2009 |
| JP | 04278896 B2 | 6/2009 |
| JP | 2010-094081 A | 4/2010 |
| JP | 2010-099025 A | 5/2010 |
| JP | 2010-110283 A | 5/2010 |
| JP | 04508932 B2 | 7/2010 |
| JP | 04611203 B2 | 1/2011 |
| JP | 2011-030562 A | 2/2011 |
| JP | 2011-130669 A | 7/2011 |
| JP | 2011-254772 A | 12/2011 |
| JP | 04845067 B2 | 12/2011 |
| JP | 2012-025719 A | 2/2012 |
| JP | 03179252 U | 10/2012 |
| JP | 2012-239398 A | 12/2012 |
| JP | 2013-018764 A | 1/2013 |
| JP | 2013-129637 A | 7/2013 |
| KR | 10-473434 B1 | 7/2005 |
| KR | 2005-122373 A | 12/2005 |
| KR | 10-891935 B1 | 4/2009 |
| KR | 10-987630 B1 | 10/2010 |
| KR | 2010-109206 A | 10/2010 |
| KR | 2010-109207 A | 10/2010 |
| KR | 2011-011968 A | 2/2011 |
| KR | 2012-006350 A | 1/2012 |
| KR | 101140156 B1 | 5/2012 |
| KR | 101160703 B1 | 6/2012 |
| KR | 2012-090359 A | 8/2012 |
| KR | 2013-003452 A | 1/2013 |
| KR | 1253041 B1 | 4/2013 |
| KR | 1268782 B1 | 5/2013 |
| KR | 2013-076905 A | 7/2013 |
| MX | 2008-010606 A | 2/2010 |
| TW | 201315392 A | 4/2013 |
| WO | WO 9901579 A1 | 1/1999 |
| WO | WO 9960012 A1 | 11/1999 |
| WO | WO 9960167 A1 | 11/1999 |
| WO | WO 2000-053545 A1 | 9/2000 |
| WO | WO 2003-008632 A1 | 1/2003 |
| WO | WO 2004-082800 A1 | 9/2004 |
| WO | WO 2006-107832 A2 | 10/2006 |
| WO | WO 2007-018508 A1 | 2/2007 |
| WO | WO 2007-018514 A1 | 2/2007 |
| WO | WO 2008-021394 A2 | 2/2008 |
| WO | WO 2008-024490 A2 | 2/2008 |
| WO | WO 2008-027442 A2 | 3/2008 |
| WO | WO 2008-033351 A2 | 3/2008 |
| WO | WO 2008-068155 A1 | 6/2008 |
| WO | WO 2008-100977 A2 | 8/2008 |
| WO | WO 2008-121519 A1 | 10/2008 |
| WO | WO 2008-139152 A1 | 11/2008 |
| WO | WO 2009-047654 A1 | 4/2009 |
| WO | WO 2009-071094 A2 | 6/2009 |
| WO | WO 2009-071095 A2 | 6/2009 |
| WO | WO 2009-071096 A2 | 6/2009 |
| WO | WO 2009/080768 A2 | 7/2009 |
| WO | WO 2009-124551 A2 | 10/2009 |
| WO | WO 2009-124552 A2 | 10/2009 |
| WO | WO 2010-015260 A1 | 2/2010 |
| WO | WO 2010-036878 A1 | 4/2010 |
| WO | WO 2010-078392 A2 | 7/2010 |
| WO | WO 2010-092467 A1 | 8/2010 |
| WO | WO 2010-124905 A1 | 11/2010 |
| WO | WO 2011-112956 A1 | 9/2011 |
| WO | WO 2011-130705 A1 | 10/2011 |
| WO | WO 2012-060845 A1 | 5/2012 |

(56) References Cited

FOREIGN PATENT DOCUMENTS

| | | |
|---|---|---|
| WO | WO 2012-050884 A3 | 7/2012 |
| WO | WO 2012-098281 A2 | 7/2012 |
| WO | WO 2012-102511 A2 | 8/2012 |
| WO | WO 2012/121273 A1 | 9/2012 |
| WO | WO 2013-009827 A1 | 1/2013 |
| WO | WO 2013-031571 A1 | 3/2013 |
| WO | WO 2013-036403 A1 | 3/2013 |
| WO | WO 2013-052844 A1 | 4/2013 |
| WO | WO 2013-076509 A1 | 5/2013 |
| WO | WO 2013-060814 A3 | 6/2013 |
| WO | WO 2013-085014 A1 | 6/2013 |
| WO | WO 2013-092296 A1 | 6/2013 |
| WO | WO 2013-103031 A1 | 7/2013 |

OTHER PUBLICATIONS

"Oct. 31, 2007, capsaicin." *Chemical Entities of Biological Interest (ChEBI)*. [retrieved on Jun. 9, 2016]. Retrieved from the Internet:<URL: http://www.ebi.ac.uk/chebi/entityMonthForward.do#entity.month.date.38>; 1 pg.

Abdel-Aziz et al. "Mode of action of gingerols and shogaols on 5-HT3 receptors: Binding studies, cation uptake by the receptor channel and contraction of isolated guinea-pig ileum." 2006. *European Journal of Pharmacology*, 530(1-2):136-43.

Anastasopoulos et al. "Erratum to: Quality Characteristics and Antioxidants of Mavrolia cv. Virgin Olive Oil [Erratum to document cited in CA157:75166]." 2012. *Journal of the American Oil Chemists' Society*, 89(4):747.

Anastasopoulos et al. "Quality Characteristics and Antioxidants of Mavrolia cv. Virgin Olive Oil [Erratum to document cited in CA157:75166]." 2012. *Journal of the American Oil Chemists' Society*, 89(2):253-59.

Andrea et al. "Analysis of Some Italian Lemon Liquors (Limoncello)." 2003. *Journal of Agricultural and Food Chemistry*, 51(17):4978-83.

Arts, et al. "Oxidative Degradation of Lipids during Mashing." 2007. *Journal of Agricultural and Food Chemistry*, 55(17):7010-14.

Azad Shah et al. "Changes in lipids and their contribution to the taste of migaki-nishin (dried herring filet) during drying." 2009. *Food Chemistry*. 115(3):1011-18.

Babovic et al. "Supercritical carbon dioxide extraction of antioxidant fractions from selected Lamiaceae herbs and their antioxidant capacity." 2010. *Innovative Food Science & Emerging Technologies*, 11(1):98-107.

Barbosa de Almeida et al. "Characterization of LOX1 and LOX2 from germinating barley: isoelectric focusing, substrate—, region—, and enantiospecificity." 2005. 82/1-82/10.

Bartley et al. "Effects of drying on flavor compounds in Australian-grown ginger (Zingiber officinale)." 2000. *Journal of the Science of Food and Agriculture*, 80(2):209-215.

Bartley et al. "Supercritical fluid extraction of Australian-grown ginger (*Zingiber officinale*)." 1994. *Journal of the Science and Food and Agriculture*, 66(3):365-71.

Batenburg et al. "Salt Enhancement by Aroma Compounds," in *Expression of Multidisciplinary Flavour Science*. Blank (Eds.) Zhaw University: Zurich, Switzerland; 2010. Cover page, table of contents, and pp. 51-54.

Baublits et al. "Comparison of fatty acid and sensory profiles of beef from forage-fed cattle retain united states department of agriculture choice and select beef." 2006. *Journal of Muscle Foods*, 17(3):311-29.

Bautista et al. "Pungent agents from Szechuan peppers excite sensory neurons by inhibiting two-pore potassium channels." Jul. 2008. 11(7):772-79.

Belsito, et al. "Comparison of the Volatile Constituents in Cold-Pressed Bergamot Oil and Volatile Oil Isolated by Vacuum Distillation." 2007. *Journal of Agricultural and Food Chemistry*, 55(19):7847-51.

Ben-Et et al. "Compounds contributing to heat-induced bitter off-flavor in avocado." 1973. *Journal of Food Science*, 38(3):546-47.

Beriain et al. "The effects of olive oil emulsified alginate on the physico-chemical, sensory, microbial, and fatty acid profiles of low-salt, inulin-enriched sausages." 2010. *Meat Science*. 88(1):189-197.

Berlin, et al. "Derivatives of zingerone. I." 1948. *Zhurnal Obshchei Khimii*, 18 : 1386-1394. English Abstract Only.

Bernays. "Relationship between deterrence and toxicity of plant secondary compounds for the grasshopper Schistocerca americana." 1991. *Journal of Chemical Ecology*, 17(12):2519-26.

Best. "Compensating for sodium: the low-salt solution." Feb. 1989. *Prepared Foods*, 158(22):97-98.

Biermann et al. "Occurrence of bitter hydroxy fatty acids in oat and wheat." 1980. *Fette, Seifen, Anstrichmittel*, 82(6):236-40. English Abstract Only.

Biondi et al. "Essential oil of some halophyle and subhalophyle taxa Artemisia L. from the Central European Mediterranean." May/Jun. 2000. *Journal of Essential Oil Research*, 12(3):365-71.

Bohuslavizki et al. "Blocking of potassium channels in Ranvier nodes by 4, 5, 6, 7-substituted benzofurans and its significance on demyelinating diseases." 1993. *General Physiology and Biophysics*, 12(3):293-301.

Boudaka et al. "Involvement of TRPV1-dependent and—independent components in the regulation of vagally induced contractions in the mouse esophagus." 2007. *European Journal of Pharmacology*, 556(1-3):157-65.

Bozac et al. "Effect of different crossbreeds on chemical and sensory profiling of Istrian dry-cured ham." 2011. *Acta Alimentaria*, 40(3):315-26.

Brieskorn et al. "18β-Glycyrrhetic acids and their sweet flavor." 1978. *Archiv der Pharmazie*, 311(12):1001-09. English Abstract Only.

Brieskorn et al. "Glycamines from ursolic and 18β-glycyrrhetinic acids." 1979. *Archiv der Pharmazie*, 312(9):752-62.

Brockhoff et al. "Broad Tuning of the Human Bitter Taste Receptor hTAS2R46 to Various Sesquiterpene Lactones, Clerodane and Labdane Diterpenoids, Strychnine, and Denatonium." 2007. *Journal of Agricultural and Food Chemistry*, 55(15):6236-43.

Brockhoff et al. "Structural requirements of bitter taste receptor activation." 2010. *Proceedings of the National Academy of Sciences of the United States of America*, 107(24):11110-15.

Brown. "Isolation of unpleasant flavor compounds in the avocado (Persea americana)." 1972. *Journal of Agricultural and Food Chemistry*, 20(4):753-57.

Bryant et al. "Alkylamides that produce tingling paresthesia activate tactile and thermal trigeminal neurons." Sep. 1999. 842(2):452-60.

Burns et al. "Probiotic Crescenza cheese containing *Lactobacillus casei* and *Lactobacillus acidophilus* manufactured with high-pressure homogenized milk." 2008. *Journal of Dairy Science*, 91(2):500-12.

Capasso et al. "Effect of piperine, the active ingredient of black pepper, on intestinal secretion in mice." 2002. *Life Sciences*, 71(19): 2311-17.

Castillo et al. "Enzymatic synthesis of capsaicin analogs and their effect on the T-type Ca2+ channels." 2007. *Biochemical and Biophysical Research Communications*, 356(2):424-30.

Chae et al. "The triacylglycerol preparation of conjugated linoleic acid reduces lipid oxidation in irradiated, cooked ground beef patties." 2009. *Meat Science*. 81(4):647-52.

Chapter 6. Juliana et al. "Chemistry, quality, and functional properties of grains of paradise (Aframomum melegueta), a rediscovered spice" in *ACS Symposium*. EBook. American Chemical Society: Washington, D.C.; 2008. 100-113.

Chapter 13. Degenhardt et al. "Authenticity control of oils and fats via large capacity sorptive extraction" in *ACS Symposium Series 1081 (Progress in Authentication of Food and Wine)*. EBook. American Chemical Society: Washington, D.C.; 2011. 189-200.

"Chemical Senses: Taste." *Geniuses*. 2016. [retrieved on Jun. 9, 2016]. Retrieved from the Internet: <URL:https://med1mcst.wikispaces.com/file/view/TASTE+PPT.pptx>; 34 pgs.

Chen. "Extraction of icariin from Shengjing soup by response surface methodology." 2009. *Shizhen Guoyi Guoyao*, 20 (11) : 2821-22. English Abstract Only.

(56) References Cited

OTHER PUBLICATIONS

Chen et al. "Supercritical fluid extraction of Rhizoma Zingiberis and its application in cigarette." 2010. *Xiangliao Xiangjing Huazhuangpin*, (4):6-10. English Abstract Only.

Chen et al. "Synthesis and vasodilator effects of rutaecarpine analogues which might be involved transient receptor potential vanilloid subfamily, member 1 (TRPV1)." 2009. *Bioorganic & Medicinal Chemistry.* 17(6):2351-59.

Chogo et al. "Essential oil and leaf constituents of Lippia ukambensis from Tanzania." 1982. *Journal of Natural Products*, 45(2):186-88.

Chubanov et al. "Natural and synthetic modulators of SK (KCa2) potassium channels inhibit magnesium-dependent activity of the kinase-coupled cation channel TRPM7." 2012. *British Journal of Pharmacology.* 166(4):1357-76.

Chung et al. "Cold suppresses agonist-induced activation of TRPV1." 2011. *Journal of Dental Research*, 90(9):1098-1102.

Chung et al. "TRPV1 shows dynamic ionic selectivity during agonist stimulation." May 2008. *Nature Neuroscience*, 11(5):555-64.

Clariana et al. "Influence of high pressure application on the nutritional, sensory and microbiological characteristics of sliced skin vacuum packed dry-cured ham. Effects along the storage period." 2011. *Innovative Food Science & Emerging Technologies.* 12(4):456-65.

Coppa et al. "Effect of different grazing systems on upland pastures compared with hay diet on cheese sensory properties evaluated at different ripening times." 2011. *International Dairy Journal*, 21(10):815-822.

Corbo et al. "Microbiological and biochemical properties of Canestrato Pugliese hard cheese supplemented with bifidobacteria." 2001. *Journal of Dairy Science*, 84(3):551-61.

Correa et al. "In vitro TRPV1 activity of piperine derived amides." 2010. *Bioorganic & Medicinal Chemistry*, 18(9):3299-3306.

Cui et al. "Guggulsterone Is a Farnesoid X Receptor Antagonist in Coactivator Association Assays but Acts to Enhance Transcription of Bile Salt Export Pump." 2003. *Journal of Biological Chemistry*, 278(12):10214-20.

Dai et al. "Rutaecarpine inhibits hypoxia/reoxygenation-induced apoptosis in rat hippocampal neurons." 2008. *Neuropharmacology*, 55(8):1307-12.

Davison et al. "Food intake and blood cholesterol levels of community-based adults with mood disorders." 2012. *BMC Psychiatry.* (12):10.

Dawid et al. "Structural and Sensory Characterization of Key Pungent and Tingling Compounds from Black Pepper (*Piper nigrum* L.)." 2012. *Journal of Agricultural and Food Chemistry*, 60(11):2884-95.

De Cleyn et al. "Constituents of peppers. Part V. Qualitative and quantitative analysis of the pungent principles of pepper and pepper extracts." Jul. 1975. *Chromatographia*, 8(7):342-44.

Dedov et al. "Gingerols: a novel class of vanilloid receptor (VR1) agonists." 2002. *British Journal of Pharmacology*, 137(6):793-98.

De Pinto et al. "Oleander (Nerium oleander) poisoning in cattle." 1981. *Clinica Veterinaria*, 104(1):15-18. English Summary Only.

Degenhardt et al. "Bitter-tasting and kokumi-enhancing molecules in thermally processed avocado (Persea americana Mill.)." Dec. 2010. *Journal of Agricultural and Food Chemistry*, 58(24):12906-915.

Deng et al. "Stimulation of calcitonin gene-related peptide synthesis and release: mechanisms for a novel antihypertensive drug, rutaecarpine." 2004. *Journal of Hypertension*, 22(9):1819-29.

DePetrocellis et al. "A re-evaluation of 9-HODE activity at TRPV1 channels in comparison with anandamide: enantioselectivity and effects at other TRP channels and in sensory neurons." 2012. *British Journal of Pharmacology.* 167(8):1643-51.

Dermiki et al. "Contributions of non-volatile and volatile compounds to the umami taste and overall flavour of shiitake mushroom extracts and their application as flavour enhancers in cooked minced meat." Nov. 2013. 141(1):77-83.

Dermiki et al. "Maximising umami taste in meat using natural ingredients: Effects on chemistry, sensory perception and hedonic liking in young and old consumers." Oct. 2013. 93(13):3312-21.

Desmond et al. "Reducing salt: A challenge for the meat industry." Sep. 2006. *Meat Science*, 74(1):188-196.

Doucette et al. "Piperine, a dietary phytochemical, inhibits angiogenesis." 2013. *Journal of Nutritional Biochemistry* 24(1):231-39.

Dugo et al. "Characterization of lime essential oil by physicochemical indices, GC/FID, GC/MS, HPLC and multidimensional GC." 1998. *Recent Research Developments in Agricultural & Food Chemistry*, 2(Pt.2):751-780.

Düring et al. "Effects of Three Alkoxypsoralens on Voltage Gated Ion Channels in Ranvier Nodes." 2000. *General Physiology and Biophysics*, 19(4):345-64.

Endoh. "A Na + channel agonist: A potential cardiotonic agent with a novel mechanism?." Nov. 2004. *British Journal of Pharmacology*, 143(6):663-65.

Eldershaw et al. "Resiniferatoxin and piperine: capsaicin-like stimulators of oxygen uptake in the perfused rat hindlimb." 1994. *Life Science*, 55(5):389-97.

Elif Bilek et al. "Enhancement of the nutritional status of beef patties by adding flaxseed flour." 2009. *Meat Science*, 82(4):472-77.

Elshof et al. "Biocatalytic hydroxylation of linoleic acid in a double-fed batch system with lipoxygenase and cysteine." 1998. *Fett/Lipid*, 100(6):246-51.

Epifano et al. "Searching for novel cancer chemopreventive plants and their products: the genus *Zanthoxylum*." 2011. *Current Drug Targets*, 12(13):1895-1902.

Feng et al. "Chemical Constituents and Their Bioactivities of 'Tongling White Ginger' (Zingiber officinale)." 2011. *Journal of Agricultural and Food Chemistry*, 59(21):11690-95.

Figoli et al. "Bergamot essential oil extraction by pervaporation." 2006. *Desalination*, 193(1-3):160-65.

Filigenzi et al. "Evaluation of a rapid screening method for chemical contaminants of concern in four food-related matrices using QuEChERS extraction, UHPLC and high resolution mass spectrometry." Oct. 2011. *Food Additives & Contaminants, Part A: Chemistry, Analysis, Control, Exposure & Risk Assessment*, 28(10):1324-39.

Firmenich. "A natural salt and flavor enhancer for your sodium-reduced products." altPrint®. [retrieved on Jun. 9, 2016]. Retrieved from the Internet: <URL: http://www.innotaste.de/docs/Salt%20Print.pdf>; 2 pgs.

Fliri et al. "Drug Effects Viewed from a Signal Transduction Network Perspective." 2009. *Journal of Medicinal Chemistry.* 52(24):8038-46.

Fosgerau et al. "Drug-induced mild therapeutic hypothermia obtained by administration of a transient receptor potential vanilloid type 1 agonist." 2010. *BMC Cardiovascular Disorders.* 10(51):1-10.

Fosgerau et al. "Increased susceptibility to cardiovascular effects of dihydrocapcaicin in resuscitated rats." 2010. *BMC Cardiovascular Disorders.* 10(39):1-10.

Friedman, et al. "Analysis by HPLC and LC/MS of Pungent Piperamides in Commercial Black, White, Green, and Red Whole and Ground Peppercorns." 2008. *Journal of Agricultural and Food Chemistry*, 56(9):3028-36.

Frerejacque. "The activity of digitalis substances." 1952. *Compt. rend.*, 234:2639-41. English Abstract Only.

Fu et al. "Deoxyschisandrin modulates synchronized Ca2+ oscillations and spontaneous synaptic transmission of cultured hippocampal neurons." 2008. *Acta Pharmacologica Sinica.* 29(8):891-98.

Fushiki. "Strategic studies of diets for health based on dietary preference and energy expenditure." 2010. *Nippon Eiyo, Shokuryo Gakkaishi.* 63(2):61-68. English Abstract Only.

Garbe et al. "Oxygenated fatty acids and flavor stability—new insights." May 17-22, 2003. *Proceedings of the Congress—European Brewery Convention*, $29^{th}$, 69/1-69/9.

Garbe et al. "γ-Nonalactone enantiomers in beer: biosynthesis from 0—and 13-hydroxyoctadecadienoic acids in yeast." 2005. *Proceedings of the Congress—European Brewery Convention*, $30^{th}$, 138/1-138/6.

(56) References Cited

OTHER PUBLICATIONS

Garle et al. "Stimulation of dichlorofluorescin oxidation by capsaicin and analogs in RAW 264 monocyte/macrophages: lack of involvement of the vanilloid receptor." 2000. *Biochemical Pharmacology* 59(5):563-72.
Gao et al. "Impairment in function and expression of transient receptor potential vanilloid type 4 in Dahl salt-sensitive rats: Significance and mechanism." 2010. *Hypertension.* 55(4):1018-25.
Gao. "Biosynthesis and the applied research progress of capsaicin and capsiate." 2008. *Zhongguo Shipin Tianjiaji.* (4):112-16. English Abstract Only.
Gaskins, et al. "Adherence to a mediterranean diet and plasma concentrations of lipid peroxidation in premenopausal women." 2010. *American Journal of Clinical Nutrition*, 92(6): 1461-67.
Ge et al. "Synthesis and biological evaluation of nitric oxide-releasing derivatives of capsaicin as analgesia drugs." 2011. *Letters in Drug Design & Discovery*, 8(1):76-81.
Gerbi et al. "Specific modulation of two neuronal digitalis receptors by anesthesia." 1997. *Journal of Receptor and Signal Transduction Research*, 17(1-3):137-47.
Gevaert et al. "TRPV1 is involved in stretch-evoked contractile changes in rat autonomous bladder model: a study with piperine, a new TRPV1 agonist." 2007. *Nuerourology and Urodynamics*, 26(3):440-50.
Godoy et al. "Multiple effects of protein kinase C activators on Na+ currents in mouse neuroblastoma cells." 1994. *Journal of Membrane Biology*, 140(2):101-10.
Gopinath et al. "Quality control studies on Panchatiktaka Guggulu Kwatha Curanam." Jan. 2010. *Journal of Pharmacy Research*, 4(1):229-32.
Gordin. "Marrubiin." 1908. *Journal of the American Chemical Society*, 30:265-71.
Gowda et al. "Neem (*Azadirachta indica*) seed cake in animal feeding-scope and limitations." 2000. *Asian Australasian Journal of Animal Sciences*, 13(5):720-28.
Gray. "Plant extracts may act as low sodium salt replacer: Study." *Food Navigator.com.* Nov. 24, 2010. [retrieved on Jun. 9, 2016]. Retrieved from the Internet:<URL: ww.foodnavigator.com/Science-Nutrition/Plant-extracts-may-act-as-low-sodium-salt-replacer-Study>; 2 pgs.
Guler. "Changes in salted yoghurt during storage." 2007. *International Journal of Food Science and Technology*, 42(2):235-45.
Haefliger et al. "Rapid LC-UV-ESI-MS method to investigate the industrial preparation of polyunsaturated fatty acid hydroperoxides in real-time." Apr. 2007. *Chromatographia*, 65(7/8):435-42.
Harada et al. "Effect of topical application of capsaicin and its related compounds on dermal insulin-like growth factor-I levels in mice and on facial skin elasticity in humans." 2007. *Growth Hormone & IGF Research*, 17(2):171-76.
Haramizu et al. "Capsiate, a nonpungent capsaicin analog, increases endurance swimming capacity of mice by stimulation of vanilloid receptors." 2006. *Bioscience, Biotechnology, and Biochemistry*, 70(4):774-81.
Harris et al. "Omega-3 fatty acids in cardiac biopsies from heart transplantation patients." Sep. 21, 2004. *Circulation*, 110(12): 1645-49.
Haseleu et al. "Quantitative studies and taste reconstitution experiments of the sour and lingering mouthful orosensation in a debittered extract of traditional Japanese dried and fermented skipjack tuna (*Hongarebushi*)." Apr. 2013. 61(13):3205-11.
Hoerhammer et al. "Compounds contained in Lycopus europaeus." 1962. *Arzneimittel-Forschung*, 12:1-7. English Abstract Only.
Hong et al. "Effects of free fatty acids on sodium currents in rat dorsal root ganglion neurons." 2004. *Brain Research*, 1008(1):81-91.
Horn et al. "Addition of fish oil to cream cheese affects lipid oxidation, sensory stability and microstructure." 2012. *Agriculture*, 2(4):359-75.
Hotchkiss et al. "Edible seaweeds: A rich source of flavour components for sodium replacement." Nov./Dec. 2012. 23(6):30-32.

Hu et al. "The cardioprotection of rutaecarpine is mediated by endogenous calcitonin related-gene peptide through activation of vanilloid receptors in guinea-pig hearts." 2002. *Planta Medica*, 68(8):705-09.
Hu et al. "The depressor and vasodilator effects of rutaecarpine are mediated by calcitonin gene-related peptide." 2003. *Planta Medica*, 69(2):125-29.
Hu et al. "Involvement of capsaicin-sensitive sensory nerves in cardioprotection of rutaecarpine in rats." 2003. *Regulatory Peptides*, 114(1):45-49.
Hu et al. "Potentiation of TRPV3 channel function by unsaturated fatty acids." 2006. *Journal of Cellular Physiology*, 208(1):201-12.
Huan et al. "Sweet pregnane glycosides from *Telosma procumbens*." 2001. *Chemical & Pharmaceutical Bulletin*, 49(4):453-60.
Huang et al. "Comparison of flavor material between fresh and dried ginger by GC-MS." 2007. *Zhongguo Shipin Xuebao*, 7(5):133-38. English Abstract Only.
Hwang et al. "A compound isolated from Schisandra chinensis induces apoptosis." 2011. *Bioorganic & Medicinal Chemistry Letters*, 21(20):6054-57.
Iida et al. "TRPV1 activation and induction of nociceptive response by a non-pungent capsaicin-like compound, capsiate." 2003. *Nueropharmacology*, 44(7):958-67.
Inoue et al. "Quercetin enhances VDR activity, leading to stimulation of its target gene expression in Caco-2 cells." 2010. *Journal of Nutritional Science and Vitaminology*, 56(5):326-330.
International Patent Application No. PCT/US2014/015230., filed Feb. 7, 2014; [International Search Report] dated Jun. 6, 2014; 4 pages.
International Patent Application No. PCT/US2014/015230., filed Feb. 7, 2014; [International Preliminary Report on Patentability and Written Opinion] dated Aug. 11, 2015; 7 pages.
International Patent Application No. PCT/US2014/015244., filed Feb. 7, 2014; [International Search Report] dated May 30, 2014; 4 pages.
International Patent Application No. PCT/US2014/015244., filed Feb. 7, 2014; [International Preliminary Report on Patentability and Written Opinion] dated Aug. 20, 2015; 7 pages.
Ishii et al. "The response of PKD1L3/PKD2L1 to acid stimuli is inhibited by capsaicin and its pungent analogs." 2012. *FEBS Journal*, 279(10):1857-1870.
Iwai et al. "Roles as metabolic regulators of the non-nutrients, capsaicin and capsiate, supplemented to diets." 2003. *Proceedings of the Japan Academy, Series B: Physical and Biological Sciences*, 79(7):207-12.
Iwami et al. "Extract of grains of paradise and its active principle 6-paradol trigger thermogenesis of brown adipose tissue in rats." *Autonomic Neuroscience*, 161(1-2):63-67.
Iwasaki et al. "A nonpungent component of steamed ginger-[10]-shogaol-increases adrenaline secretion via the activation of TRPV1." Jun./Aug. 2006. *Nutritional Neuroscience*, 9(3/4):169-78.
Iwasaki et al. "Monoacylglycerols Activate Capsaicin Receptor, TRPV1." 2008. *Lipids*, 43(6):471-83.
Izzo et al. "Effect of vanilloid drugs on gastrointestinal transit in mice." 2001. *British Journal of Pharmacology*, 132(7):1411-16.
Jahncke et al. "Sensory and chemical characteristics of selected Gulf of Mexico coastal herring species." 1997. *Journal of Food Science*, 62(3):626-31.
James et al. "Long-lasting agonist activity produced by a capsaicin-like photoaffinity probe." 1988. *Molecular Pharmacology*, 33(6):643-49.
Jianbo et al. "Preparation of crayfish flavoring by fermentation." 2011. *Advanced Materials Research*, 317-319:2383-87.
Juliani et al. "Chemistry and quality of fresh ginger varieties (Zingiber officinale) from Ghana." 2007. *Acta Horticulturae*, 756:399-406.
Kang et al. "Evidence that free polyunsaturated fatty acids modify Na+ channels by directly binding to the channel proteins." 1996. *Proceedings of the National Academy of Sciences of the United States of America*, 93 (8): 3542-46.

(56) References Cited

OTHER PUBLICATIONS

Kano et al. "On the evaluation of the preparation of Chinese medicinal prescriptions. VI. The changes of the alkaloid contents by processing of Evodia fruit." 1991. *Yakugaku Zasshi*,111(1):32-35. English Abstract Only.

Kawabata et al. "Non-pungent capsaicin analogs (capsinoids) increase metabolic rate and enhance thermogenesis via gastrointestinal TRPV1 in mice." 2009. *Bioscience, Biotechnology, and Biochemistry*, 73(12):2690-97.

Kawabata et al. "Spiciness, Pain and Energy Metabolism of Chili Peppers," 2005. *Kagaku to Seibutsu*, 43(3):160-65. English Abstract Only.

Kawai et al. "Taste-active components in foods, with concentration on umami compounds." 2009. 55(5):667-73.

Khan et al. "[6]-Gingerol induces bone loss in ovary intact adult mice and augments osteoclast function via the transient receptor potential vanilloid 1 channel." 2012. *Molecular Nutrition & Food Research*. 56(12):1860-73.

Khom et al. "GABAA receptor modulation by piperine and a non-TRPV1 activating derivative." 2013. *Biochemical Pharmacology*. 85(12):1827-36.

Kimura et al. "Antiobese effects of novel saponins from edible seeds of Japanese horse chestnut (Aesculus turbinata BLUME) after treatment with wood ashes." 2008. *Journal of Agricultural and Food Chemistry*, 56(12):4783-88.

Kimura et al. "Attenuating effect of saponins isolated from edible horse chestnuts (Aesculus turbinate B1.) on increasing blood glucose levels and their reducing bitter taste." 2006. *Nippon Shokuhin Kagaku Kogaku Kaishi*, 53 (1): 31-38. English Abstract Only.

Klein et al. "A tingling sanshool derivative excites primary sensory neurons and elicits nocifensive behavior in rats." Apr. 2011. 105(4):1701-10.

Klopman et al. "Quantitative structure-agonist activity relationship of capsaicin analogs." 1995. *Journal of Computer-Aided Molecular Design*, 9(3):283-94.

Kobata et al. "Isolation of coniferyl esters from *Capsicum baccatum* L., and their enzymatic preparation and agonist activity for TRPV1." 2008. *Phytochemistry*, 69(5):1179-84.

Kobayashi et al. "The bronchoconstrictive action of evodiamine, an indoloquinazoline alkaloid isolated from the fruits of *Evodia retaecarpa* on guinea-pig isolated bronchus: possible involvement on vanilloid receptors." 2000. *Planta Medica*, 66(6):526-30.

Kobayashi et al. "The positive inotropic and chronotropic effects of evodiamine and rutaecarpine, indoloquinazoline alkaloids isolated from the fruits of *Evodia rutaecarpa*, on the guinea-pig isolated right atria: possible involvement of vanilloid receptors." 2001. *Planta Medica*, 67(3):244-48.

Kollmannsberger et al. "Amides from supercritical fluid extracts of muntok pepper." 1992. *Chemie, Mikrobiologie, Technologie der Lebensmittel*, 14(3/4):87-94. English Summary Only.

Koo et al. "Hydroxy-α-sanshool activates TRPV1 and TRPA1 in sensory neurons." Sep. 2007. 26(5):1139-47.

Koriyama et al. "Fatty acid compositions of oil species affect the 5 basic taste perceptions." 2002. *Journal of Food Science*, 67(2):868-73.

Kreck et al. "Characterization of celery juices made of different celery varieties at different irrigation levels." 2006. *Deutsche Lebensmittel-Rundschau*, 102(1):17-24. English Summary Only.

Kristensen et al. "Oxidative stability of diacylglycerol oil and butter blends containing daicylglycerols." 2006. *European Journal of Lipid Science and Technology*, 108(4):336-50.

Kubo et al. "An evaluation of the nutritional value of the rice remains of Funazushi, Fermented sushi of crucian carp, and its utilization for western style confectionaries." 2007. *Kaseigaku Kenkyu*, 54(1):1-6. Abstract Only—Provided by Science IP.

Kubota et al. "The Constitution of myoporone, a new furanoterpene from Myoporum." Apr. 20, 1957. *Chemistry & Industry*, 491-92.

Kuenzi et al. "Effect of capsaicin and analogs on potassium and calcium currents and vanilloid receptors in Xenopus embryo spinal neurons." 1996. *British Journal of Pharmacology*, 119(1):81-90.

Laine et al. "Study of Precursors Responsible for Off-Flavor Formation during Storage of Potato Flakes." 2006. *Journal of Agricultural and Food Chemistry*, 54(15):5445-52.

Lalos et al. "Quality of semi-hard goat cheese from raw and refrigerated milk." 2002. *Milchwissenschaft*, 57(6):319-21.

Lawless et al. "Effects of oral chemical irritation on taste." 1984. *Physiology & Behavior*, 32(6):995-98.

Leaf et al. "Membrane Effects of the n-3 Fish Oil Fatty Acids, which Prevent Fatal Ventricular Arrhythmias." 2005. *Journal of Membrane Biology*, 206(2):129-39.

Lee. "A salt substitute with low sodium content from plant aqueous extracts." Mar. 2011. *Food Research International* 44(2):537-43.

Lee. "Molecular structure of capsaicin and long-lasting analgesia." 1990. *Haksurwon Nonmunjip, Cha'yon Kwahak P 'yon*, 29:143-60.

Leick et al. "Effect of distillers dried grains with solubles and ractopamine (Paylean) on quality and self-life of fresh pork and bacon." 2010. *Journal of Animal Science*, 88(8):2751-66.

Leifert et al. "Effects of dietary n-3 fatty acids on contractility, Na+ and K+ currents in rat cardiomyocyte model of arrhythmia." 2000. *Journal of Nutritional Biochemistry*, 11(7/8):382-92.

Leisso et al. "Cell Wall, Cell Membrane, and Volatile Metabolism Are Altered by Antioxidant Treatment, Temperature Shifts, and Peel Necrosis during Apple Fruit Storage." 2013. *Journal of Agricultural and Food Chemistry*, 61(6):1373-87.

Leskosek-Cukalovic et al. "*Ganoderma lucidum* —Medical mushroom as a raw material for beer with enhanced functional properties." 2010. *Food Research International*, 43(9):2262-69.

Ley et al. "Structural analogues of homoeriodictyol as flavor modifiers. Part III: Short chain gingerdione derivatives." 2008. *Journal of Agricultural and Food Chemistry*, 56(15):6656-64.

Li et al. "Beneficial effects of capsiate on ethanol-induced mucosal injury in rats are related to stimulation of calcitonin gene-related peptide release." 2012. *Planta Medica*, 78(1):24-30.

Li et al. "Calcitonin gene-related peptide-mediated antihypertensive and anti-platelet effects by rutaecarpine in spontaneously hypertensive rats." 2008. *Peptides*, 29(10):1781-88.

Li et al. "Reversal of isoprenaline-induced cardiac remodeling by rutaecarpine via stimulation of calcitonin gene-related peptide production." 2010. *Canadian Journal of Physiology and Pharmacology*. 88(10):949-59.

Liang et al. "Effects of silicon on H+-ATPase and H+-PPase activity, fatty acid composition and fluidity of tonoplast vesicles from roots of salt-stressed barley (Hordeum vulgare L.)." 2005. *Environmental and Experimental Botany*, 53(1):29-37.

Liu et al. "Chemical structure and function of common flavour." Dec. 2004. *Zhongguo Tiaoweipin*, (12):19, 30-33. English Abstract Only.

Liu et al. "Similarities and differences in the currents activated by Capsaicin, Piperine, and Zingerone in rat trigeminal ganglion cells." Sep. 1996. *Journal of Neurophysiology*, 76(3):1858-69.

Long et al. "Pharmacologic antagonism of the oral aversive taste-directed response to capsaicin in a mouse brief access taste aversion assay." 2010. *Journal of Pharmacology and Experimental Therapeutics*, 332(2):525-530.

Love et al. "The effects of exposure to exogenous fatty acids and membrane fatty acid modification on the electrical properties of NG108-15 cells." 1985. *Cellular and Molecular Neurobiology*, 5(4):333-52.

Ludy et al. "The Effects of Capsaicin and Capsiate on Energy Balance: Critical Review and Meta-analyses of Studies in Humans." 2012. *Chemical Senses*, 37(2):103-21.

Lu et al. "Studies on the Major Bitter Compounds in Canned Avocado Juice." 1986. *Zhongguo Nongye Huaxue Huizhi*, 24(2):130-36. English Abstract Only.

Lynch. "In search of the salty taste." Nov. 1987. *Food Technology*, 41(11):82-3, 85-6.

Macho et al. "Non-pungent capsaicinoids from sweet pepper: Synthesis and evaluation of the chemopreventive and anticancer potential." 2003. *European Journal of Nutrition*, 42(1):2-9.

(56) References Cited

OTHER PUBLICATIONS

Martenson et al. "Enhancement of rat trigeminal ganglion neuron responses to piperine in a low-pH environment and block by capsazepine." 1997. *Brain Research*, 761(1):71-76.
Martin et al. "Lipid-mediated release of GLP-1 by mouse taste buds from circumvallate papillae: putative involvement of GPR120 and impact on taste sensitivity." 2012. *Journal of Lipid Research*, 53(11):2256-65.
Matsushita et al. "Inhibition by TRPA1 agonists of compound action potentials in the frog sciatic nerve." 2013. *Biochemical and Biophysical Research Communications*, 434(1):179-184.
Matta et al. "TRPV1 is a novel target for omega-3 polyunsaturated fatty acids." 2007. *Journal of Physiology*, 578(2):397-411.
McNamara et al. "Effects of piperine, the pungent component of black pepper, at the human vanilloid receptor (TRPV1)." 2005. *British Journal of Pharmacology*, 144(6): 781-90.
Menozzi et al. "Synthesis and evaluation of new alkylamides derived from α-hydroxysanshool, the pungent molecule in szechuan pepper." Mar. 2009. 57(5):1982-89.
Menozzi-Smarrito et al. "Synthesis and Evaluation of New Alkylamides Derived from α—Hydroxysanshool, the Pungent Molecule in Szechuan Pepper." 2009. *Journal of Agricultural and Food Chemistry*, 57(5):1982-89.
Mogg et al. "Altered pharmacology of native rodent spinal cord TRPV1 after phosphorylation." 2013. *British Journal of Pharmacology*, 168(4):1015-29.
Moreno et al. "Effects of n-3 polyunsaturated fatty acids on cardiac ion channels." Jul. 2012. *Frontiers in Cardiac Electrophysiology*, 245.
Morera et al. "Synthesis and biological evaluation of [6]-gingerol analogues as transient receptor potential channel TRPV1 and TRPA1 modulators." 2012. *Bioorganic & Medicinal Chemistry Letters*, 22(4):1674-77.
Moretti et al. "Chemical and microbiological parameters and sensory attributes of a typical Sicilian salami ripened in different conditions." 2004. *Meat Science*, 66(4):845-54.
Morita et al. "Lipophilicity of capsaicinoids and capsinoids influences the multiple activation process of rat TRPV1." 2006. *Life Sciences*, 79(24):2303-10.
Morita et al. "Newly synthesized oleylgingerol and oleylshogaol activate TRPV1 ion channels." 2007. *Bioscience, Biotechnology, and Biochemistry*, 71(9):2304-07.
Mottram et al. "Fatty acids antagonize bupivacaine—induced Ina blockade." 2011. *Clinical Toxicology*, 49(8):729-33.
Mughetti et al. "Integration of extruded linseed into dairy sheep diets: Effects on milk composition and quality and sensorial properties of Pecorino cheese." 2012. *Animal Feed Science and Technology*, 178(1-2):27-39.
Nakamura et al. "Determination of piperine in seasoned pork meat by high-performance liquid chromatography (HPLC)." 1998. *Kanzei Chuo Bunsekishoho*, 37:1-6. English Abstract Only.
Narukawa et al. "Galangal pungent component, 1'-acetoxychavicol acetate, activates TRPA1." 2010. *Bioscience, Biotechnology and Biochemistry*, 74(8):1694-1696.
Ni et al. "Studies on quality control of Zhuanggushenjin capsules." 1996. *Zhongguo Zhongyao Zazhi*21(1):28-30. English Abstract Only.
Nicklas et al. "Are energy genes diets also nutrient dense?" 2008. *Journal of the American College of Nutrition*, 27(5):553-60.
Nocerino et al. "Relaxant effect of capsazepine in the isolated rat ileum." 2002. *Naunyn-Schmiedeberg's Archive of Pharmacology*, 365(3):187-92.
Nykanen et al. "Composition of angelica root oils obtained by supercritical carbon dioxide extraction and steam distillation." Jul./Aug. 1991. *Journal of Essential Oil Research*, 3(4):229-36.
Ohnuki et al. "CH-19 Sweet, nonpungent cultivar of red pepper, increased body temperature in mice with vanilloid receptors stimulation of capsiate." 2001. *Journal of Nutritional Science and Vitaminology*, 47(4):295-98.
Okumi et al. "Dietary agonists of TRPV1 inhibit gastric acid secretion in mice." 2012. *Planta Medica*, 78(17):1801-06.

Okumura et al. "Activation of TRPV1 by black pepper components." 2010. *Bioscience, Biotechnology, and Biochemistry*, 74(5): 1068-72.
Oliveira et al. "Composition and consumer attribute analysis of smoked fillets of gulf sturgeon (Ancipenser oxyrinchus desotoi) fed different commercial diets." 2006. *Journal of Aquatic Food Product Technology*, 15(3):33-48.
Olmedo et al. "Chemical and sensory stability of fried-salted peanuts flavored with oregano essential oil and olive oil." 2009. *Journal of the Science of Food and Agriculture*, 89(12):2128-36.
Ono et al. "Intragastric administration of capsiate, a transient receptor potential channel agonist, triggers thermogenic sympathetic responses." 2011. *Journal of Applied Physiology*, 110(3):789-798.
Ortar et al. "New N-arachidonoylserotonin analogs with potential 'Dual' mechanism of action against pain." 2007. *Journal of Medicinal Chemistry*, 50(26):6554-69.
Owsley et al. "Guggulsterone antagonizes farnesoid X receptor induction of bile salt export pump but activates pregnane X receptor to inhibit cholesterol 7α-hydroxylase gene." 2003. *Biochemical and Biophysical Research Communications*, 304(1):191-95.
Park et al. "Alterations of plasma membrane fatty acid composition modify the kinetics of sodium current in cultured rat diencephalic neurons." 1992. *Brain Research*, 570(1-2):75-84.
Park. "Fatty acid compositions and physiocochemical properties of feta cheese from bovine milk." 2006. *ournal of Animal Science and Technology*, 48(4):611-22.
Patwardhan et al. "Activation of TRPV1 in the spinal cord by oxidized linoleic acid metabolites contributes to inflammatory hyperalgesia." 2009. *Proceedings of the National Academy of Sciences of the United States of America*106(44):18820-24.
Pearce et al., "Evodiamine functions as an agonist for the vanilloid receptor TRPV1." Aug. 2004. *Organic and Biomolecular Chemistry*, 2(16):2281-86.
Perez-Palacios et al. "Sensory traits prediction in dry-cured hams from fresh product via MRI and lipid composition." 2010. *Journal of Food Engineering*. 101(2):152-57.
The Permanente Medical Group. "Cooking With Herbs and Spices: Enjoy Great Taste Without Salt." *My Doctor Online*. 2016. [retrieved on Jun. 9, 2016]. Retrieved from the Internet:<URL: https://mydoctor.kaiserpermanente.org/ncal/mdo/#/>; 2 pgs.
Pietrasik et al. Effect of canola oil emulsion injection on processing characteristics and consumer acceptability of three muscles from mature beef 2013. *Meat Science*, 93(2):322-28.
Pino, et al. "Fruit volatiles of Cayena cherry (Eugenia uniflora L.) from Cuba." Mar./Apr. 2003. *Journal of Essential Oil Research*, 15(2):70-71.
Pussa et al. "A study of oxidation products of free polyunsaturated fatty acids in mechanically deboned meat." 2009. *Journal of Food Composition and Analysis*, 22(4):307-14.
Qi et al. "Analysis of volatile compounds in sauced beef essence prepared by Maillard reaction." 2012. *Shipin Kexue*, 33(8):199-202.
Qian et al. "Synthesis and biological evaluation of capsaicin derivatives as analgesia drugs." 2010. *Letters in Drug Design & Discovery*, 7(2):122-27.
Qin et al. "Calcitonin Gene-Related Peptide-Mediated Depressor Effect and Inhibiting Vascular Hypertrophy of Rutaecarpine in Renovascular Hypertensive Rats." 2007. *Journal of Cardiovascular Pharmacology*, 50(6):654-59.
Qiu et al. "Chemoreception of oviposition inhibiting terpenoids in the diamondback moth *Plutella xylostella*." 1998. *Entomologia Experimentalis et Applicata*, 87(2):143-155.
Qu et al. "Analysis of Cortex Moutan extract with GC/MS." 2012. *Yancao Keji*, (6):45-47. English Abstract Only.
Ramirez et al. "Effect of IberianxDuroc genotype on dry-cured loin quality." 2007. *Meat Science*, 76(2):333-41.
Ramirez et al. "Effect of Iberian x Duroc genotype on composition and sensory properties of dry-cured ham." 2008. *Journal of the Science of Food and Agriculture*, 88(4):667-75.
Rathore et al. "Cardiac glycosides. 7. Sugar stereochemistry and cardiac glycoside activity." 1986. *Journal of Medicinal Chemistry*, 29(10):1945-52.

(56) References Cited

OTHER PUBLICATIONS

Reddy et al., "Reducing the Sodium Content of Foods: A Review," Feb. 1991. *Journal of Food Protection*, 54(2):138-150.
Riera et al. "Compounds from Sichuan and Melegueta peppers activate, covalently and non-covalently, TRPA1 and TRPV1 channels." Aug. 2009. 157(8): 1398-1409.
Riznar et al. "Stabilization of chicken meat with natural antioxidant," Fakulteta za Kemijo in Kemijsko Technologijo. 637-640, (Univerza v. Mariboru) Maribor, Slovenia, Sep. 23-24, 2004. Abstract Only—Provided by Science IP.
Rubilar et al. "Development of a soup powder enriched with microencapsulated linseed oil as a source of omega-3 fatty acids." 2012. *European Journal of Lipid Science and Technology*, 114(4):423-33.
Salmon et al. "Characterisation of cultivars of Jamaican ginger (Zingiber officinale Roscoe) by HPTLC and HPLC." 2012. *Food Chemistry*, 131(4):1517-22.
Sanwal, et al. "Gingerol content of different genotypes of ginger (Zingiber officinale)." 2010. *Indian Journal of Agricultural Sciences*, 80(3):258-260.
Sasahara et al. "Assessment of the biological similarity of three capsaicin analogs (Capsinoids) found in non-pungent chili pepper (CH-19 sweet) fruits." 2010. *Bioscience, Biotechnology, and Biochemistry*, 74(2):274-78.
Schrecker. "meso-Dihydroguaiaretic acid and its derivatives." 1957. *Journal of the American Chemical Society*, 79:3823-27.
Seo et al. "Expression of the *Arabidopsis AtMYB44* gene confers drought/salt-stress tolerance in transgenic soybean." 2012. *Molecular Breeding*, 29(3):601-08.
Shekdar. "New salt taste enhancers discovered for healthier foods." *AChemS: Associate for Chemoreception Sciences*. 2014. [retrieved on Jun. 9, 2016]. Retrieved from the Internet: <URL: http://www.achems.org/i4a/pages/index.cfm?pageID=3892>; 1 pg.
Shintaku et al. "Activation of transient receptor potential A1 by a non-pungent capsaicin-like compound, capsiate." Mar. 2012. 165(5):1476-86.
Shobharani et al. "Enhance of cell stability and viability of probiotic *Leuconostoc mesenteroides* MTCC 5209 on freeze drying." May 2011. *International Journal of Dairy Technology*, 64(2):276-287.
Sinclair et al. "Effects of trans-10, cis-12 conjugated linoleic acid on ovine milk fat synthesis and cheese properties." 2007. *Journal of Dairy Science*, 90(7):3326-35.
Someya et al. "Modifications of capsaicin-sensitive neurons in isolated guinea pig ileum by [6]-gingerol and lafutidine." 2003. *Journal of Pharmacological Sciences*, 92(4):359-66.
Stachowska et al. "Feeding away inflammation—conjugated linoleic acids decrease pancreatic phospholipase A2 activity." 2007. *Journal of Food Lipids*, 14(3):315-22.
Stähler et al. Involvement of the Epithelial Sodium Channel in Human Salt Taste Perception. ZHAW University. *Expression of Multidisciplinary Flavour Science*, [retrieved on Jun. 9, 2016]. Retrieved from the Internet: URL: <https://home.zhaw.ch/~yere/pdf/Tei18%20-%20of%20 Multidisciplinary.pdf>; 5 pgs.
Sugai et al. "Pungent qualities of sanshool-related compounds evaluated by a sensory test and activation of rat TRPV1." Oct. 2005. 69(10):1951-7.
Sukumar et al. "Constitutively Active TRPC Channels of Adipocytes Confer a Mechanism for Sensing Dietary Fatty Acids and Regulating Adiponectin." 2012. *Circulation Research*, 111(2):191-200.
Sun et al. "Effect of deoxypodophyllotoxin on membrane potential of dorsal unpaired median neurons and its relationship with sodium channel." 2010. *Zhonghua Laodong Weisheng Zhiyebing Zazhi*, 28(10):1001-9391. English Abstract Only.
Sun et al. "The increase in unsaturation of fatty acids of phosphatidylglycerol in thylakoid membrane enhanced salt tolerance in tomato." 2010. *Photosynthetica*. 48(3):400-08.
Sung et al. "Cancer Cell Signaling Pathways Targeted by Spice-Derived Nutraceuticals." 2012. *Nutrition and Cancer*, 64(2):173-97.
Sunwold. "Notes From the CKD Kitchen: A Variety of Salt-Free Seasonings." May 2007. *Journal of Renal Nutrition*. 17(3):218-19.
Szallasi. "Piperine: researchers discover new flavor in an ancient spice." 2005. *Trends in Pharmacological Sciences*, 26(9):437-39.
Szallasi et al. "Specific binding of resiniferatoxin, an ultrapotent capsaicin analog, by dorsal root ganglion membranes." 1990. *Brain Research*, 524(1):106-11.
Takenaka et al. "Effects of arachidonic acid and other long-chain fatty acids on the membrane currents in the squid giant axon." 1988. *Journal of Membrane Biology*, 106(2):141-7.
Taketa et al. "Triterpenes and triterpenoidal glycosides from the fruits of *Ilex paraguariensis* (Maté)." 2004. *Journal of Brazilian Chemical Society*, 15(2):205-11.
Tanaka et al. "Assessment of Capsiconinoid Composition, Nonpungent Capsaicinoid Analogues, in Capsicum Cultivars." 2009. *Journal of Agricultural and Food Chemistry*, 57(12):5407-12.
Tengamnuay et al. "Bile salt-fatty acid mixed micelles as nasal absorption promoters of peptides. I. Effects of ionic strength, adjuvant composition, and lipid structure on the nasal absorption of [D-Arg2] kyotorphin." 1990. *Pharmaceutical Research*, 7(2):127-33.
Tilden et al. "Some crystalline substances obtained from the fruits of various species of Citrus. Part I." 1890. *Journal of the Chemical Society, Transactions*, 57:323-28.
Tomohiro et al. "Inhibition by capsaicin and its related vanilloids of compound action potentials in frog sciatic nerves." 2013. *Life Sciences*, 92(6-7):368-78.
Turchini et al. "Effects of dietary lipid source on fillet chemical composition, flavour volatile compounds and sensory characteristics in the freshwater fish tench (Tinca tinca L.)." 2007. *Food Chemistry*, 102(4):1144-55.
Ursu et al. "Pungency of TRPV1 agonists is directly correlated with kinetics of receptor activation and lipophilicity." 2010. *European Journal of Pharmacology*, 641(2-3):114-22.
Vasiliadou et al. "Effect of smoking on quality parameters of farmed gilthead sea bream (*Sparus aurata* L.) and sensory attributes of the smoked product." 2005. *European Food Research and Technology*, 2217(3-4):232-36.
Wackerbauer et al. "The occurrence of free and triglyceride-bonded hydroxy fatty acids in barley and malt." 2002. *Flavour and Flavour Stability*, 31:44-52.
Wang et al. "Analysis of volatile oil of Chinese prickly ash." 1987. *Shipin Kexue*, 94:50-52. English Abstract Only.
Wang et al. "Determination of imperatorin in tobacco flavor by RP-UPLC." 2011. *Huaxue Fenxi Jiliang*, 20(6):36-39. English Abstract Only.
Wang et al. "The protective effects of rutaecarpine on gastric mucosa injury in rats." 2005. *Planta Medica*, 71(5):416-19.
Watanabe et al., "Food Components Activating TRPA1," "Recent Researches in Modern Medicine" [online]. ISBN No. 978-960-474-278-3, International Conference on Medical Physiology, Cambridge, United Kingdom, Feb. 23-25, 2011, [retrieved on Apr. 18, 2017]. Publication in 2009, *Nutrigenomics and Proteomics in Health and Disease: Food Factors and Gene Interactions*; 263-72 attached.
Watanabe et al. "Food components activating capsaicin receptor TRPV1." 2009. *Nutrigenomics and Proteomics in Health and Disease*, 263-272.
WikiHow.com. "How to Follow a Low Sodium Diet." [retrieved on Jun. 9, 2016]. Retrieved from the Internet:<URL: http://www.wikihow.com/Follow-a-Low-Sodium-Diet>; 3 pgs.
Witte et al. "Use of a fluorescent imaging plate reader-based calcium assay to assess pharmacological differences between the human and rat vanilloid receptor." 2002. *Journal of Biomolecular Screening*, 7(5):466-75.
Wu, et al. "Maslinic acid induces apoptosis in salivary gland adenoid cystic carcinoma cells by Ca2+-evoked p38 signaling pathway." 2011. *Naunyn-Schmiedeberg's Archives of Pharmacology*, 383(3):321-330.
Xande et al. "Effect of sugarcane diets and a high fibre commercial diet on fresh meat and dry-cured ham quality in local Caribbean pigs." 2009. *Meat Science*, 82(1):106-12.

(56) References Cited

OTHER PUBLICATIONS

Xia et al. "TRPV1 signaling: mechanistic understanding and therapeutic potential." 2011. *Current Topics in Medicinal Chemistry*, 11(17):2180-91.

Xiao et al. "The Antiarrhythmic Effect of n-3 Polyunsaturated Fatty Acids: Modulation of Cardiac Ion Channels as a Potential Mechanism." 2005. *Journal of Membrane Biology*, 206(2):141-54.

Xiao et al. "Blocking effects of polyunsaturated fatty acids on Na+ channels of neonatal rat ventricular myocytes." 1995. *Proceedings of the National Academy of Sciences of the United States of America*, 92(24):11000-04.

Xiao et al. "Coexpression with β1-subunit modifies the kinetics and fatty acid block hH1α Na+ channels." 2000. *American Journal of Physiology*, 279(1, Pt. 2):H35-H46.

Xiao et al. "Fatty acids suppress voltage-gated Na+ currents in HEK293t cells transfected with the α-subunit of the human cardiac Na+ channel." 1998. *Proceedings of the National Academy of Sciences of the United States of America*, 95(5):2680-85.

Xiao et al. "Potent block of inactivation-deficient Na+ channels by n-3 polyunsaturated fatty acids." 2006. *American Journal of Physiology*, 290(2, Pt. 1):C362-70.

Xu et al. "Pharmacological effect of deoxypodophyllotoxin: a medicinal agent of plant origin, on mammalian neurons." 2010. NueroToxicology, 31(6):680-86.

Yamasaki. "Arachidonic Acid Enhance Taste and Palatability of Foods," 2012, *Oleoscience*, 12(7):283-88.

Yamato et al. "Effect of additives on stability of icariin in Epimedium extract." 1993. *Yakuzaigaku*, 53(2):116-23. English Abstract Only.

Yan et al. "Determination of extract of Schisandra chinensis effective constituent content and the effect on inosinic acid content." 2008. *Zhongguo Xumu Shouyi*, 35(12):36-39. English Abstract Only.

Yang et al. "Pungent ingredient screening of *Euodia rutaecarpa* (Juss.) Benth. var. *bodinier* (Dode) Huang." Jun. 2012. *Zhongchengyao*34(6):1106-10. English Abstract Only.

Yang et al. "Non-volatile taste components of several commercial mushrooms." 2001. *Food Chemistry.* 72(4):465-71.

Yang et al. "TRPV1 agonist piperine but not olvanil enhances glutamatergic spontaneous excitatory transmission in rat spinal substantia gelatinosa neurons." 2011. *Biochemical and Biophysical Research Communications*, 410(4):841-45.

Yi et al. "Protective effects of Rutaecarpine in cardiac anaphylactic injury is mediated by CGRP." 2004. *Planta Medica*, 70(12):1135-39.

Yim et al. "Proteomic analysis of ursolic acid-induced apoptosis in cervical carcinoma cells." 2006. *Cancer Letters*235(2):209-220.

Yoo et al. "Induction of adenosine release by 6-paradol, a long-lasting analgesic, in rat spinal cord." 2000. *Yakhak Hoechi*, 44(6):499-504. English Abstract Only.

Yonei, et al. "Extraction of ginger flavor with liquid or supercritical carbon dioxide." 1995. *Journal of Supercritical Fluids*, 8(2):156-61.

Yoon et al. "A novel Na + channel agonist, dimethyl lithospermate B, slows Na + current inactivation and increases action potential duration in isolated rat ventricular myocytes." Nov. 2004. 143(6):765-773.

Yu et al. "Involvement of CGRP in the inhibitory effect of rutaecarpine on vasoconstriction induced by anaphylaxis in guinea pig." 2005. *Regulatory Peptides*, 125(1-3):93-97.

Zhang et al. "A mechanism underlying the effects of polyunsaturated fatty acids on breast cancer." 2012. *International Journal of Molecular Medicine*, 30(3):487-94.

Zang et al. "Study on Volatile flavor compounds of Beijing moslemic braised beef with soy sauce." 2010. *Shipin Gongye Keji*, 31(8):70-73, 357. English Abstract Only.

Zhang et al. "Recent development of vanilloid receptor 1 agonists." 2006. *Zhongguo Xinyao Zazhi*, 15(23):2006-09. English Abstract Only.

Zhao et al. "Determination of ursolic acid in peel, meat and fruit of Cornus officinalis." 2008. *Zhongguo Yiyuan Yaoxue Zazhi*, 28(11):950-51. English Abstract Only.

Zhao et al. "Experiment study of antibacterial constituents of Ficus carical leaves." 2005. *Journal of Qingdao University (Natural Science Edition)*, 18(3):37-40.

Zhou et al. "Calcitonin gene-related peptide inhibits angiotensin II-induced endothelial progenitor cells senescence through up-regulation of klotho expression." 2010. *Atherosclerosis*. 213(1):92-101.

Zhou et al. "Variation of oleanolic and ursolic acid in the flesh of persimmon fruit among different cultivars." 2010. *Molecules*, 15:6580-87.

Ziglioli et al. "Vanilloid-mediated apoptosis in prostate cancer cells through a TRPV-1 dependent and a TRPV-1 independent mechanism." 2009. *Acta Bio Medica Atenei Parmensis*. 80(1):13-20.

Zviely. "The universal hotness, part 2: piperine: chemistry and application in flavor and fragrance." Nov. 2011. *Perfumer & Flavorist*36(11):46, 48-49.

* cited by examiner

| Compound | Conc. | 12 | 13 | 83 | 10 | 37 | 36 | 45 | 18 | 56 | 82 | 3 | 84 | 41 | 48 | 53 | 44 | 62 | 43 |
|---|---|---|---|---|---|---|---|---|---|---|---|---|---|---|---|---|---|---|---|
| 12 | 1 ppm | X | X | X | X | X | X | X | X | X | X | X | X | X | X | X | X | X | |
| 13 | 10 ppm | 3.4 | X | X | X | X | X | X | X | X | X | X | X | X | X | X | X | X | X |
| 83 | 1 ppm | 3.2; 4.2 | 3.7; 4.5 | X | X | X | X | X | X | X | X | X | X | X | X | X | X | X | X |
| 10 | 1 ppm | 3.9 | 3.1 | 3.9 | X | X | X | X | X | X | X | X | X | X | X | X | X | X | X |
| 37 | 10 ppm | 3.0; 4.4 | 3.5 | 4.1 | 4.1 | X | X | X | X | X | X | X | X | X | X | X | X | X | X |
| 36 | 0.1 ppm | 3.9 | 3.8 | 3.5 | 3.3; 3.4 | 3.1 | X | X | X | X | X | X | X | X | X | X | X | X | X |
| 45 | 10 ppm | 3.6; 3.9 | 3.4; 4.1 | 2.4; 3.4 | 3.4 | 3.3 | 4 | X | X | X | X | X | X | X | X | X | X | X | X |
| 18 | 10 ppm | 2.6; 4.0 | 3.1 | 3.2; 3.9 | 3.3 | 3.8 | 3.4; 3.1; 3.7 | 2.7; 3.3 | X | X | X | X | X | X | X | X | X | X | X |
| 56 | 10 ppm | 2.6 | 3.4 | 3.8 | 4.1 | 3.4; 4.4 | 3.5 | 3.1 | 3.4 | X | X | X | X | X | X | X | X | X | X |
| 82 | 1 ppm | | | | 3.2 | | | | 3.5 | 3.4 | X | X | X | X | X | X | X | X | X |
| 3 | 0.1 ppm | | | | | | 3.3 | | | | 3.4 | X | X | X | X | X | X | X | X |
| 84 | 1 ppm | | 3.8 | | 3.3 | 3.4 | | | 2.9 | 3 | 3.1 | 3.3 | X | X | X | X | X | X | X |
| 41 | 10 ppm | | | | 3.3 | | | | | | | | 3.0 | X | X | X | X | X | X |
| 48 | 10 ppm | | 3.0 | | | 3.4 | 3.2 | 3.1 | | 3.0 | | | | 2.9 | X | X | X | X | X |
| 53 | 1 ppm | | | | | 3.3 | | | | | 2.9 | | 3.1 | | 3 | X | X | X | X |
| 44 | 10 ppm | 3.2 | | | | | | | | | | 3.1 | | | 3.1 | 2.8 | X | X | X |
| 62 | 10 ppm | | | 3.0 | | | | | | | | | | 2.9 | | | | X | X |
| 43 | 10 ppm | 3.1 | | | 3.1 | | 3.2 | | | | | | | | | | | | X |

FIG. 1

| Compound (Concentration) | 12 | 13 | 83 | 10 | 37 | 36 | 45 | 18 | 56 | 82 | 3 | 84 | 41 | 48 | 53 | 44 | 62 | 43 |
|---|---|---|---|---|---|---|---|---|---|---|---|---|---|---|---|---|---|---|
| 12 (1 ppm) | X | X | X | X | X | X | X | X | X | X | X | X | X | X | X | X | X | X |
| 13 (10 ppm) | 7.9 | X | X | X | X | X | X | X | X | X | X | X | X | X | X | X | X | X |
| 83 (1 ppm) | 8.0 | 7.9 | X | X | X | X | X | X | X | X | X | X | X | X | X | X | X | X |
| 10 (1 ppm) | 7.7 | 7.9 | 7.9 | X | X | X | X | X | X | X | X | X | X | X | X | X | X | X |
| 37 (10 ppm) | 8.1 | | | | X | X | X | X | X | X | X | X | X | X | X | X | X | X |
| 36 (0.1 ppm) | 8.1 | 7.8 | 7.8 | | | X | X | X | X | X | X | X | X | X | X | X | X | X |
| 45 (10 ppm) | 8.2 | | 8.1 | | | | X | X | X | X | X | X | X | X | X | X | X | X |
| 18 (10 ppm) | 8.3-9.0 | 8.0 | 8.1 | 8.0 | | 7.9 | | X | X | X | X | X | X | X | X | X | X | X |
| 56 (10 ppm) | 8.1 | 7.9 | 8.0 | 8.0 | | 8.2 | | | X | X | X | X | X | X | X | X | X | X |
| 82 (1 ppm) | 8.3 | | | 7.6 | | 7.6 | 8.2 | 8.3 | 7.9 | X | X | X | X | X | X | X | X | X |
| 3 (0.1 ppm) | 8.2 | 7.7 | 7.9 | 7.9 | | 8.5 | 8.4 | 8.3 | 7.9 | 8.3 | X | X | X | X | X | X | X | X |
| 84 (1 ppm) | 8.2 | 8.8 | | | | 7.7 | 8.1 | 7.8 | 7.9 | | X | X | X | X | X | X | X | X |
| 41 (10 ppm) | 7.7 | 7.8 | | | | | | | | | 7.6 | X | X | X | X | X | X | X |
| 48 (10 ppm) | 7.8 | | | | | | | | | | | | X | X | X | X | X | X |
| 53 (1 ppm) | 8.0 | 8.1 | 7.9 | 7.6 | | 8.1 | | | | 8.0 | 7.9 | 8.0 | | X | X | X | X | X |
| 44 (10 ppm) | 7.4 | 7.7 | 7.8 | 8.1 | | 7.9 | | | | 7.9 | 8.0 | 7.8 | | | X | X | X | X |
| 62 (10 ppm) | 7.7 | | | | | | | | | | | 7.5 | | | | X | X | X |
| 43 (10 ppm) | 7.8 | 8.0 | 7.8 | 7.9 | | 8.0 | | | | 8.0 | 7.9 | 7.8 | | | 8.1 | | X | X |

FIG. 2

REDUCED SODIUM FOOD PRODUCTS

RELATED APPLICATIONS

This application is a continuation application of PCT/US2014/015230, Filed on Feb. 7, 2014, which claims the benefit of each of the following Provisional Patent Applications: U.S. 61/762,781, filed on Feb. 8, 2013; U.S. 61/762,792, filed on Feb. 8, 2013; U.S. 61/762,798, filed on Feb. 8, 2013; U.S. 61/762,804, filed on Feb. 8, 2013; U.S. 61/763,244, filed on Feb. 11, 2013; U.S. 61/763,274, filed on Feb. 11, 2013; and U.S. 61/763,300, filed on Feb. 11, 2013. This application is also a continuation application of PCT/US2014/015192, filed on Feb. 8, 2014; PCT/US2014/015200, filed on Feb. 7, 2014; PCT/US2014/15207, filed on Feb. 7, 2014; PCT/US2014/015211, filed on Feb. 7, 2014; PCT/US2014/015216, filed on Feb. 7, 2014; PCT/US2014/015220, filed on Feb. 7, 2014; PCT/US2014/015233, filed on Feb. 7, 2014; PCT/US2014/015277, filed on Feb. 7, 2014; PCT/US2014/015234, filed on Feb. 7, 2014; PCT/US2014/015239, filed on Feb. 7, 2014; PCT/US2014/015240, filed on Feb. 7, 2014; and PCT/US2014/015244, filed on Feb. 7, 2014. Each of the above-referenced Applications is hereby incorporated herein by reference in their respective entirety to the extent that they do not conflict with the disclosure presented herein.

FIELD

This disclosure generally relates to, among other things, food products having a compound that modifies or enhances the taste of the food product, for example, the saltiness of the food product.

BACKGROUND

Sodium chloride, ordinary table salt, is the prototypical compound for eliciting the perception of salty taste. However, attempts to reduce sodium consumption have led investigators to find suitable substitutes for sodium chloride or to reduce sodium chloride amounts, without sacrificing salty taste.

Salts can elicit complex tastes, including mixtures of sweet, bitter, sour, umami, and salty perceptual components. It is believed that the cations of salts impart the perceptual taste component, while the anions, in addition to contributing to tastes of their own, modify the perception of the taste of the cations. By way of example, sodium and lithium are believed to impart only salty tastes, while potassium and other alkaline earth cations produce both salty and bitter tastes. Among the anions commonly found in foods, the chloride ion is considered to be the least inhibitory to the salty taste, while the citrate anion is more inhibitory.

Many attempts have been made to provide salty tasting compositions as a substitute for table salt which will give the same or a similar seasoning effect and which are comprised of substantially reduced quantities of sodium chloride. To this end, potassium chloride, ammonium chloride, and similar compounds have been suggested. The use of such salts, and combinations of such salts, leaves much to be desired as to taste. None of them individually or in combination positively affects other taste modalities and tastes like sodium chloride. Each alone has a disagreeable taste, as do mixtures of such salts. For example, potassium chloride has a strong aftertaste that is characterized as "bitter" by most people. Ammonium chloride also has a bitter aftertaste.

SUMMARY

This disclosure describes, among other things, compounds that elicit or enhance the perception of salty taste, or another taste associated with consumption of sodium chloride or other salts, or that interact with a receptor or ion channel associated with the perception of salty taste or another complex taste associated with consumption of sodium chloride or other salts. In embodiments, the compounds are naturally derived taste modulating compounds used as ingredients in food products to elicit or enhance perception of salty taste. In embodiments, the food products contain lower amounts of sodium than normal.

As described herein, a number of derived compounds were screened for their ability to modulate activity of a sodium channel in vitro. Many of the identified compounds were found to enhance the saltiness of a composition containing sodium chloride.

One or more embodiments of the compounds, compositions, food products or methods described herein provide one or more advantages over prior compounds, compositions, food products or methods. For example, food products that include one or more taste modulating or salty taste modulating compounds described herein may have lower sodium content relative to food products that do not include such taste modulating or salty compounds while imparting a similar level of saltiness. This and other advantages will be readily understood from the following detailed description.

BRIEF DESCRIPTION OF THE DRAWINGS

FIG. 1 is a table that provides results of DAP score testing regarding the perception of saltiness of various combinations of compounds in sodium chloride solution.

FIG. 2 is a table that provides results of DAP score testing regarding the perception of saltiness of various combinations of compounds in combination in broth solution.

DETAILED DESCRIPTION

This disclosure describes, among other things, compounds that elicit or enhance the perception of salty taste or another taste associated with consumption of sodium chloride. In embodiments, the compounds are taste modulating compounds used as ingredients in food products to elicit or enhance perception of salty taste. In embodiments, the food products are food products that contain reduced amounts of sodium, while imparting a salty taste typically associated with higher amounts of sodium.

In embodiments, a food product includes (i) a taste modulating or salty taste modulating compound, or derivatives thereof, or (ii) a composition that comprises a taste modulating or salty taste modulating compound, or derivatives thereof. The taste modulating, or salty taste modulating compound may be derived from a natural product, may be synthesized, or may be isolated or purified.

As used herein, a "food product" is a food in a form that does not exist in nature. In embodiments, a food product includes at least two edible ingredients that do not exist together in nature. A "food" is a nutritious substance that animals, including humans, pets and livestock, eat or drink. A "nutritious substance" is a macronutrient such as a fat, carbohydrate or protein, or a micronutrient such as an essential or non-essential vitamin or mineral.

One or more taste modulating or salty taste modulating compounds described herein or derivatives thereof, alone or in combination, may be incorporated into a food product.

The one or more compounds may elicit a perception of saltiness when the food product is consumed. In embodiments, the one or more compounds are included in a food product that contains a salt that imparts a salty taste. Preferably, at least one of the one or more compounds is a taste modulating compound or salty taste modulating compound.

In embodiments, a food product includes an ingredient, a salt that imparts a salty taste, and a taste modulating or salty taste modulating compound. The ingredient may be a nutritious ingredient; that is, an ingredient that is a nutritious substance. The taste modulating or salty taste modulating compound may be present in the food product in an amount sufficient to enhance the salty taste of the food product. In embodiments, the ingredient, the salt and the taste modulating or salty taste modulating compound are present in the food product in amounts or concentrations not found in naturally existing food products, such as bananas, peppers, avocados, wheat, or the like.

In embodiments, at least one of the one or more compounds is a salty taste modulating compound and is present in the food product in an amount or concentration sufficient to elicit or enhance the perception of saltiness. In embodiments, the one or more salty taste modulating compounds are present in the food product in an amount or concentration sufficient to elicit or enhance the perception of salty taste such that less salt may be included in the food product to elicit a similar perception of saltiness as a substantially similar food product that does not include the one or more salty taste modulating compounds. Preferably, the reduced salt food product elicits the same or a similar perception of saltiness as a substantially similar food product that does not include the one or more salty taste modulating compounds.

In embodiments, the one or more taste modulating or salty taste modulating compounds are present in a food product in an amount or concentration sufficient to elicit or enhance the perception of salty taste such that the amount of sodium may be reduced by about 10 mg or more per serving relative to a substantially similar food product that does not have the one or more taste modulating or salty taste modulating compounds while having a similar salty taste. In embodiments, the one or more taste modulating or salty taste modulating compounds are present in a food product in an amount or concentration sufficient to elicit or enhance the perception of salty taste such that the amount of sodium in a serving of a food product may be reduced to about 150 mg or less, more particularly to about 100 mg or less, more particularly to about 75 mg or less, more particularly to about 25 mg or less, more particularly to about 10 mg or less. By way of example, it may be desirable to reduce sodium by about 10 mg or more in cereals or snacks per serving relative to a substantially similar food product that does not have the one or more taste modulating or salty taste modulating compounds while having a similar salty taste. It may be desirable to reduce sodium to about 150 mg or less, more particularly to about 100 mg or less, more particularly to about 75 mg or less, more particularly to about 25 mg or less, more particularly to about 10 mg or less in cereals or snacks per serving. For cereal, a typical serving size is 50 grams. Of course, cereals may have other serving sizes.

In embodiments, the one or more taste modulating or salty taste modulating compounds are present in a food product in an amount or concentration sufficient to elicit or enhance the perception of salty taste such that the amount of sodium may be reduced by about 20 mg or more per serving relative to a substantially similar food product that does not have the one or more taste modulating or salty taste modulating compounds while having a similar salty taste. In embodiments, the one or more taste modulating or salty taste modulating compounds are present in a serving of a food product in an amount or concentration sufficient to elicit or enhance the perception of salty taste such that the amount of sodium may be reduced to about 800 mg or less, more particularly to about 500 mg or less, more particularly to about 300 mg or less, more particularly to about 100 mg or less, more particularly to about 20 mg or less. By way of example, it may be desirable to reduce sodium by about 20 mg or more in meals per serving. It may be desirable to reduce sodium to about 800 mg or less, more particularly to about 500 mg or less, more particularly to about 300 mg or less, more particularly to about 100 mg or less, more particularly to about 20 mg or less in meals per serving.

In embodiments, the one or more taste modulating or salty taste modulating compounds are present in a food product in an amount or concentration sufficient to elicit or enhance the perception of salty taste such that the amount of sodium may be reduced by about 100 mg or more per serving relative to a substantially similar food product that does not have the one or more taste modulating or salty taste modulating compounds while having a similar salty taste. In embodiments, the one or more taste modulating or salty taste modulating compounds are present in a serving of a food product in an amount or concentration sufficient to elicit or enhance the perception of salty taste such that the amount of sodium may be reduced to about 800 mg or less, more particularly to about 500 mg or less, more particularly to about 300 mg or less, more particularly to about 200 mg or less, more particularly to about 100 mg or less relative to a substantially similar food product that does not have the one or more taste modulating or salty taste modulating compounds while having a similar salty taste. By way of example, it may be desirable to reduce sodium by about 100 mg or more in soups per serving. It may be desirable to reduce sodium to about 800 mg or less, more particularly to about 500 mg or less, more particularly to about 300 mg or less, more particularly to about 200 mg or less, more particularly to about 100 mg or less in soups per serving. For soup, a typical serving size is 250 grams. Of course, soups may have other serving sizes.

Any suitable combination of compounds described herein, or derivatives thereof, may be included in a food product. In embodiments, a food product includes a combination of compounds such that the combination includes at least two structurally diverse taste modulating or salty taste modulating compounds.

A food product or composition may include one or more compounds described herein, or derivatives thereof, in any suitable concentration. By way of example, a compound described herein, or a derivate thereof, such as a taste modulating or salty taste modulating compound may be present in a food product at a concentration of about 0.01% by weight or greater, about 2% by weight or less, or from about 0.01% by weight to about 2% by weight. It will be understood that the concentration of the salt or salts in the food product may affect the desired concentration of a taste modulating or salty taste modulating compound. For example, if more salt is present, less taste modulating or salty taste modulating compound may be desired. In addition, it will be understood that the presence of more than one taste modulating or salty taste modulating compound may affect the desired concentration of other taste modulating or salty taste modulating compounds, particularly if the effects of the taste modulating or salty taste modulating compounds are additive or synergistic.

Any salt that imparts a salty taste may be present or incorporated into a food product that contains a bioactive, taste modulating, or salty taste modulating compound. The most commonly used salt for food applications is sodium chloride (typically referred to as common table salt). Other illustrative sources of sodium salts that may be present of incorporated into a food product include sodium phosphates, mono sodium glutamate, sodium nitrite, sodium nitrate, sodium bicarbonate, sodium lactate, sodium citrate, and sodium stearoyl lactylate. Similar lithium, potassium, ammonium or other alkali earth salts may be present or included in addition or as an alternative to one or more sodium salts.

In embodiments, a food product includes sodium chloride as a salt that imparts a salty taste. Sodium chloride may be present in the food product at any suitable amount or concentration. In embodiments, sodium chloride is present in the food product in an amount up to about 10.0 weight percent, more particularly, up to about 5.0 weight percent, even more particularly up to about 1.2 weight percent, or in the range of about 0.017 to about 1.2 weight percent, or about 0.1 to about 1, or about 0.4 to about 0.6 weight percent. In embodiments, a food product that includes one or more bioactive, taste modulating, or salty taste modulating compounds comprises no more than 0.04 weight percent, no more than 0.1 weight percent sodium, no more than 0.2 weight percent, no more than 0.25 weight percent sodium, no more than 0.3 weight percent, no more than 0.4 weight percent, no more than 0.5 weight percent sodium, no more than 0.75 weight percent sodium, no more than 1 weight percent sodium, no more than 5 weight percent sodium, or no more than 10 weight percent sodium. It will be understood that a desired weight percent of sodium may vary depending on the type of food product. For example, it may be desirable for a seasoning to have a higher weight percent sodium than a soup or a breakfast cereal. In embodiments, a food product that includes one or more taste modulating or salty taste modulating compounds comprises no more than 100 mg sodium per serving, no more than 250 mg sodium per serving, no more than 500 mg sodium per serving.

One or more taste modulating or salty taste modulating compounds may be utilized in connection with virtually any food product for which it is desired to elicit or enhance the perception of a salty taste or other taste associated with consumption of a salt. The taste modulating or salty taste modulating compounds can find application for imparting saltiness to beverages or food dishes or as an ingredient in snack foods or other food products in which saltiness is desired.

Examples of food products that may incorporate one or more taste modulating or salty taste modulating compound include a confectionery, a gum, a bakery product, an ice cream, a dairy product, a fruit snack, a chip or crisp, an extruded snack, a tortilla chip or corn chip, a popcorn, a pretzel, a nut, a snack bar, a meal replacement, a ready meal, a soup, a pasta, a canned food, a frozen processed food, a dried processed food, an instant noodle, a chilled processed food, an oil or fat, a sauce dressing or condiment, a dip, a pickled product, a seasoning, a baby food, a spread, a chip or a crisp such as chips or crisps comprising potato, corn, rice, vegetable (including raw, pickled, cooked and dried vegetables), a fruit, a grain, a soup, a seasoning, a baked product such as a ready-to-eat breakfast cereal, hot cereal or dough, an ice cream such as a frozen yogurt, a dairy products such as a yogurt or cheese, ready meal, a soup, a pasta, a canned food, a frozen processed food, a dried processed food, an instant noodle, or a chilled processed food, a beverage including beverages that include fiber or protein a meat or a meat substitute, a pet food, an animal product, a medical food, a nutritional supplement, a vitamin supplement, and an infant formula product.

In embodiments, one or more bioactive, taste modulating, or salty taste modulating compounds are incorporated into a medicinal or pharmaceutical product, or the like.

In embodiments, a food product is a processed food product. Food processing includes the transformation of raw ingredients into food or transforming forms of food into other forms of food. Food processing often includes using harvested crops or animal products to produce marketable products sold to consumers at stores, restaurants and the like. Processed food products include products for which additional processing by a consumer occurs after purchase but prior to consumption (e.g., heating, cooking, baking, or the like).

Particularly suitable food products including soup, meal kits, grain products such as ready-to-eat cereals, snacks, bars and baked dough, and dairy products such as ice cream, yogurt and cheese. In some aspects, a bioactive, taste modulating, or salty taste modulating compound is used to reduce the amount of sodium salt that is typically included in soups, including (but not limited to) chicken or poultry broth, chicken- or poultry-based soups (such as chicken noodle soup), tomato-based soups, and the like. In some aspects, a taste modulating or salty taste modulating compound is used to reduce sodium salt in meal kits, such as kits that include ingredients to be combined with meat to prepare a meal. Such meal kits can include dried components (such as noodles, rice, dried potatoes, or the like) and seasoning packages. In some aspects, a taste modulating or salty taste modulating compound is used to reduce the sodium chloride that is typically added to a snack food to enhance its flavor. Exemplary snack foods include potato chips, corn chips, pretzels, fruit-type snacks, and snack mixes including any mixes of any of these foods with other ingredients (such as cereals).

In some aspects, a taste modulating or salty taste modulating compound is used to reduce the amount of sodium salt that is typically included in a ready-to-eat cereal or other grain-based food products, such as dough, baked goods, grain snacks, grain bars, or the like. In some aspects, a taste modulating or salty taste modulating compound is used to reduce the amount of sodium salt that is typically included in dairy-based food products, such as fresh or frozen dairy products, which may include yogurt, ice cream, or the like. In some aspects, a taste modulating or salty taste modulating compound is used to reduce the amount of sodium salt that is typically included in packaged meal food products, such as packaged meals that contain rice, potatoes, or vegetables, dry packaged meals, frozen packaged meals, or the like.

For the purposes of the present disclosure "grain" includes grain and pseudograin. Examples of food grains include corn; sorghum; fonio; millet such as pearl millet, proso millet, finger millet, foxtail millet, Japanese millet, kodo millet and the like; Job's tears; wheat; rice; rye; barley; oat; triticale; wild rice; teff; amaranth; quinoa; buckwheat; and the like.

A taste modulating or salty taste modulating compound can also be used in connection with soup, broth, sauce (such as basting sauce), various seasoning sauces, ketchup, dressings, and other like foods.

In embodiments, a food product into which a taste modulating or salty taste modulating compound or composition is included has a water content of about 30% or more by weight. For example, the food product may have a water content of about 35% or more, or about 40% or more by weight. Non-limiting examples of food products that typically have water contents of about 30% or more by weight include soups, beverages, batters and dough.

In embodiments, a food product into which a taste modulating or salty taste modulating compound or composition is included has a water content of about 50% or more by weight. For example, the food product may have a water content of about 60% or more, or about 70% or more by weight. Non-limiting examples of food products that typically have water contents of about 50% or more by weight include soups and beverages. For example, a soup containing a taste modulating or salty taste modulating compound or composition may contain from about 50% water by weight to about 90% water by weight.

In embodiments, a food product into which a taste modulating or salty taste modulating composition is included has a water content of about 20% or less by weight. For example, the food product may be incorporated into dry food products that having low water contents. In embodiments, a taste modulating or salty taste modulating food product is included in a dried for as a seasoning. In embodiments, the seasoning comprises, consists essentially of, or consists of one or more taste modulating or salty taste modulating compounds, one or more carriers, and one or more salts.

A taste modulating or salty taste modulating compound can be employed to elicit the perception of salty taste or enhance the perceived salt taste of any salts used in food or beverage products. The preferred salt taste to be elicited or enhanced by the salty compounds is that of sodium chloride.

Moreover, a taste modulating or salty taste modulating compound described herein can be used to elicit or enhance the perceived salt taste of known salty tasting compounds that may be used as salt substitutes. Such compounds include amino acids such as cationic amino acids and low molecular weight peptides such as dipeptides and tripeptides. Specific examples of these compounds include arginine hydrochloride, lysine hydrochloride, and lysine-omithine hydrochloride. These compounds exhibit a salty taste but are typically useful only at low concentrations since they exhibit a bitter flavor at higher concentrations. Ordinarily, these salt-tasting compounds will be used in concentrations in the range of about 1 to about 40 mM, or about 10 to about 30 mM. Thus, it is feasible to reduce the sodium chloride content of a food or beverage product by first formulating a food or beverage with less sodium chloride than is necessary to achieve a desired salt taste and then adding to the food or beverage a taste modulating or salty taste modulating compound described herein in an amount sufficient to enhance the salt taste of the salted food or beverage to reach the desired taste. In addition, sodium chloride content may be further reduced by substituting a salt-tasting cationic amino acid, a low molecular eight dipeptide, or mixtures thereof, for at least a portion of the salt.

In embodiments, a method includes setting a target salty taste of a food product, including an amount of a salt that imparts a salty taste in the food product, where the amount of the salt does not achieve the target level of salty taste, and including an amount of a salty taste enhancing compound (or more than one salty taste enhancing compounds) to achieve the desired salty taste.

In embodiments, a method includes setting a target salty taste of a food product, including an amount of a salty-taste imparting sodium salt in the food product that does not achieve the target level of salty taste, including an amount of a non-sodium salt that imparts a salty taste and an amount of a salty taste enhancing compound (or more than one salty taste enhancing compounds) to achieve the desired salty taste.

Processing

A taste modulating or salty taste modulating compound, or derivative thereof, described herein can be added to food products in dry or liquid form. For example, a taste modulating or salty taste modulating compound that is in the liquid form can be prepared by simply dissolving or suspending the compound in an appropriate relative amount in an aqueous liquid. Useful aqueous liquids include water, alcohol-water mixtures, triacetin, propylene glycol, and triglycerides and other known organic solvents. Depending upon the concentration of the taste modulating or salty taste modulating compound, it can be desirable to heat the mixture to dissolve the compound.

Taste modulating or salty taste modulating compounds that exist in a dry state, such as powders or granules, can be prepared by either mixing or blending the compounds with other components in the dry state. The dry blending or mixing can be carried out in any conventional suitable apparatus. In some aspects, the taste modulating or salty taste modulating compounds described herein can be prepared into dry compositions by commonly used methods of granulation from mixtures of the several ingredients, preferably initially conveniently smaller than forty mesh. Such starting mixtures can be wetted in known manner, granulated, and their granulations dried as usual and screened to give a product approximately the typical size of common table salt, for example, by taking the fraction passing through the thirty mesh screen and retained on the forty mesh screen.

Taste modulating or salty taste modulating compounds that exist in a dry composition state can be alternatively prepared by first forming a solution, emulsion or suspension of the compounds and other individual components, and then extruding or drying the solution or suspension. The preparation of the solution or suspension of the components can be carried out as described above in the context of preparing the liquid flavoring agents. The thus-prepared solution, emulsion or suspension can then be dried using any conventional suitable apparatus, such as a rotary drier, a drum drier, or a fluidized bed drier or spray drier.

Taste modulating or salty taste modulating compounds described herein can be prepared by thoroughly mixing the compounds with other components in the indicated proportions until a suitably mixed (for example, homogeneous) product is attained.

Compositions or formulations containing the taste modulating or salty taste modulating compounds can then be combined with a food product.

Perception of Saltiness

In embodiments, a composition that includes a salty taste modulating compound is perceived as imparting a quantity of saltiness equal to a substantially similar composition that does not include the salty taste modulating compound but that has a higher concentration of the salt. Preferably, the composition that includes the salty taste modulating compound imparts a perception of saltiness equal to the substantially similar composition that does not have the salty taste modulating compound when the composition has less salt than the substantially similar composition (e.g., salt reduced by about 1% or more). For example, the composition that includes the salty taste modulating compound may impart a perception of saltiness equal to the substantially similar composition that does not have the salty compound when the composition that includes the salty taste modulating compound has a salt concentration reduced by about 2% or more, about 5% or more, about 7% or more, about 8% or more, about 9% or more, about 10% or more, about 11% or more, about 15% or more, about 20% or more, about 30% or more, about 35% or more, about 40% or more, or about 50% or more, relative to the substantially similar composition. In embodiments, one or more salty taste modulating compounds may be present in a food product in an amount sufficient to reduce the amount of a salt, such as sodium chloride, by about 1% or more, about 2% or more, about 5% or more, about 7% or more, about 8% or more, about 10% or more, about 11% or more, about 12% or more, about 15% or more, about 20% or more, about 22% or more, about 25% or more, about 30% or more, about 35% or more, about 40% or more, about 45% or more, about 50% or more, about 55% or more, about 60% or more, about 65% or more, about 70% or more, about 75% or more, about 80% or more, about 85% or more, about 90% or more, about 95% or more, or the like. Preferably, the reduced salt food product elicits the same or similar perception of saltiness as a substantially similar food product that does not include the one or more salty taste modulating compounds.

Perception of saltiness may be evaluated in any suitable manner. In embodiments, saltiness is determined by a trained analytical sensory panel. In embodiments, the trained sensory panel determines the saltiness of a composition having a salty taste modulating compound relative to a substantially similar composition having increased sodium chloride content.

Sensory panelists may be trained in any suitable manner. Preferably, the panelists are trained to discern salty taste or other attributes without reference to liking or acceptability. The panelists are also preferably trained to accurately quantify salty taste or other attributes according to an intensity scale. General information that may be helpful in understanding beneficial training protocols can be found in, for example, Sensory Evaluation Techniques, 4$^{th}$ Ed by Meilgaard M., Civille G. V. and Carr B. T (2007), CRC Press, pages 147-152. Prescreening, selection, and training of panelists may be occur as described in one or more standards, such as Hootman R C, Manual 13 MNL13 Manual on Descriptive Analysis Testing for Sensory Evaluation, ASTM (1992); STP758 Guidelines for the Selection and Training of Sensory Panel Members, ASTM (1981); and Munoz A. M and Civille, G. V., MLN13: The Spectrum Descriptive Analysis Method, ASTM (1992). Preferably panelists are trained according to the Spectrum Method (Munoz A. M and Civille, G. V., MLN13: The Spectrum Descriptive Analysis Method, ASTM 1992).

Preferably, average scores regarding saltiness from more than one panelist trained to discern salty taste or other attributes using the same training are considered in determining whether a reduced salt food product elicits the same or similar perception of saltiness as a substantially similar food product that does not include the one or more salty taste modulating compounds. For example, a panel may contain three or more trained panelists, 5 or more trained panelists, 7 or more trained panelists, 10 or more trained panelists, or the like.

A taste modulating or a salty taste modulating compound may be a compound that directly acts to elicit or enhance the perception of salty taste of a salt or may be a compound that is converted, when ingested, into a compound that directly acts to elicit enhance the perception of salty taste of the salt.

Taste Modulating, and Salty Taste Modulating Compounds

A variety of naturally-derived compounds were tested in vitro for their ability to activate or facilitate activation of a TrpML3 channel, a TrpV1 channel or an ENaC channel.

The TrpML3 (transient receptor potential cation channel, mucolipin subfamily, member 3) channel, also known as Mucolipin-3 is a protein that, in humans, is encoded by the MCOLN3 gene. The TrpV1 (transient receptor potential cation channel subfamily V member 1) channel, also known as the capsaicin receptor and the vanilloid receptor 1, is a protein that, in humans, is encoded by the TrpV1 gene. The ENaC (epithelial sodium channel), also known as sodium channel non-neuronal 1 (SCNN1) or amiloride sensitive sodium channel (ASSC) is a membrane-bound ion-channel that is permeable for Li+-ions, protons and especially Na+-ions.

Any compound that interacts with one or more of the TrpML3 channel, the TrpV1 channel and the ENaC channel may be useful for modulating taste or saltiness of a food product into which the compound is incorporated.

It is estimated that natural products, extracts, and isolated compounds that collectively contained about 2,000,000 potential taste modulating or salty taste modulating compounds were tested for sodium channel activity. About 600 of the 2,000,000 compounds had some level of sodium channel activity. About 300 of the 600 compounds had an increased threshold level of activity. Further analysis, including structure based toxicological analysis, resulted in 99 initial compounds being selected as candidates for taste modulating or salty taste modulating compounds. Presented herein are naturally-derived compounds and compound classes that have been identified as acting at one or more of these channels, or that otherwise may function as bioactive, taste modulating, or salty taste modulating compounds.

A listing of the 99 initially selected compounds (Cmpd), as well as the common names (where known), Chemical Abstract Service (CAS) Registry numbers where known (CAS-RN), Sources/Taxons (where known) from which the compounds were isolated (Source/Taxon) and common name of the sources (Common Name), is presented in Table 1 below. The structures of the compounds are also presented herein. To the extent the structures conflict with other information provided, the structures of the 99 initially selected compounds should be considered determinative.

TABLE 1

| | | Information regarding initially selected compounds | | |
|---|---|---|---|---|
| Cmpd | CAS-RN | Common name | Source/Taxon | Common Name |
| 1 | 104264-55-3 | 12-Gingerol | Zingiber officinalis | Ginger |
| 2 | 36752-54-2 | [10]-Shogaol | Zingiber officinalis | Ginger |
| 3 | 143615-75-2 | [6]-Gingerdiacetate | Zingiber officinalis | Ginger |
| 4 | 555-66-8 | 6-Shogaol | Aframomum meleguata, Zingiber officinalis | Grains of paradise; Ginger |

TABLE 1-continued

Information regarding initially selected compounds

| Cmpd | CAS-RN | Common name | Source/Taxon | Common Name |
|---|---|---|---|---|
| 5 | 39886-76-5 | [6]-Gingerol | *Zingiber officinalis* | Ginger |
| 6 | 53172-04-6 | [7]-Paradol | *Aframomum meleguata, Zingiber officinalis* | Grains of paradise; Ginger |
| 7 | 27113-22-0 | [6]-Paradol or [6]-Gingerone | *Aframomum meleguata, Zingiber officinalis* | Grains of paradise; Ginger |
| 8 | 626200-64-4 | 5-methoxy-[6]-Gingerol | *Aframomum meleguata, Zingiber officinalis* | Grains of paradise; Ginger |
| 9 | 23513-08-8 | 8-Gingerol | *Zingiber officinalis* | Ginger |
| 10 | 1083195-12-3 | a pentadecatrienyl-1,3-benzenediol | *Embelia ribes* | False Black Pepper, white-flowered Embelia |
| 11 | 79559-60-7 | a 1-Ph-4-hepten-3-one | *Kaempferia galanga* | Kencur, aromatic ginger, sand ginger, cutcherry, resurrection lily |
| 12 | 79559-61-8 | a 1-Ph-5-OH-3-heptanone | *Kaempferia galanga* | Kencur, aromatic ginger, sand ginger, cutcherry, resurrection lily |
| 13 | 205687-01-0 | Capsiate | Capsiate | |
| 14 | 147030-09-9 | Pipersintenamide | *Piper longum* | Long pepper, Indian long pepper |
| 15 | 55038-30-7 | Guineensine | *Piper longum* | Long pepper, Indian long pepper |
| 16 | 182056-19-5 | | *Evodia rutaecarpa* | Evodia fruit |
| 17 | 15266-38-3 | Evocarpine | *Evodia rutaecarpa* | Evodia fruit |
| 18 | 94-62-2 | Piperine | *Piper longum* | Long pepper, Indian long pepper |
| 19 | 52483-20-2 | Irisresorcinol | *Ardisia silvestris* | |
| 20 | 79559-61-8 | a 1-Ph-5-OH-3-heptanone | *Alpinia officinarum* | Lesser galangal (ginger family) |
| 21 | 19408-84-5 | Dihydrocapsaicin | *Capsicum annuum* | Serrano pepper |
| 22 | 30511-77-4 | Isochavicine | *Piper longum, Piper nigrum* | Long pepper, Indian long pepper; black pepper |
| 23 | 517-73-7 | Melicopicine | *Teclea trichocarpa* | |
| 24 | | | *Zanthoxylum esquirolii* | |
| 25 | 41303-25-7 | O-Methylglycosolone | *Zanthoxylum esquirolii* | |
| 26 | 5307-59-5 | Robustic acid | *Derris robusta* | |
| 27 | 84-99-1 | Xanthoxyletin | *Toddalia asiatica; Millettia pulchra* | Orange climber |
| 28 | 4335-12-0 | Toddaculin | *Toddalia asiatica* | Orange climber |
| 29 | 351427-18-4 | Vitetrifolin D | *Vitex agnus* | Vitex, Chaste Tree, Chasteberry, Abraham's Balm, Monk's Pepper |
| 30 | 61263-52-3 | | *Vitex agnus* | Vitex, Chaste Tree, Chasteberry, Abraham's Balm, Monk's Pepper |
| 31 | 465-92-9 | Marrubin | *Marrubium vulgare* | White Horehound, Common Horehound |
| 32 | 238088-78-3 | Orthosiphol I | *Orthosiphon stamineus* | Cat whiskers |
| 33 | 345905-36-4 | Orthosiphol M | *Orthosiphon stamineus* | Cat whiskers |
| 34 | 254896-53-2 | Aesculioside A | *Aesculus hippocastaneum* | Horse-chestnut, conker tree |
| 35 | | | *Gleditschia australis* | Locust tree |
| 36 | 1383715-41-0 | | *Pithecoctenium echinatum* | Monkey comb |
| 37 | | | *Yucca gloriosa* | Spanish dagger |
| 38 | | | *Nephelium cuspidatum* | Bayong |
| 39 | 20874-52-6 | Saikosaponin D | *Bupleurum falcatum* | Chinese throroughwax; Sickle hare's ear |
| 40 | 1217879-76-9 | a 3-benzofurancarboxylic ester | *Salvia miltiorrhiza* | Red sage, Chinese sage, tan shen, or danshen |
| 41 | 27994-11-2 | Cimigoside; b-D-Xylopyranoside | *Cimicifuga racemosa* | Black cohosh, black bugbane, black snakeroot, fairy candle |
| 42 | 4373-41-5 | Maslinic acid, Crategolic acid | *Alchemilla xanthochlora* | Lady's Mantle |

TABLE 1-continued

Information regarding initially selected compounds

| Cmpd | CAS-RN | Common name | Source/Taxon | Common Name |
|---|---|---|---|---|
| 43 | 77-52-1 | Ursolic acid | *Lavandula officinalis* | Lavender, English lavender, common lavender, true lavender, narrow-leaved lavender |
| 44 | 58546-54-6 | Schizandrol B; Gomisin A | *Schisandra chinensis* | Five flavor berry |
| 45 | 61281-38-7 | Schisandrin A, Deoxyschizandrin | *Schisandra chinensis* | Five flavor berry |
| 46 | 61281-37-6 | Schizandrin B | *Schisandra chinensis* | Five flavor berry |
| 47 | 102036-29-3 | Protosappanin B | | |
| 48 | 129102-89-2 | Secoisolariciresinol; Secoisolariciresin-4-yl b-D-glucopyranoside | *Angelica archangelica* | Garden Angelica, Holy Ghost, Wild Celery, Norwegian angelica |
| 49 | 66322-34-7 | Dihydrogualaretic acid | *Schisandra chinensis* | Five flavor berry |
| 50 | 193816-85-2 | Epicalyxin C | *Alpinia katsumadai* | Greater galangal |
| 51 | 181490-70-0 | Icariin | *Angelica sinensis* | dong quai or female ginseng |
| 52 | 446030-43-9 | Myrrhanone B | *Commiphora mukul* | Guggul, Indian Bdellium |
| 53 | 936499-55-7 | Brevifolin | *Zanthoxylum piperitum* | Japanese pepper, Japanese pricklyash |
| 54 | 1083202-45-2 | | Fungus | Strain code: 01469fxxx000005 |
| 55 | | | *Erythrina variegata* | Tiger's claw or Indian coral tree |
| 56 | 155485-76-0 | Senecrassidiol | *Psidium guajava* | Apple guava or common guava |
| 57 | 84-26-4 | Rutaecarpine | *Evodia rutaecarpa* | Evodia fruit |
| 58 | 992-20-1 | Salannin | *Azadirachta indica* | Neem, Nimtree and Indian Lilac |
| 59 | 69222-20-4 | Isoanthricin | *Podophyllum peltatum* | May Apple, hogapple, Indian apple, mayflower, umbrella plant, wild mandrake, American mandrake |
| 60 | 850494-43-8 | Mammea A/AD cyclo F | *Mesua ferrea* | Ceylon ironwood, Indian rose chestnut, or Cobra's saffron |
| 61 | 7282-19-1 | Atanine | *Zanthoxylum piperitum* | Japanese pepper, Japanese pricklyash |
| 62 | 484-20-8 | Bergapten | *Petroselinum stativum* | Parsley |
| 63 | 133164-11-1 | Prangol | *Petroselinum stativum* | Parsley |
| 64 | 482-44-0 | Imperatorin | *Petroselinum stativum* | Parsley |
| 65 | 2543-94-4 | Phellopterin | *Petroselinum stativum* | Parsley |
| 66 | 497226-80-9 | terpenoid coumarins | *Ferula assa-foetida* | Giant fennel, asant, food of the gods, jowani badian, stinking gum, Devil's dung |
| 67 | 484-33-3 | Pongamol | *Millettia pulchra* | |
| 68 | | | artificial | |
| 69 | 1176891-50-1 | Sakisacaulon A | Lichen | |
| 70 | 1268481-32-8 | Chalepin | | |
| 71 | 1092383-76-0 | Rutamarin | | |
| 72 | 13164-03-9 | Halepensin | | |
| 73 | 143-62-4 | Digitoxigenin | *Xysmalobium undulatum* | Uzara |
| 74 | 26241-51-0 | Azadiradione | *Azadirachta indica* | Neem, Nimtree, Indian Lilac |
| 75 | 95975-55-6 | (Z)-Guggulsterone | *Commiphora mukul* | Guggul, Indian Bdellium |
| 76 | 1941-73-7 | Apobioside | *Apocynum cannabinum* | Dogbane, Amy Root, Hemp Dogbane, Indian Hemp, Rheumatism Root, Wild Cotton |

TABLE 1-continued

Information regarding initially selected compounds

| Cmpd | CAS-RN | Common name | Source/Taxon | Common Name |
| --- | --- | --- | --- | --- |
| 77 | 3751-87-9 | Apocannoside | *Apocynum cannabinum* | Dogbane, Amy Root, Hemp Dogbane, Indian Hemp, Rheumatism Root, Wild Cotton |
| 78 | 86894-26-0 | Hebelomic acid A methyl ester | *Hebeloma senescens* | mushroom |
| 79 | 2221-82-1 | β-Cyclocostunolide | *Critonia morifolia* | |
| 80a | 546-43-0 | Alantolactone | *Inula helenium* | Elecampane, horse-heal, marchalan |
| 80b | 470-17-7 | Isoalantolactone | *Inula helenium* | Elecampane, horse-heal, marchalan |
| 81 | | a 2-octenyl-3-hydroxy-1,5-pentanedioic acid | Fungus | Strain code 02295fxxx000001 |
| 82 | 83797-45-9 | 16-Heptadecene-1,2,4-triol; Avocadene | *Persea gratissima* | Avocado |
| 83 | 1356361-43-7 | 16-Heptadecene-1,2,4-triol, 1,4-diacetate | *Persea gratissima* | Avocado |
| 84 | 16423-52-2 | N-Decyl acetamide | Bacteria | Strain code 0172axxx000002 |
| 85 | 21402-68-6 | 9-hydroxy-10,12,15-Octadecatrienoic acid | *Marrubium vulgare* | White Horehound, Common Horehound |
| 86 | 167936-49-4 | 12-hydroxy-9,13,15-Octadecatrienoic acid | *Petroselinum stativum* | Parsley |
| 87 | | | *Ricinus communis* | Castor oil plant |
| 88 | 15514-85-9 | Dimorphecolic acid | *Podophyllum peltatum* | May Apple, hogapple, Indian apple, mayflower, umbrella plant, wild mandrake, American mandrake |
| 89 | 463-40-1 | Linolenic acid | *Mesua ferrea* | Ceylon ironwood, Indian rose chestnut, Cobra's saffron |
| 90 | 35949-86-1 | Gingerglycolipid C | *Zingiber officinalis* | Ginger |
| 91 | 187218-23-1 | Capsianoside E | *Capsicum annuum* | Serrano pepper |
| 92 | 131580-15-9 | Capsianoside D | *Capsicum annuum* | Serrano pepper |
| 93 | 22338-69-8 | Grandifloric acid | *Aralia cordata*, *Espeletia* spp. | Spikenard, udo |
| 94 | 6619-97-2 | Xylopic acid | *Xylopia aethiopica* | Bitterwood |
| 95 | 32381-03-6 | Angeloylgrandifloric acid | *Sideritis hirsuta* | Hairy ironwort |
| 96 | 482-00-8 | Lanceolatin B | | |
| 97 | 101140-06-1 | Biapigenin | *Fagopyrum esculentum*, *Hypericum perforatum* | |
| 98 | 64125-32-2 | | *Millettia pulchra* | |
| 99 | 36640-12-7 | | Lichen | |

Compounds 12 and 20 are the same compound isolated from different sources.

The CAS registry numbers presented in Table 1 above reflect a compound or an isomer thereof. It will be understood that other isomers may have other CAS registry numbers. Further, the structures presented herein, to the extent that they show stereochemistry may not match the particular isomer of the CAS registry number presented in Table 1.

Those compounds for which no CAS registry numbers are provided in Table 1, as well as those for which registry numbers are provided, may be isolated or purified in any suitable manner. For example, the natural source of the compound, which is presented in Table 1, may be fractionated and the fractions subjected to chromatography, such as gas chromatography or HPLC, or other suitable separation process to isolate or purify the compound. The selection of, for example, a chromatography column and parameters can be readily identified based on the chemical structure of the compound. To facilitate isolation or purification or for verification, obtained fractions, subfractions, or individual compounds may be tested for ability to activate a sodium channel, for example, expressed in cells in culture, cell membrane, or the like and employing an appropriate assay, such as an electrophysiological assay, a colorimetric assay, or the like.

Alternatively or in addition, the compounds listed in Table 1 may be synthesized. Alternatively or in addition, companies that have access to the appropriate natural sources or the ability to test for sodium channel activity may be contracted to isolate the compounds. Companies that have access to natural products or natural product libraries that may include sources presented in Table 1 or that have expertise in development of assays for identification of compounds or fractions containing compounds capable of activating a sodium channel include Biotechnology Research And Information Network AG (Zwingengerg, Germany); AnalytiCon Discovery, GmbH (Potsdam, Germany); Albany Molecular Research, Inc. (Albany, N.Y., USA); Axxam SpA (Milan, Italy); Boulder BioPharmaceuticals, LLC, Boulder, Colo.; ChromaDex (Irvine, Calif., USA); Enzo Life Sciences, Inc. (Farmingdale, N.Y., USA); IMD Natural Solutions GmbH (Dortmund, Germany); TimTec LLC (Newark, Del., USA); and The Natural Products Discovery Institute (Doylestown, Pa., USA). The structures of the initially selected compounds are as follows:

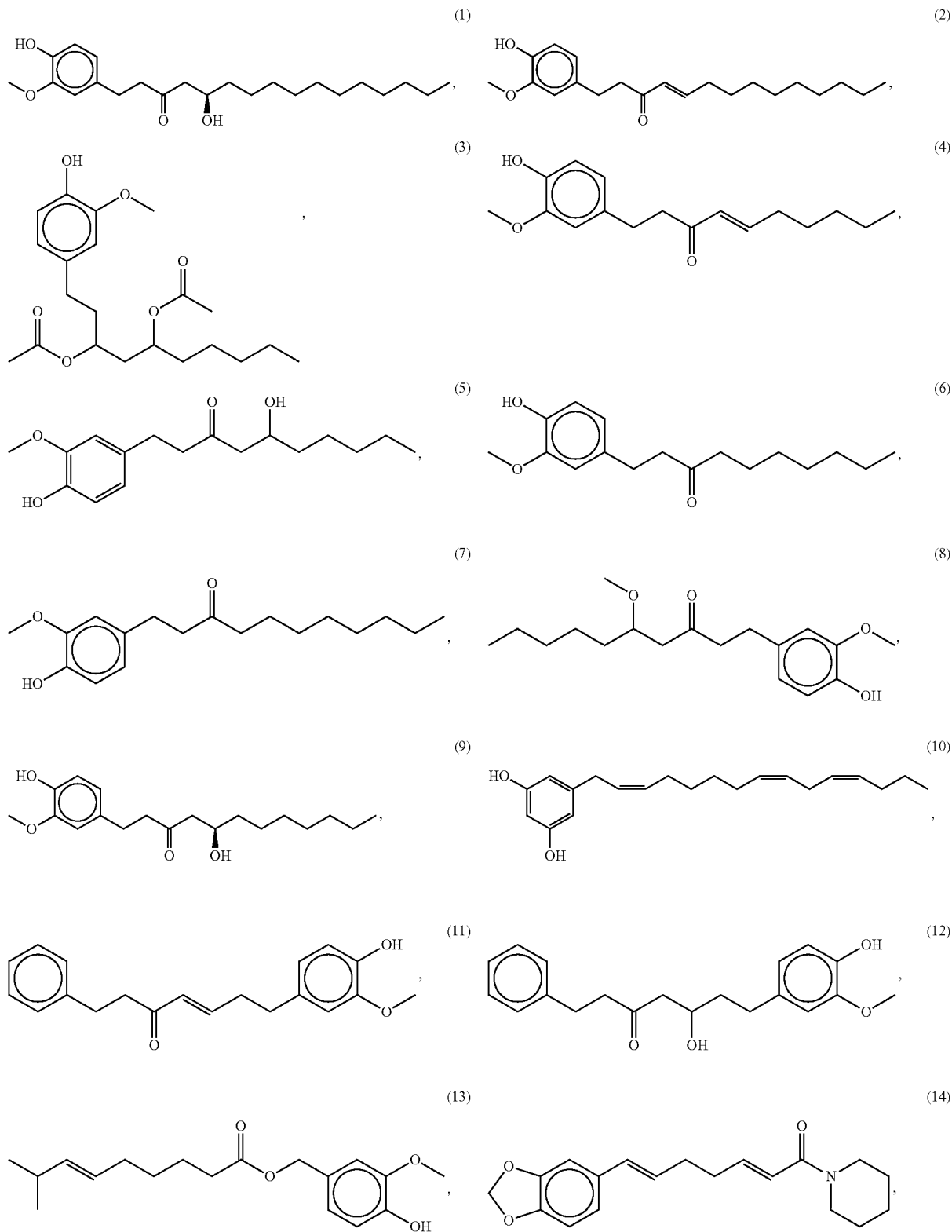

-continued
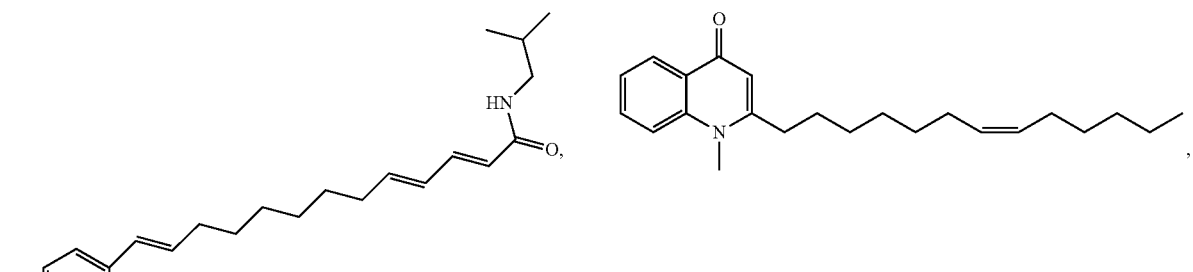
(15) (16)
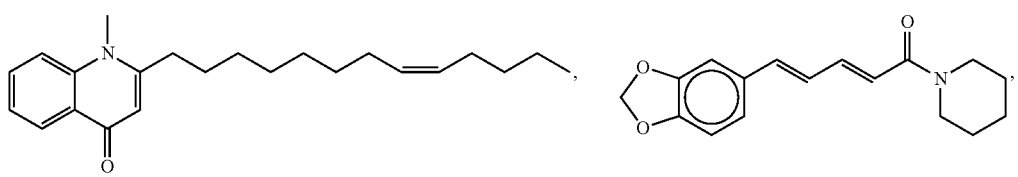
(17) (18)
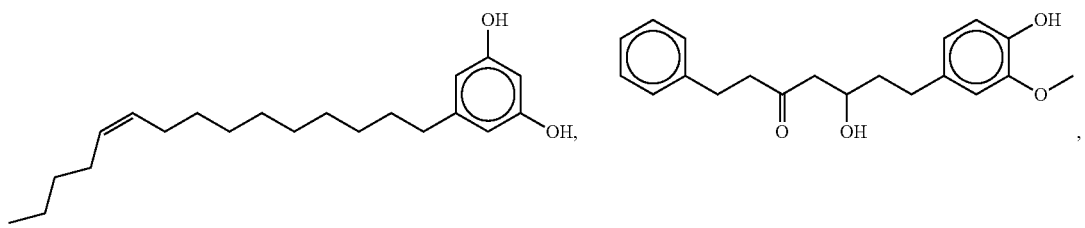
(19) (20)
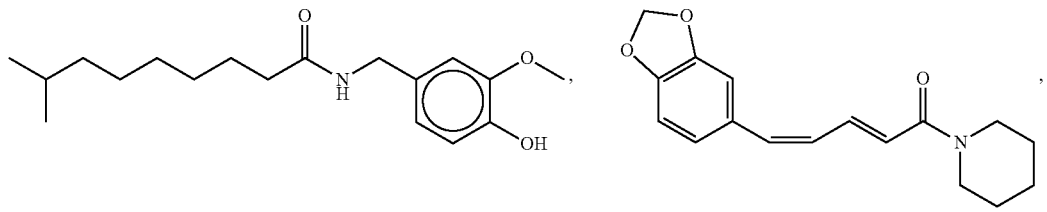
(21) (22)
(23) (24)
(25) (26)

-continued
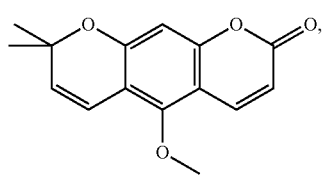 (27)
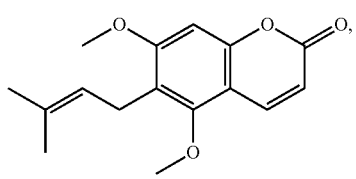 (28)
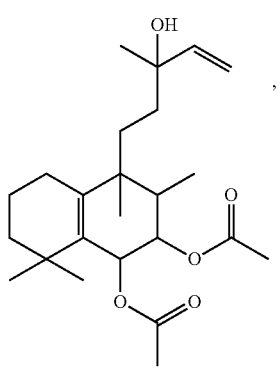 (29)
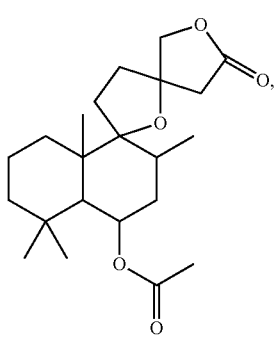 (30)
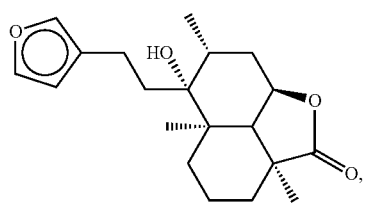 (31)
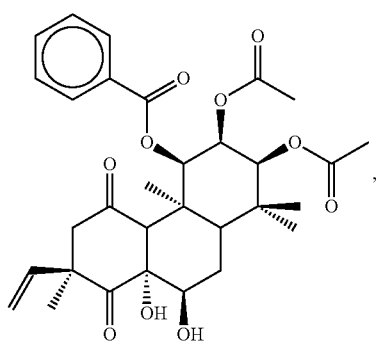 (32)
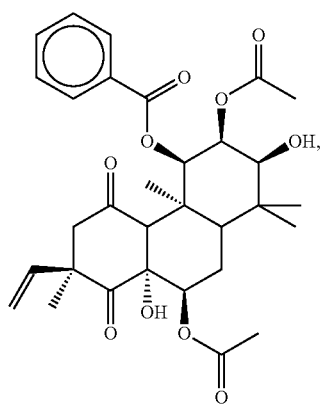 (33)

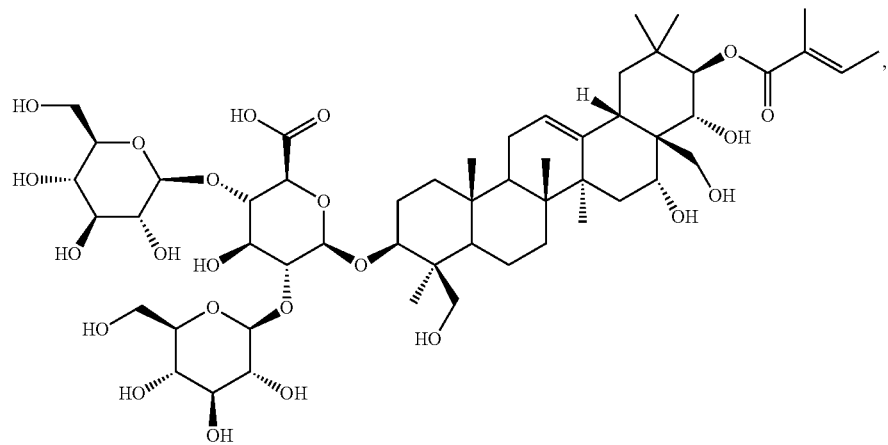
(34)
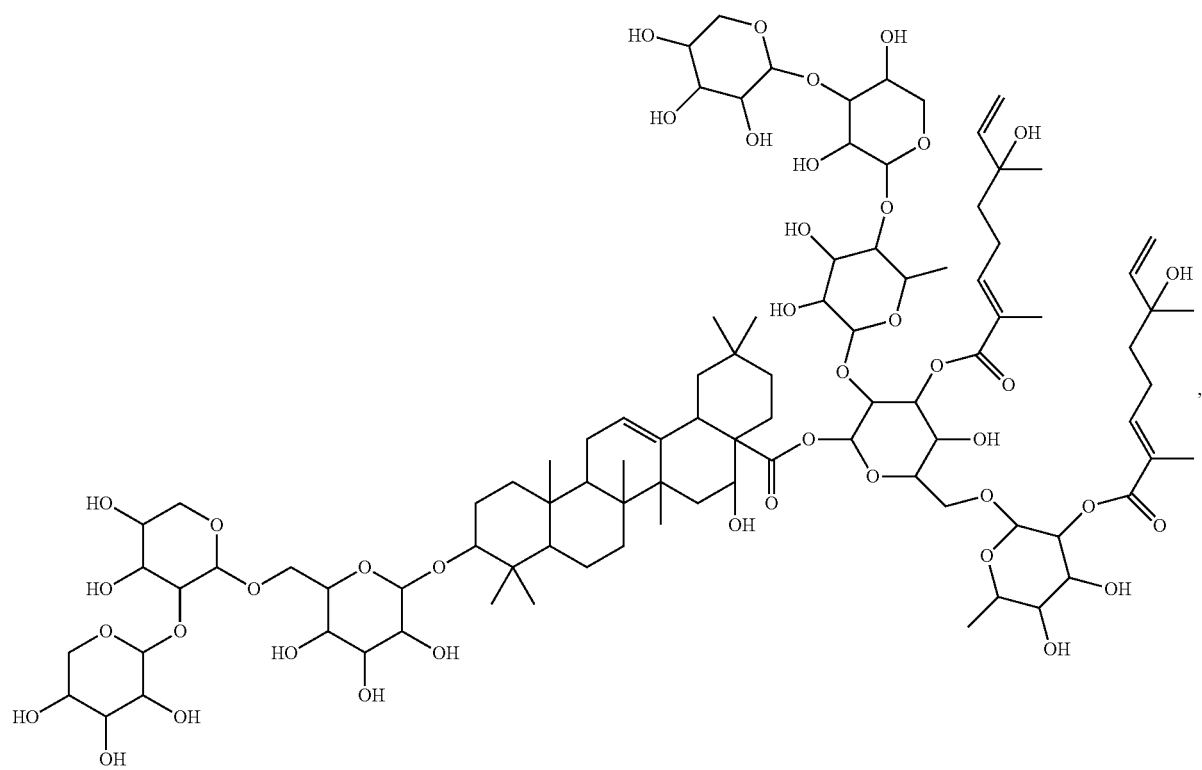
(35)

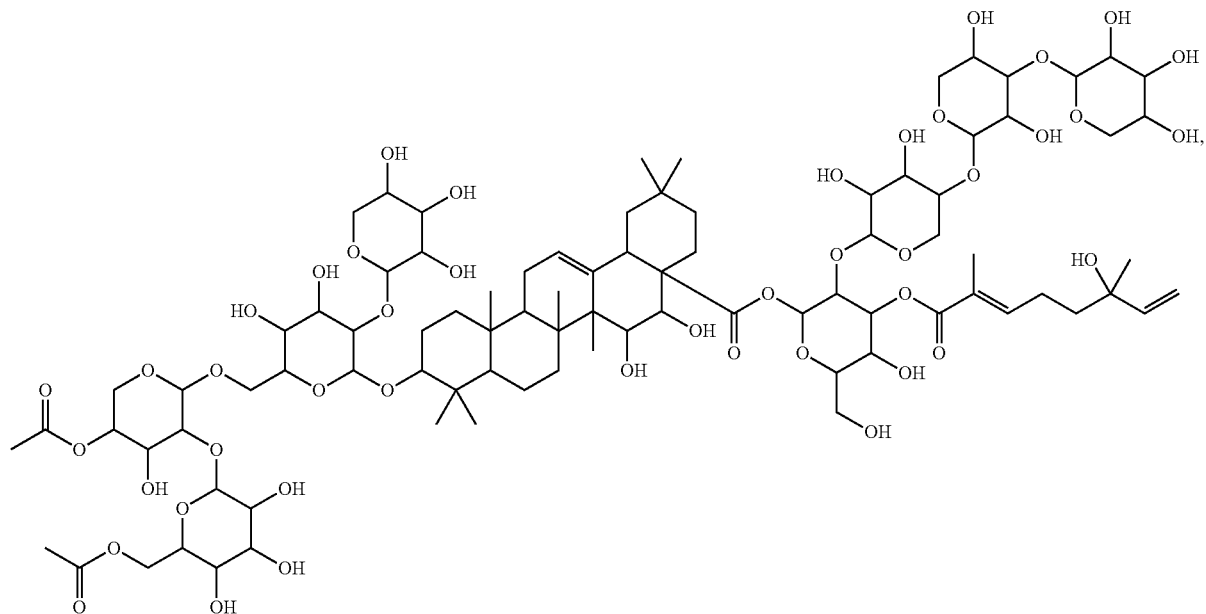
(36)
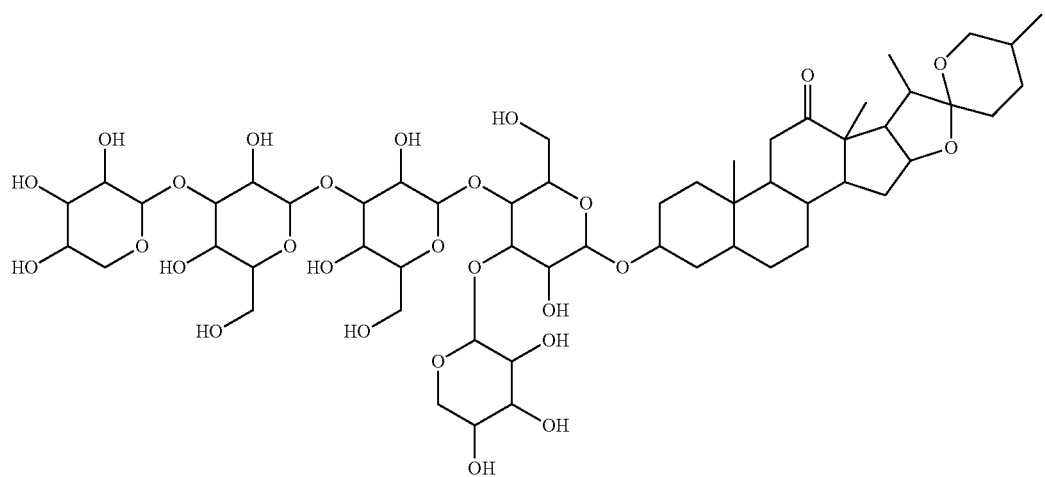
(37)
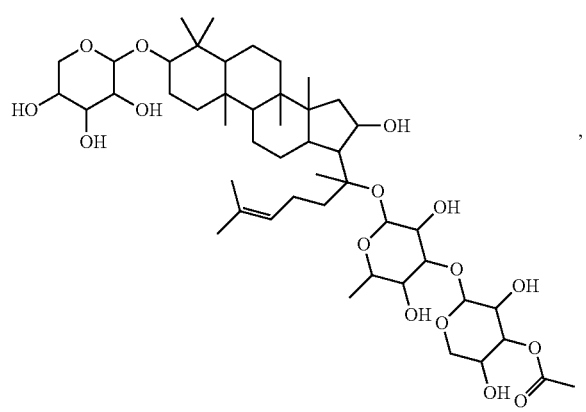
(38)
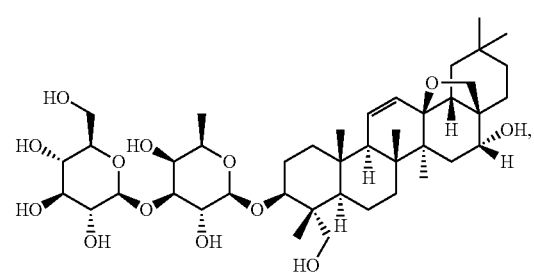
(39)

-continued
(40)
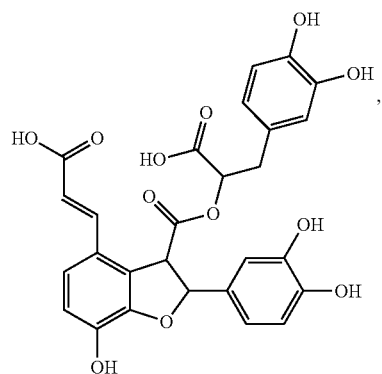
(41)
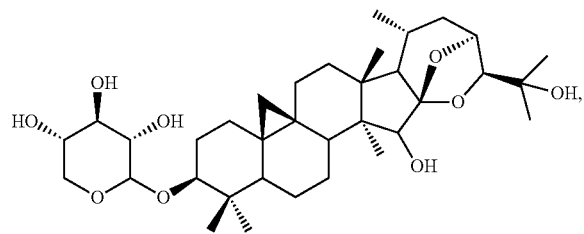
(42)
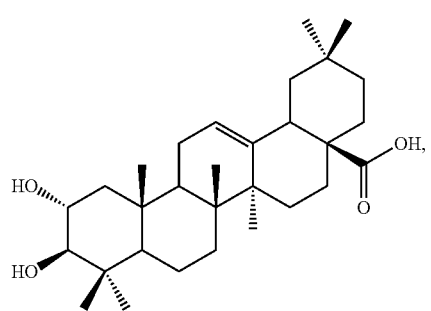
(43)
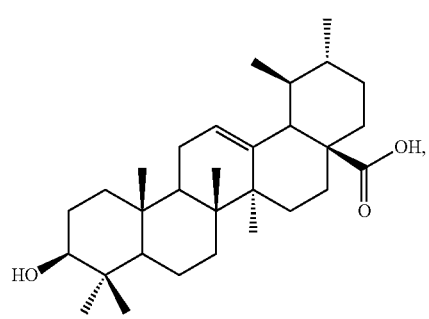
(44)
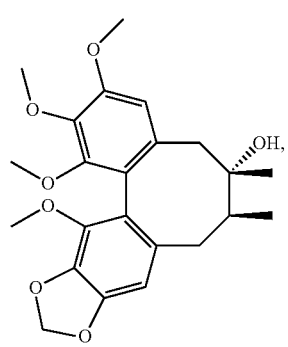
(45)
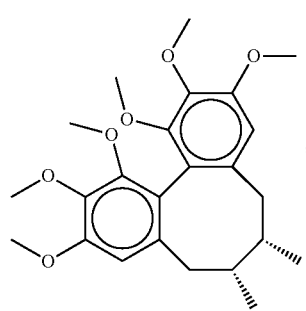
(46)
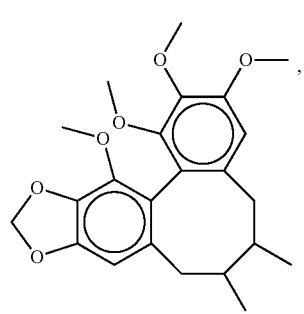
(47)
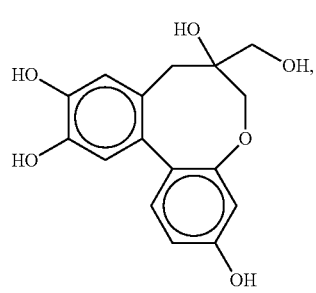

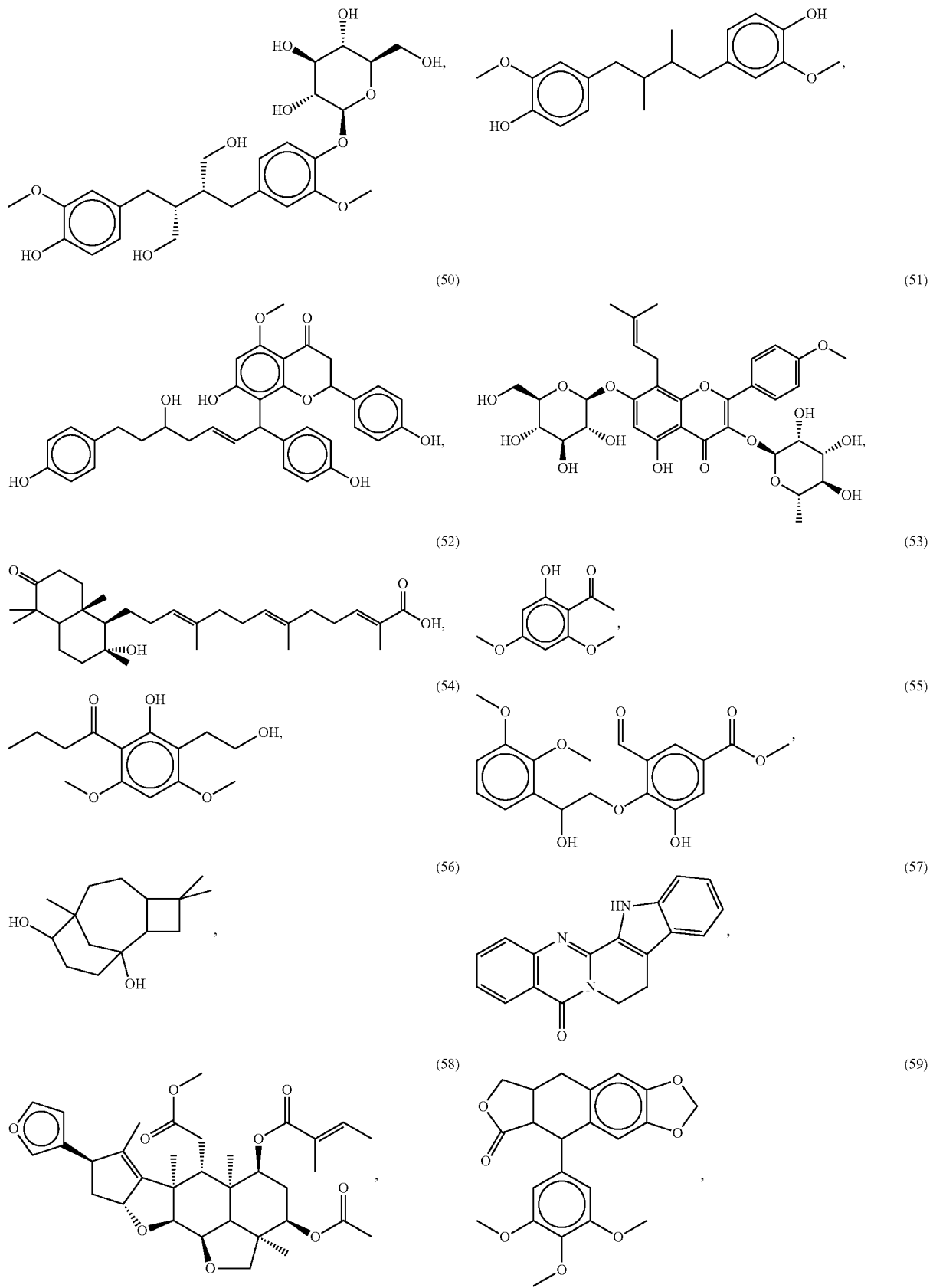

-continued
(60) 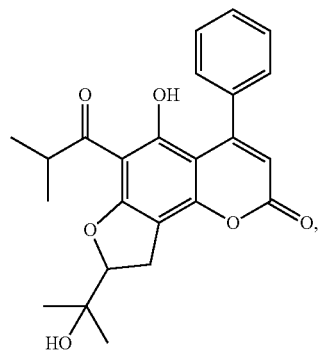
(61) 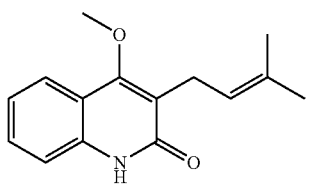
(62) 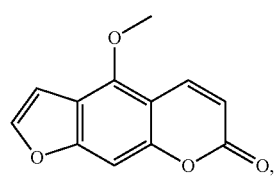
(63) 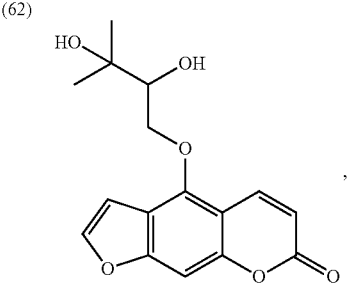
(64) 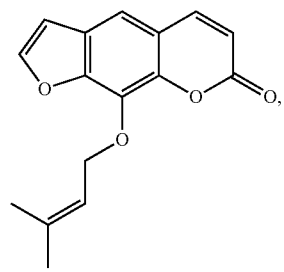
(65) 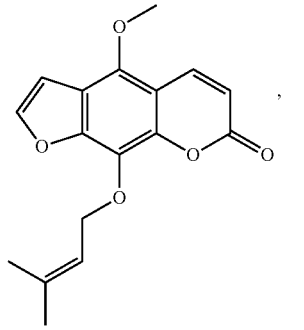
(66) 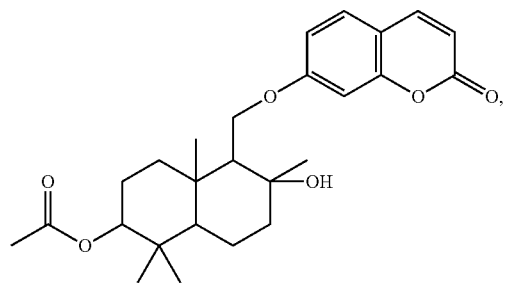
(67) 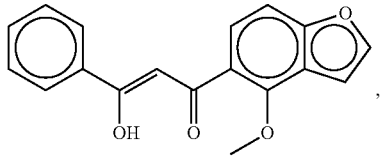
(68) 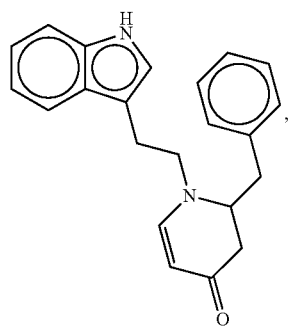
(69) 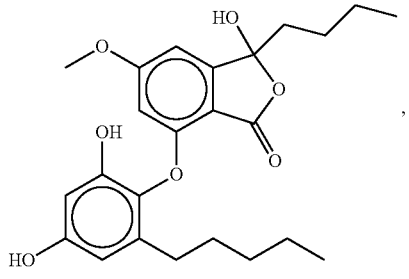

-continued
(70) 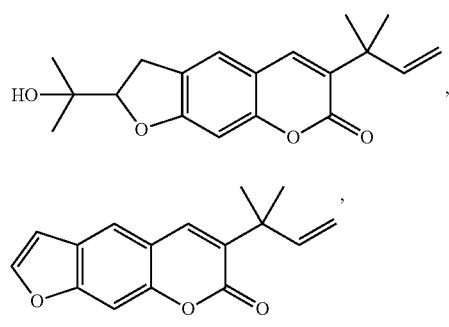
(71) 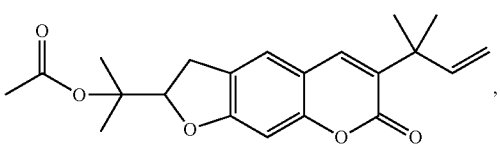
(72) 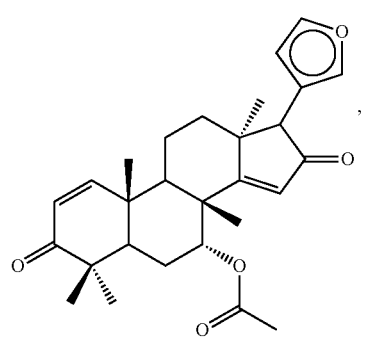
(73) 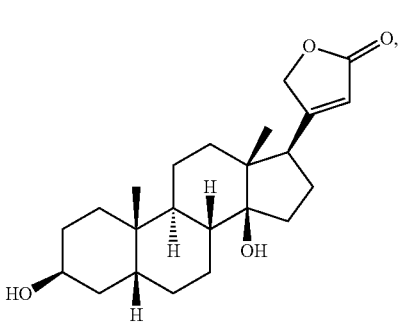
(74) 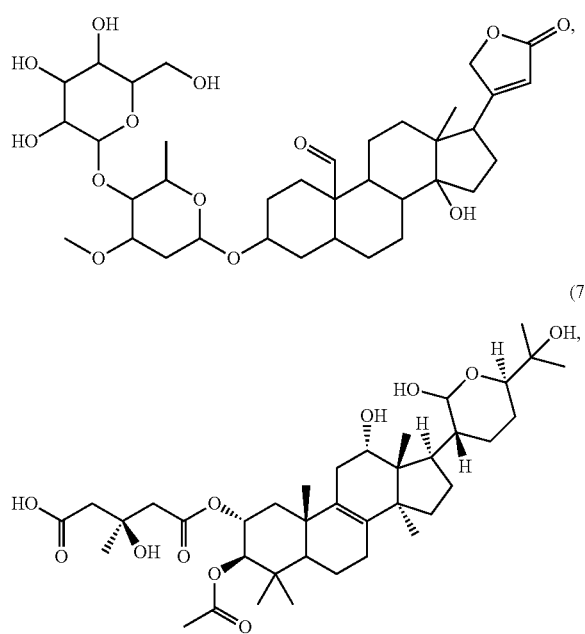
(75) 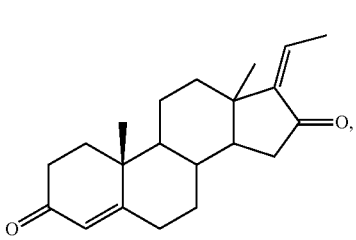
(76) 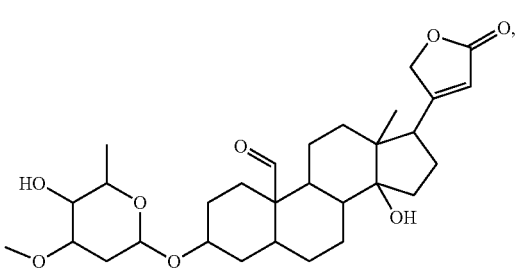
(77)
(78)
(79)
(80a) 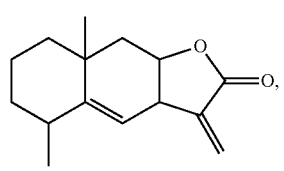
(80b) 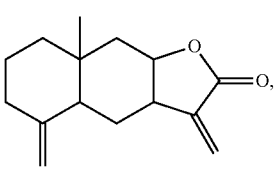

-continued
(81)
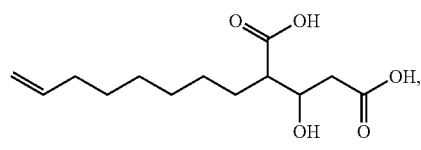
(82)
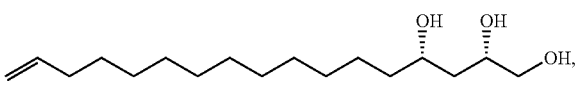
(83)
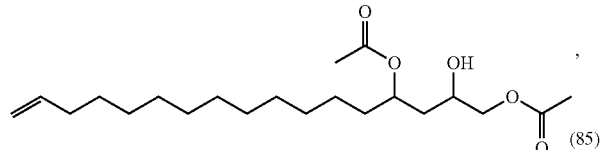
(84)
(85)
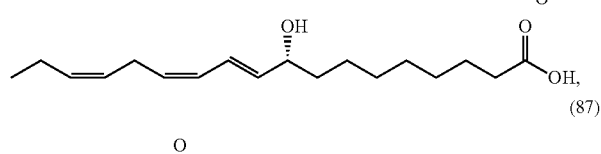
(86)
(87)
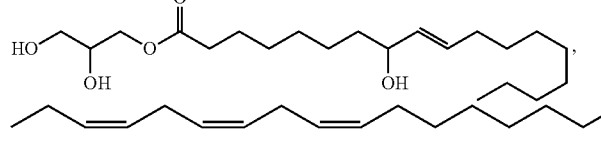
(88)
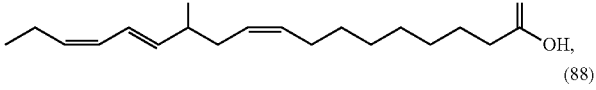
(89)
(90)
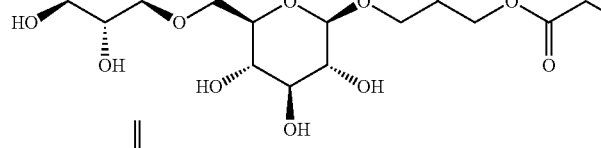
(91)
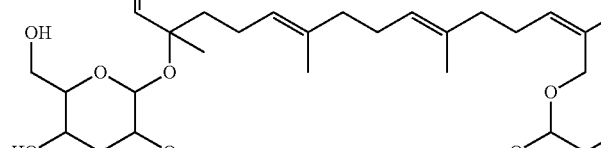
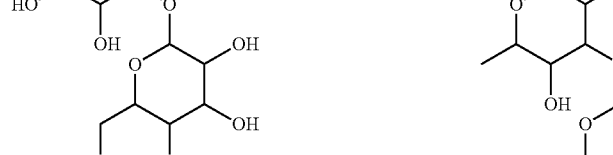

(92)
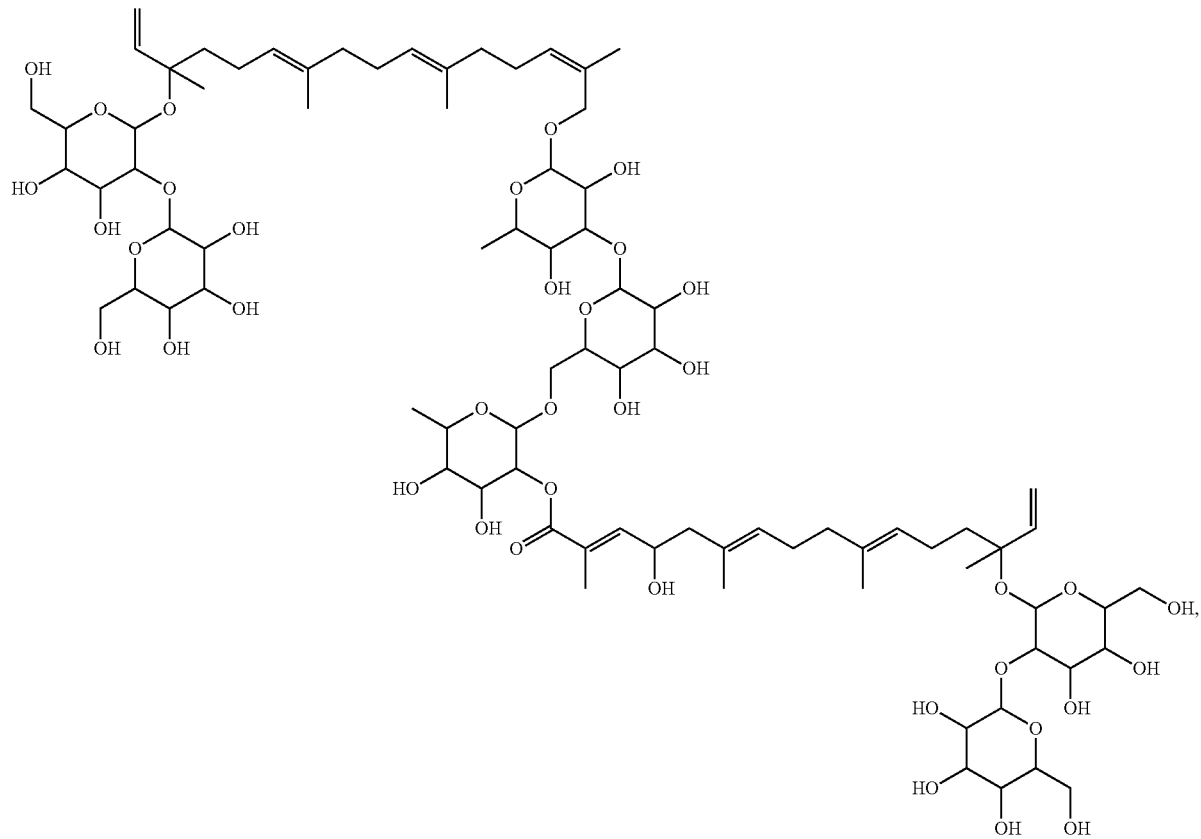
(93)
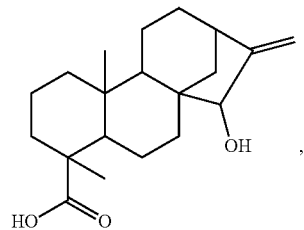
(94)
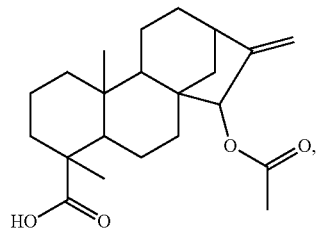
(95)
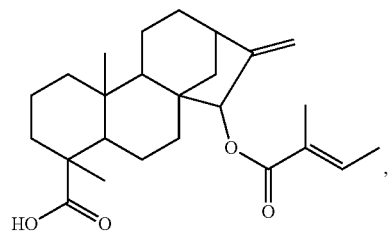
(96)
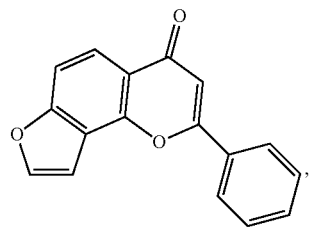

-continued

(97)
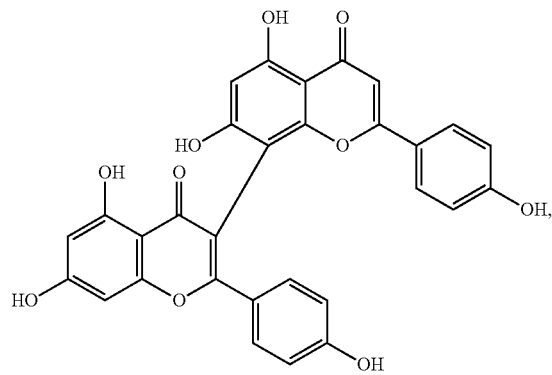

(98)
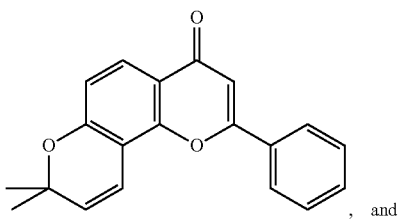, and

(99)
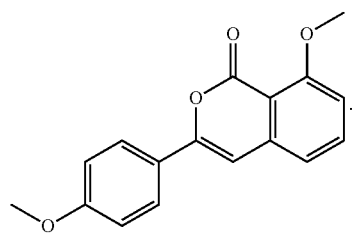

Presented below are chemical compound structures based on groupings of structural relationships of the 99 initially selected compounds. The compounds are grouped into 21 categories (A through U) containing one or more of the 99 initially selected compounds. Within some categories, subcategories are described.

In some instances, a compound may be in more than one category due to its structural similarity to compounds in more than one category. It will be understood that structural similarities of the various compounds other than those presented herein exist and that groupings into categories other than those presented herein are possible and contemplated.

Each of the 22 categories of compounds presented herein is discussed independently. That is, discussion of substituents with regard to one category should not be construed to limit discussion of substituents with regard to another category. For example, $R^1$ for the group A compounds is independently defined relative to $R^1$ for the group B compounds. In addition, discussion of substituents with regard to subgroups is independently defined. For example, $R^1$ for the group J1 compounds is independently defined relative to $R^1$ for the group J2 compounds, unless otherwise stated.

Group A Compounds

In embodiments, a bioactive, taste modulating, or salty taste modulating compound is a compound having the following structure:

(A)
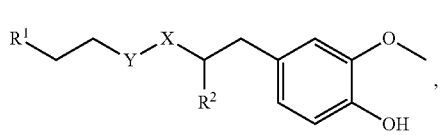

where:
$R^1$ is H or $C_1$-$C_{10}$ alkyl;
$R^2$ is H or $C_1$-$C_3$ alkyl;
X is CHOR$^3$ or C=O;
$R^3$ is H, $C_1$-$C_3$ alkyl, or

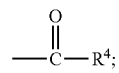

$R^4$ is H or $C_1$-$C_3$ alkyl;
Y is CR$^5$=CH or CHR$^5$—CH$_2$;
$R^5$ is H, OH, —OCH$_3$, —OCH$_2$CH$_3$, —O—OCH$_2$CH$_2$CH$_3$, or

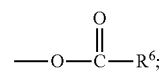

and
$R^6$ is H or $C_1$-$C_3$ alkyl.

In embodiments, $R^1$ is $C_2$-$C_8$ alkyl. In embodiments, $R^2$ is H. In embodiments, X is C=O or

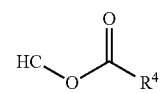

where $R^4$ is CH$_3$. In embodiments, when Y is CR$^5$=CH, $R^5$ is H. In embodiments, when Y is CHR$^5$—CH$_2$, $R^5$ is OH or —OCH$_3$. In embodiments, $R^6$ is CH$_3$.

Group B Compounds

Group B1 Compounds

In embodiments, a bioactive, taste modulating, or salty taste modulating compound is a compound having the following structure:

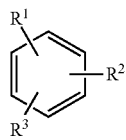

(B1)

where:
R¹ and R² are each independently OH or $C_1$-$C_3$ alkoxy or where R¹ and R² together with the carbons to which they are bound form a five-membered ring having two oxygen heteroatoms to form a compound having the following structure

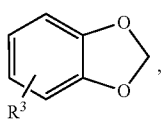

(B1')

and
R³ is

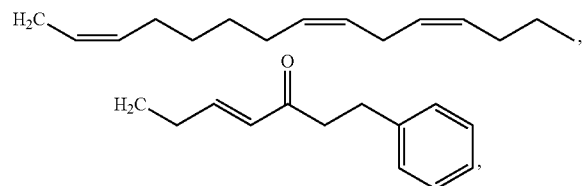

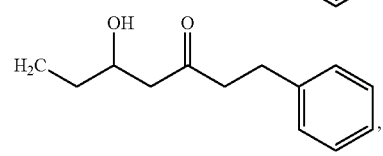

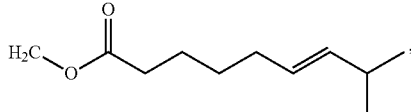

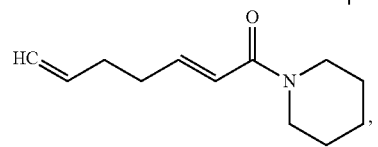

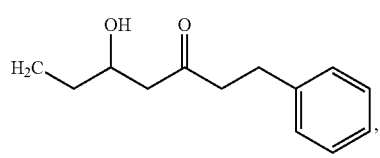

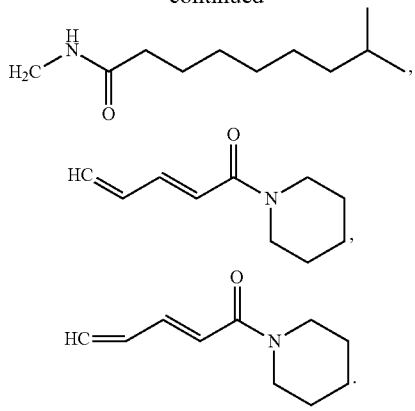

Group B2 Compounds

In embodiments, a bioactive, taste modulating, or salty taste modulating compound is a compound having the following structure:

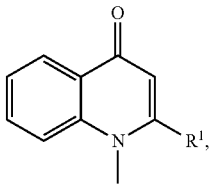

(B2)

where R¹ is $C_{10}$-$C_{15}$ alkyl or alkenyl.

Group B3 Compounds

In embodiments, a bioactive, taste modulating, or salty taste modulating compound is a compound having the following structure:

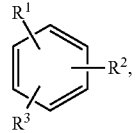

(B3)

where:
R¹ and R² are each independently OH or $C_1$-$C_3$ alkoxy, and

R³ is selected from the group consisting of
(i) $C_{10}$-$C_{20}$ unsubstituted straight or branched chain alkenyl with one or more double bonds; and
(ii)

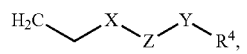

where X, Y and Z are independently CH, $CH_2$, CO or $CHOR^5$ where R⁵ is H or $C_1$-$C_3$ alkyl, provided that if one of X or Y are CH then Z is also CH, and where R⁴ is $C_1$-$C_8$ straight or branched chain unsubstituted alkyl or

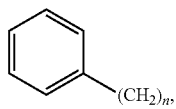

where n is 1-5, provided that if $R^4$ is $C_1$-$C_8$ straight or branched chain alkyl, then Y is $CHOR^5$ where $R^5$ is $C_1$-$C_3$ alkyl.

In embodiments, $R^1$ and $R^2$ are OH. In such embodiments, $R^1$ may be substituted at the 5 position, $R^2$ may be substituted at the 3 position, and $R^3$ may be substituted at the 1 position.

In embodiments, $R^3$ is $C_{10}$-$C_{20}$ unsubstituted straight or branched chain alkenyl with one or more double bonds. In such embodiments, $R^3$ may be $C_{12}$-$C_{18}$ unsubstituted straight or branched chain alkenyl. For example, $R^3$ may be $C_{13}$-$C_{17}$ unsubstituted straight or branched chain alkenyl, such as $C_{15}$ unsubstituted straight or branched chain alkenyl. In embodiments, $R^3$ has 1-5 double bonds. For example, $R^3$ may have 1-4 double bonds, such as 1-3 double bonds. In embodiments, $R^3$ is a straight chain alkenyl. By way of example, $R^3$ may be

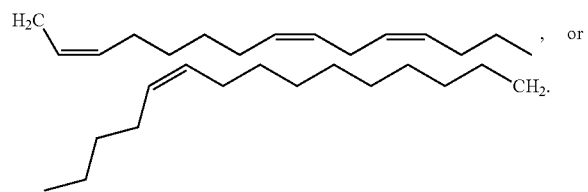

In embodiments, $R^1$ is $C_1$-$C_3$ alkoxy, such as methoxy, and $R^2$ is OH. In such embodiments, $R^1$ may be substituted at the 3 position, $R^2$ may substituted at the 4 position, and $R^3$ may substituted at the 1 position.

In embodiments, $R^3$ is

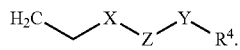

In such embodiments, $R^4$ may be

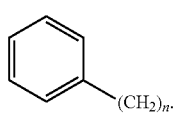

In embodiments, n is 2. In embodiments, Z is CH or $CH_2$, X and Z are each independently CH or $CH_2$, depending on whether Z is CH or $CH_2$. In embodiments, X is $CHOR^5$. $R^5$ may be H. In embodiments, Y is CO. In embodiments, X is CO. By way of example, $R^3$ may be

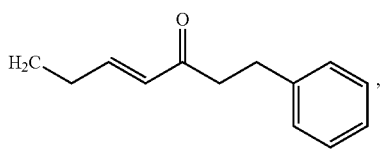

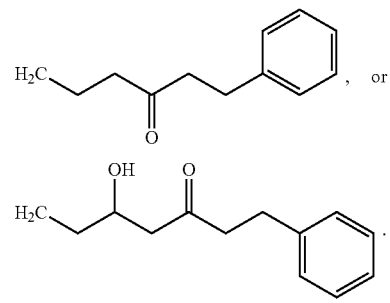

In embodiments, Y is $CHOR^5$. $R^5$ may be $C_1$-$C_3$ alkyl. For example, $R^5$ may be methyl. In some embodiments, where Y is $CHOR^5$, $R^4$ is $C_1$-$C_8$ straight or branched chain alkyl. For example, $R^4$ may be $C_4$-$C_6$ straight or branched chain alkyl, such as $C_5$ straight or branched chain alkyl. IN embodiments, $R^4$ is a straight chain alkyl.

In embodiments, $R^3$ is

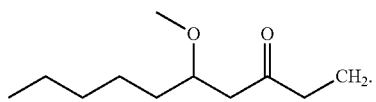

In embodiments, $R^3$ is selected from the group consisting of:

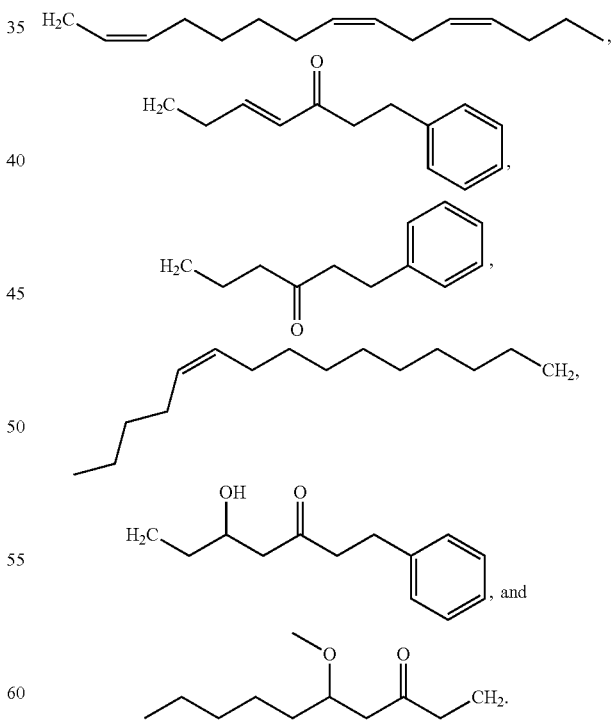

Group B4 Compounds

In embodiments, a bioactive, taste modulating, or salty taste modulating compound is a compound having the following structure:

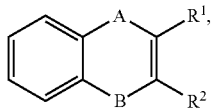

(B4)

A and B are each independently NCH$_3$ or C(O), with the proviso that one of A and B is NCH$_3$ and the other of A and B is C(O); and R$_1$ and R$_2$ are independently selected from H or C$_8$-C$_{16}$ unsaturated alkyl, with the proviso that if one of R$_1$ and R$_2$ is H, then the other of R$_1$ and R$_2$ is C$_8$-C$_{16}$ unsaturated alkyl.

In embodiments, R$_1$ and R$_2$ are independently selected from H or C$_8$-C$_{16}$ unsaturated alkyl, wherein the C$_8$-C$_{16}$ unsaturated alkyl contains 1 to 3 double bonds. In embodiments, R$_1$ and R$_2$ are independently selected from H or C$_8$-C$_{16}$ unsaturated alkyl, wherein the C$_8$-C$_{16}$ unsaturated alkyl contains only 1 double bond.

In embodiments, B is NCH$_3$ and R$_2$ is C$_8$-C$_{16}$ unsaturated alkyl.

In embodiments, R$_1$ and R$_2$ are independently selected from H or C$_1$-C$_{15}$ unsaturated alkyl, such as C$_{13}$ unsaturated alkyl.

Group C Compounds

In embodiments, a bioactive, taste modulating, or salty taste modulating compound is a compound having the following structure:

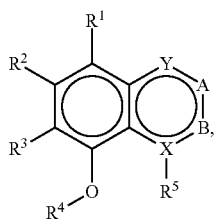

(C)

where:

X is C or N;

R$^1$ is H, OH, C$_1$-C$_3$ alkoxy, or C$_1$-C$_6$ alkyl;

R$^2$ and R$^3$ are each independently selected from H; OH; C$_1$-C$_3$ alkoxy; straight or branched chain, saturated or unsaturated C$_1$-C$_6$ alkyl or alkenyl; or R$^1$ and R$^2$ together with the carbons to which they are bound form a part of a five or six membered ring structure;

R$^4$ is H or C$_1$-C$_3$ alkyl;

R$^5$ is H, OH, C$_1$-C$_3$ alkoxy or C$_1$-C$_3$ alkyl;

A and B are each independently selected from CH, C═O, C-benzyl methoxy, C—CH$_2$—R$^6$ or C—C(O)R$^6$ where R$^6$ is straight or branched chain, saturated or unsaturated C$_1$-C$_6$ alkyl, or A and B together are part of an aromatic six-membered ring structure sharing a side with the remainder of the structure of Formula (C); and Y is O, CH, C═O, or C—O—R$^7$, where R$^7$ is H or C$_1$-C$_3$ alkyl.

In embodiments, when X is N, R$^5$ is C$_1$-C$_3$ alkyl, such as methyl. In embodiments, when X is N, Y is C═O or C—O—R$^7$, such as C—O-Me. In embodiments when X is C, R$^5$ is H or OH. In embodiments when X is C, Y is O. In embodiments, R$^1$ is H or methoxy. In embodiments, one of A or B is C═O and the other is H, C-benzyl methoxy, C—CH$_2$CHC(CH$_3$)$_2$ or C—C(O)CHC(CH$_3$)$_2$.

In embodiments, R$^2$ and R$^3$ together with the carbons to which they are bound form a part of a six membered ring structure. In embodiments, the six membered ring structure includes an oxygen or nitrogen heteroatom. In embodiments, the six membered ring structure contains one or more carbon atoms substituted with one or more C$_1$-C$_6$ alkyl, such as methyl. In embodiments, one carbon atom of the ring structure is substituted with two methyl groups. In embodiments, the ring structure is an unsubstituted six carbon aromatic ring structure.

In embodiments, a compound according to Formula (C) has the following structure:

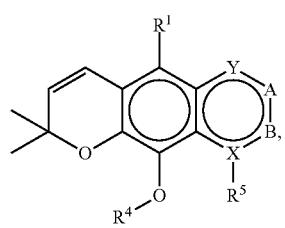

(C')

where A, B, X, Y, R$^1$, R$^4$ and R$^5$ are as described above for Formula (C).

In embodiments, a compound according to Formula (C) has the following structure:

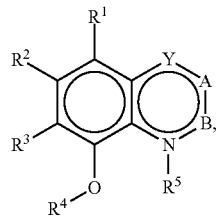

(C")

where:

R$^1$, R$^2$ and R$^3$ are each independently H, OH or C$_1$-C$_3$ alkoxy;

R$^4$ and R$^5$ are each independently H or C$_1$-C$_3$ alkyl;

Y is C═O or C—O—R$^7$, where R$^7$ is H or C$_1$-C$_3$ alkyl; and

A is C—CH$_2$—R$^6$ or C—C(O)R$^6$ where R$^6$ is straight or branched chain, saturated or partially unsaturated C$_1$-C$_6$ alkyl, B is C═O, or A and B together are part of an aromatic six-carbon membered ring structure sharing a side with the remainder of the structure of Formula (C").

In embodiments of a compound according to Formula (C"), R$^1$, R$^2$ and R$^3$ are H.

In embodiments, A is C—CH$_2$—R$^6$ or C—C(O)R$^6$ where R$^6$ is straight or branched chain, saturated or partially unsaturated C$_1$-C$_6$ alkyl and B is C═O.

In embodiments, R$^1$, R$^2$ and R$^3$ are each independently OH or C$_1$-C$_3$ alkoxy. In some embodiments, R$^1$, R$^2$ and R$^3$ are the same.

In embodiments, A and B together are part of an aromatic six-carbon membered unsubstituted ring structure.

In embodiments, a compound according to Formula (C) has the following structure:

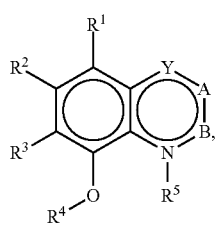

(C'')

where:
- $R^1$, $R^2$ and $R^3$ are each independently H, OH or $C_1$-$C_3$ alkoxy;
- $R^4$ and $R^5$ are each independently H or $C_1$-$C_3$ alkyl;
- Y is C=O or C—O—$R^7$, where $R^7$ is H or $C_1$-$C_3$ alkyl; and
- A is C—$CH_2$—$R^6$ or C—C(O)$R^6$ where $R^6$ is straight or branched chain, saturated or partially unsaturated $C_1$-$C_6$ alkyl, B is C=O, or A and B together are part of an aromatic six-carbon membered ring structure sharing a side with the remainder of the structure of Formula (C'').

In embodiments of a compound according to Formula (C''), $R^1$, $R^2$ and $R^3$ are H. In embodiments, A is C—$CH_2$—$R^6$ or C—C(O)$R^6$ where $R^6$ is straight or branched chain, saturated or partially unsaturated $C_1$-$C_6$ alkyl and B is C=O. In embodiments, $R^1$, $R^2$ and $R^3$ are each independently OH or $C_1$-$C_3$ alkoxy. In embodiments, $R^1$, $R^2$ and $R^3$ are the same. In embodiments, A and B together are part of an aromatic six-carbon membered unsubstituted ring structure.

In embodiments, a compound according to Formula (C) has the following structure:

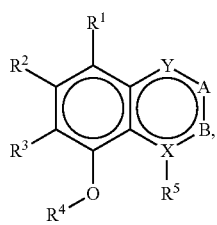

(C'''')

where:
- X is N;
- $R^1$ is H or $C_1$-$C_3$ alkyl;
- $R^2$ and $R^3$ are each independently selected from H and straight or branched chain, saturated or unsaturated $C_1$-$C_3$ alkyl or alkenyl;
- $R^4$ is H or $C_1$-$C_3$ alkyl;
- $R^5$ is H or $C_1$-$C_3$ alkyl;
- A and B are each independently selected from C=O and C—C(O)$R^6$ where $R^6$ is straight or branched chain, saturated or partially unsaturated $C_1$-$C_6$ alkyl; and
- Y is C—O—$R^7$, where $R^7$ is H or $C_1$-$C_3$ alkyl.

In embodiments of a compound according to Formula (C''''), one or more of $R^1$, $R^2$ and $R^3$ are H. In embodiments, each of $R^1$, $R^2$ and $R^3$ are H. In embodiments, $R^4$ and $R^5$ are independently $C_1$-$C_3$ alkyl. In embodiments, $R^4$ and $R^5$ are methyl. In embodiments, wherein A is C—C(O)$R^6$.

In embodiments, B is C=O.

Group D Compounds

In embodiments, a bioactive, taste modulating, or salty taste modulating compound is a compound having the following structure:

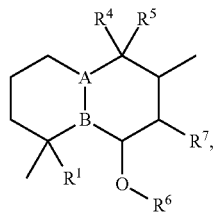

(D)

where:
- $R^1$ is H, methyl, $OCOCH_3$ or forms together with $R^6$ a five membered ring structure in which $R^1$ and $R^6$ together are C=O or $CH_2$;
- $R^6$ is H, C=$OCH_3$, or together forms a five membered ring structure in which $R^1$ and $R^6$ together are C=O or $CH_2$;
- $R^7$ is $OCOCH_3$;
- A and B are C, CH or $CCH_3$, wherein when A and B are both C a double bond is formed between A and B; and
- $R^4$ and $R^5$ are independently selected from OH, methyl,

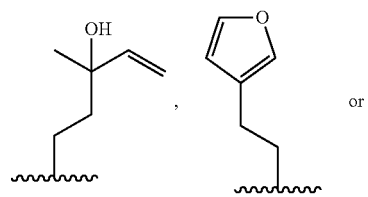

$R^4$ and $R^5$ together with the carbon to which they are bound form

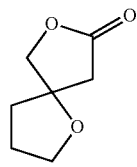

to form a compound of the following formula

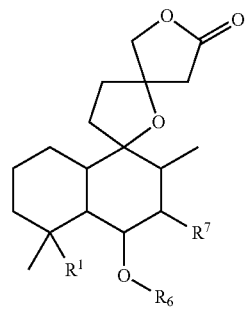

where $R^1$, $R^6$ and $R^7$ are as described above.

Group E Compounds

In embodiments, a bioactive, taste modulating, or salty taste modulating compound is a compound having the following structure:

(E)

where $R^1$, $R^2$ and $R^3$ are independently selected from the group consisting of H and $COCH_3$.

Group F Compounds

In embodiments, a bioactive, taste modulating, or salty taste modulating compound is a compound having the following structure:

(F)

where:

$R^{42}$ is H or OH;

$R^{43}$ are $R^{44}$ each independently H or $CH_3$;

$R^1$ and $R^2$ are each independently OH, $C_1$-$C_3$ alkyl or $C_1$-$C_3$ hydroxyl;

$R^3$ and $R^4$ are each independently H, OH or $C_1$-$C_3$ hydroxyl;

$R^5$ is H or —$OC(O)R^8$, where $R^8$ is $C_1$-$C_8$ straight or branched chain, saturated or unsaturated alkyl;

W is CH;

Y is CH, X is CH or $CH_2$, and Z is C or $CR^9$, provided that Z is C when X is $CH_2$, where $R^9$ is H or together with $R^6$ and the carbons to which they are bound and the intervening carbon of W form a five membered ring with an oxygen heteroatom;

$R^6$ is $C_1$-$C_3$ hydroxyl, $C(O)R^{10}$, $(CH_2)p'R^{10}$ where p' is zero or 1, or together with $R^9$ and the carbons to which they are bound and the intervening carbon of W form a five membered ring with an oxygen heteroatom, where $R^{10}$ is H, OH, or saccharidyl; and $R^7$ is H, OH, $C_1$-$C_3$ hydroxyl, or $(CH_2)_pR^{44}$, where p is zero or 1 and $R^{44}$ is saccharidyl.

In embodiments, $R^{10}$ is saccharidyl and is where a and b are each independently zero or 1;
where $R^{11}$ is H or where d is zero or 1,
$R^{14}$ is H, OH, $CH_3$ or $C_1$-$C_3$ hydroxyl, and
$R^{15}$ is H, $C(O)R^{16}$ where $R^{16}$ is $C_1$-$C_{15}$ straight or branched chain, saturated or unsaturated alkyl unsubstituted or substituted with hydroxyl, where $R^{12}$ and $R^{13}$ are each independently H, $C(O)R^{41}$ where $R^{41}$ is $C_1$-$C_{15}$ straight or branched chain, saturated or unsaturated alkyl unsubstituted or substituted with hydroxyl, or where e is zero or 1,
$R^{17}$ is H, OH or $CH_3$, and
$R^{18}$ is H, $C(O)R^{42}$ where $R^{42}$ is $C_1$-$C_{15}$ straight or branched chain, saturated or unsaturated alkyl unsubstituted or substituted with hydroxyl, or where f is zero or 1,
$R^{19}$ is H, OH or $CH_3$, and
$R^{20}$ and $R^{21}$ are each independently H, $C(O)R^{43}$ where $R^{43}$ is $C_1$-$C_{15}$ straight or branched chain, saturated or unsaturated alkyl unsubstituted or substituted with hydroxyl, or

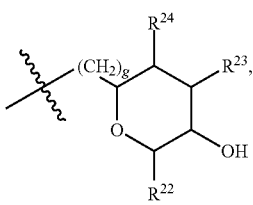

where
g is zero or 1, and
$R^{22}$, $R^{23}$ and $R^{24}$ are each independently H, OH or $CH_3$.

In embodiments, $R^{44}$ is saccharidyl and is

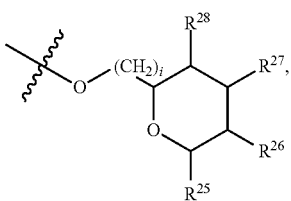

where
i is zero or 1,
$R^{25}$, $R^{26}$, $R^{27}$ and $R^{28}$ are each independently H, OH, $CH_3$, $C_1$-$C_3$ hydroxyl, COOH, $(CH_2)_n OC(O)R^{29}$ where n is zero, 1, 2 or 3 and $R^{29}$ is H or $C_1$-$C_3$ alkyl, or $(CH_2)_m OR^{30}$ where m is zero or 1 and $R^{30}$ is

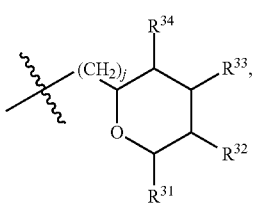

where
j is zero or 1,
$R^{31}$, $R^{32}$, $R^{33}$ and $R^{34}$ are each independently H, OH, $CH_3$, $C_1$-$C_3$ hydroxyl, COOH, $(CH_2)_q OC(O)R^{35}$ where q is zero, 1, 2 or 3 and $R^{35}$ is H or $C_1$-$C_3$ alkyl, or $(CH_2)_t OR^{36}$ where t is zero or 1 and $R^{36}$ is

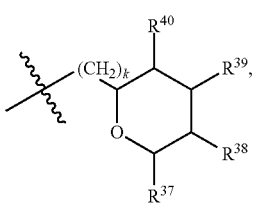

where
k is zero or 1, and
$R^{37}$, $R^{38}$, $R^{39}$ and $R^{40}$ are each independently H, OH, $CH_3$, $C_1$-$C_3$ hydroxyl, COOH, $(CH_2)_u OC(O)R^{41}$ where u is zero, 1, 2 or 3 and $R^{41}$ is H or $C_1$-$C_3$ alkyl.

In embodiments, Z is C. In embodiments, Z is $CR^9$ and wherein $R^9$ together with $R^6$ and the carbons to which they are bound and the intervening carbon of W for a five membered ring with an oxygen heteroatom. In embodiments, $R^6$ is $C(O)R^{10}$. In embodiments, $R^{10}$ is H or OH. In embodiments, $R^7$ is OH. In embodiments, $R^1$ and $R^2$ are each independently $C_1$-$C_3$ alkly or $C_1$-$C_3$ hydroxyl. In embodiments, $R^3$ is H or OH. In embodiments, $R^4$ is H. In embodiments, $R^5$ is H. In embodiments, one or more of $R^{16}$, if present, $R^{42}$ and $R^{43}$ are

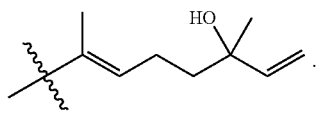 [SMILES: */C(C)=C/CCC(C)(O)C=C]

In embodiments, a compound according to Formula (F) has the following structure:

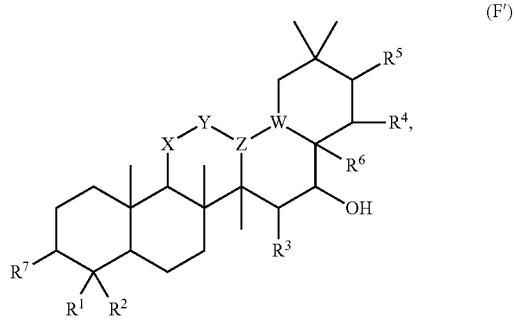

(F')

where:
$R^1$ and $R^2$ are each independently OH, $C_1$-$C_3$ alkyl or $C_1$-$C_3$ hydroxyl;
$R^3$ and $R^4$ are each independently H, OH or $C_1$-$C_3$ hydroxyl;
$R^5$ is H;
W is CH;
Y is CH, X is CH or $CH_2$, and Z is C or $CR^9$, provided that Z is C when X is $CH_2$, where $R^9$ is H or together with $R^6$ and the carbons to which they are bound and the intervening carbon of W form a five membered ring with an oxygen heteroatom;
$R^6$ is $C_1$-$C_3$ hydroxyl, $C(O)R^{10}$, $(CH_2)p'R^{10}$ where p' is zero or 1, or together with $R^9$ and the carbons to which they are bound and the intervening carbon of W form a five membered ring with an oxygen heteroatom, where $R^{10}$ is H or saccharidyl; and
$R^7$ is H, OH, $C_1$-$C_3$ hydroxyl, or $(CH_2)_p OR^{44}$, where p is zero or 1 and $R^{44}$ is saccharidyl.

In embodiments of a compound according to Formula F', $R^{10}$ is saccharidyl and is

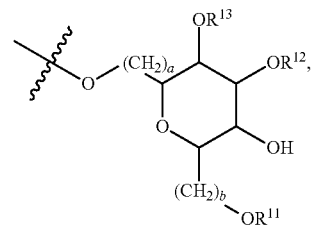

where a and b are each independently zero or 1;

$R^{11}$ is H or

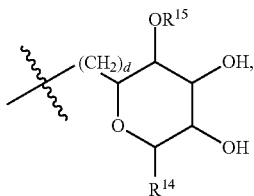

where d is zero or 1,
$R^{14}$ is H, OH, $CH_3$ or $C_1$-$C_3$ hydroxyl, and
$R^{15}$ is H, $C(O)R^{16}$ where $R^{16}$ is $C_1$-$C_{15}$ straight or branched chain, saturated or unsaturated alkyl unsubstituted or substituted with hydroxyl,
where $R^{12}$ and $R^{13}$ are each independently H, $C(O)R^{41}$ where $R^{41}$ is $C_1$-$C_{15}$ straight or branched chain, saturated or unsaturated alkyl unsubstituted or substituted with hydroxyl, or

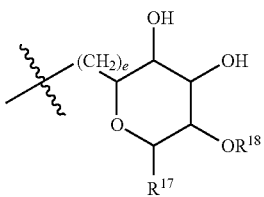

where e is zero or 1,
$R^{17}$ is H, OH or $CH_3$ and
$R^{18}$ is H, $C(O)R^{42}$ where $R^{42}$ is $C_1$-$C_{15}$ straight or branched chain, saturated or unsaturated alkyl unsubstituted or substituted with hydroxyl, or

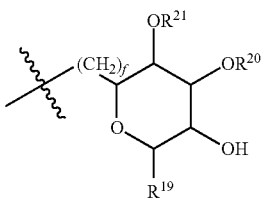

where f is zero or 1,
$R^{19}$ is H, OH or $CH_3$, and
$R^{20}$ and $R^{21}$ are each independently H, $C(O)R^{43}$ where $R^{43}$ is $C_1$-$C_{15}$ straight or branched chain, saturated or unsaturated alkyl unsubstituted or substituted with hydroxyl, or

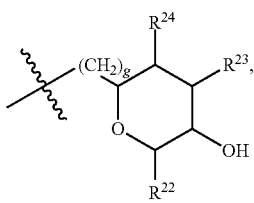

where
g is zero or 1, and
$R^{22}$, $R^{23}$ and $R^{24}$ are each independently H, OH or $CH_3$.

In embodiments of a compound according to Formula F', $R^{44}$ is saccharidyl and is

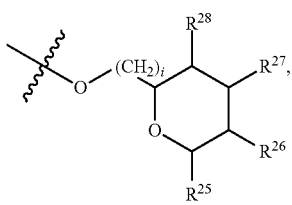

where
i is zero or 1, and
$R^{25}$, $R^{26}$, $R^{27}$ and $R^{28}$ are each independently H, OH, $CH_3$, $C_1$-$C_3$ hydroxyl, COOH, $(CH_2)_nOC(O)R^{29}$ where n is zero, 1, 2 or 3 and $R^{29}$ is H or $C_1$-$C_3$ alkyl, or $(CH_2)_mOR^{30}$ where m is zero or 1 and $R^{30}$ is

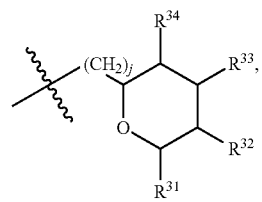

where
j is zero or 1, and
$R^{31}$, $R^{32}$, $R^{33}$ and $R^{34}$ are each independently H, OH, $CH_3$, $C_1$-$C_3$ hydroxyl, COOH, $(CH_2)_qOC(O)R^{35}$ where q is zero, 1, 2 or 3 and $R^{35}$ is H or $C_1$-$C_3$ alkyl, or $(CH_2)_tOR^{36}$ where t is zero or 1 and $R^{36}$ is

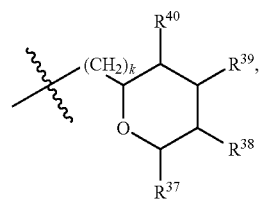

where
k is zero or 1, and
$R^{37}$, $R^{38}$, $R^{39}$ and $R^{40}$ are each independently H, OH, $CH_3$, $C_1$-$C_3$ hydroxyl, COOH, $(CH_2)_uOC(O)R^{41}$ where u is zero, 1, 2 or 3 and $R^{41}$ is H or $C_1$-$C_3$ alkyl.

In embodiments of a compound according to Formula F', Z is C. In embodiments, Z is $CR^9$ and wherein $R^9$ together with $R^6$ and the carbons to which they are bound and the intervening carbon of W for a five membered ring with an oxygen heteroatom. In embodiments, $R^6$ is $C(O)R^{10}$. In embodiments, $R^1$ and $R^2$ are each independently $C_1$-$C_3$ alkly or $C_1$-$C_3$ hydroxyl. In embodiments, $R^3$ is H or OH. In embodiments, $R^4$ is H. In embodiments, $R^{16}$, if present, is

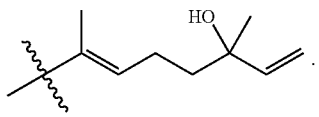 [SMILES: */C(C)=C/CCC(C)(O)C=C]

In embodiments, a compound according to Formula (F) has the following structure:

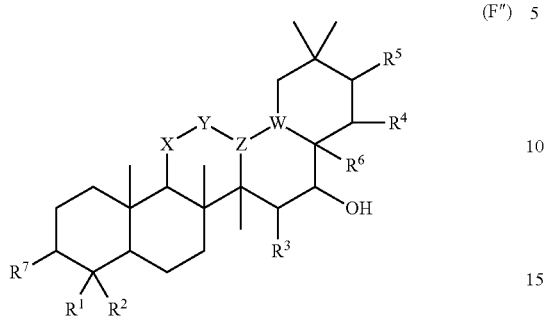
(F″)

where:
$R^1$ and $R^2$ are each independently OH, $C_1$-$C_3$ alkyl or $C_1$-$C_3$ hydroxyl;
$R^3$ is H;
$R^4$ is H, OH or $C_1$-$C_3$ hydroxyl;
$R^5$ is H;
W is CH;
Y is CH, X is CH or $CH_2$, and Z is C or $CR^9$, provided that Z is C when X is $CH_2$, where $R^9$ is H or together with $R^6$ and the carbons to which they are bound and the intervening carbon of W form a five membered ring with an oxygen heteroatom;
$R^6$ is, together with $R^9$ and the carbons to which they are bound and the intervening carbon of W form a five membered ring with an oxygen heteroatom, or $C(O)R^{10}$ where $R^{10}$ is H or

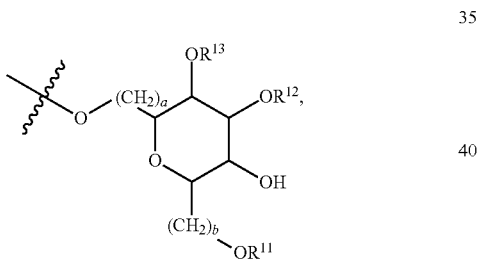

where a and b are each independently zero or 1;
where $R^{11}$ is H, OH, or

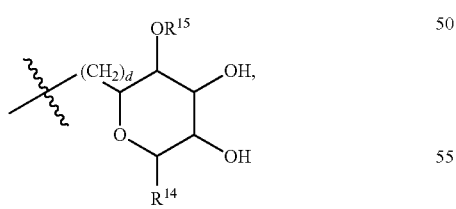

where d is zero or 1,
$R^{14}$ is H, OH, $CH_3$ or $C_1$-$C_3$ hydroxyl, and
$R^{15}$ is H, $C(O)R^{16}$ where $R^{16}$ is $C_1$-$C_{15}$ straight or branched chain, saturated or unsaturated alkyl unsubstituted or substituted with hydroxyl,
where $R^{12}$ and $R^{13}$ are each independently H, $C(O)R^{41}$ where $R^{41}$ is $C_1$-$C_{15}$ straight or branched chain, saturated or unsaturated alkyl unsubstituted or substituted with hydroxyl, or

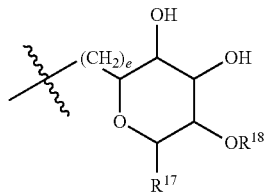

where e is zero or 1,
$R^{17}$ is H, OH or $CH_3$ and
$R^{18}$ is H, $C(O)R^{42}$ where $R^{42}$ is $C_1$-$C_{15}$ straight or branched chain, saturated or unsaturated alkyl unsubstituted or substituted with hydroxyl, or

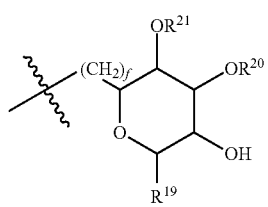

where f is zero or 1,
$R^{19}$ is H, OH or $CH_3$, and
$R^{20}$ and $R^{21}$ are each independently H, $C(O)R^{43}$ where $R^{43}$ is $C_1$-$C_{15}$ straight or branched chain, saturated or unsaturated alkyl unsubstituted or substituted with hydroxyl, or

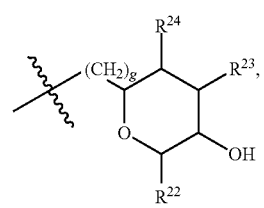

where
g is zero or 1, and
$R^{22}$, $R^{23}$ and $R^{24}$ are each independently H, OH or $CH_3$; and
$R^7$ is H, OH, $C_1$-$C_3$ hydroxyl, or $(CH_2)_p R^{44}$, where p is zero or 1 and $R^{44}$ is

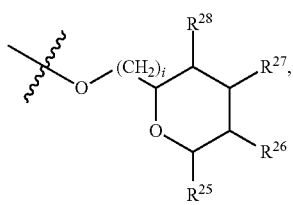

where
i is zero or 1, and
$R^{25}$, $R^{26}$, $R^{27}$ and $R^{28}$ are each independently H, OH, $CH_3$, $C_1$-$C_3$ hydroxyl, COOH, $(CH_2)_n OC(O)R^{29}$ where n is zero, 1, 2 or 3 and $R^{29}$ is H or $C_1$-$C_3$ alkyl, or $(CH_2)_m OR^{30}$ where m is zero or 1 and $R^{30}$ is

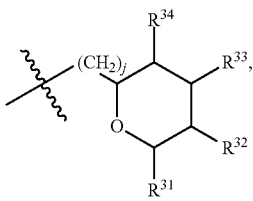

where j is zero or 1, and $R^{31}$, $R^{32}$, $R^{33}$ and $R^{34}$ are each independently H, OH, CH$_3$, $C_1$-$C_3$ hydroxyl, COOH, $(CH_2)_qOC(O)R^{35}$ where q is zero, 1, 2 or 3 and $R^{35}$ is H or $C_1$-$C_3$ alkyl, or $(CH_2)_tOR^{36}$ where t is zero or 1 and $R^{36}$ is

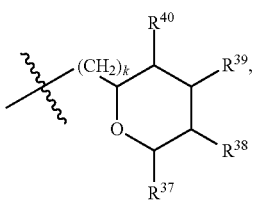

where k is zero or 1, and $R^{37}$, $R^{38}$, $R^{39}$ and $R^{40}$ are each independently H, OH, CH$_3$, $C_1$-$C_3$ hydroxyl, COOH, $(CH_2)_uOC(O)R^{41}$ where u is zero, 1, 2 or 3 and $R^{41}$ is H or $C_1$-$C_3$ alkyl.

In embodiments of a compound according to Formula (F′′′), $R^4$ is H. In embodiments, $R^1$ is CH$_3$. In embodiments, $R^2$ is CH$_3$.

Group G Compound

In embodiments, a bioactive, taste modulating, or salty taste modulating compound is a compound having the following structure:

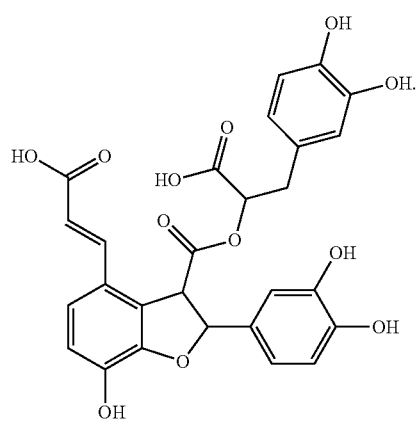

(G)

Group H Compounds

In embodiments, a bioactive, taste modulating, or salty taste modulating compound is a compound having the following structure:

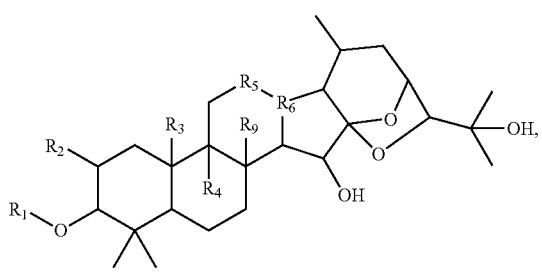

(H)

where:

$R^1$ is H or saccharidyl;
$R^2$ is H or OH;
$R^3$ and $R^4$ are independently selected from H or methyl or together form CH$_2$;
$R^5$ is CH$_2$ or CH;
$R^6$ is CH or C, provided that when $R^5$ is CH, $R^6$ is C;
$R^7$ and $R^8$ together with the carbons to which they are bound form

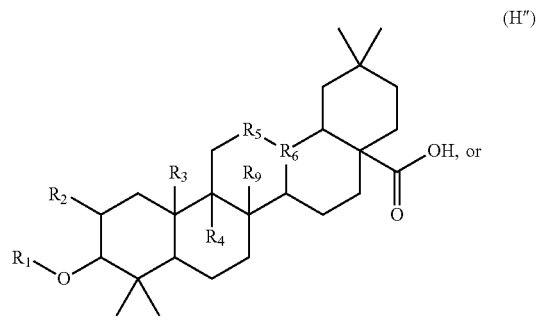

to form a compound having the following structure

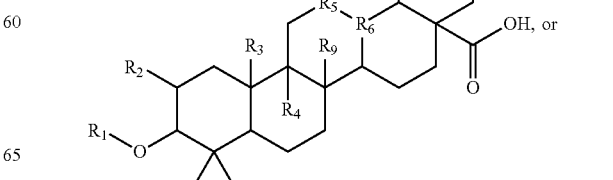

(H′)

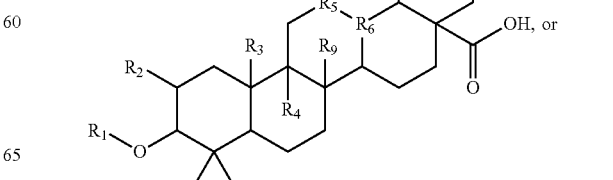

(H′′)

-continued

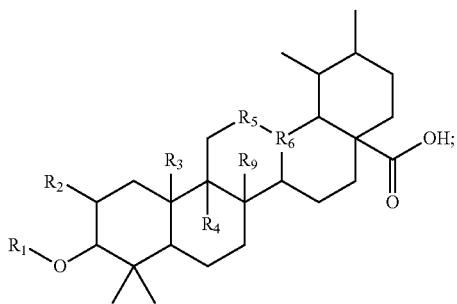
(H''')

and
R$^9$, R$^{10}$, and R$^{11}$ are independently H or methyl.
In embodiments, R$^1$ is saccharidyl and is

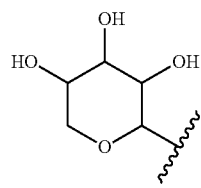

Group I Compounds

In embodiments, a bioactive, taste modulating, or salty taste modulating compound is a compound having the following structure:

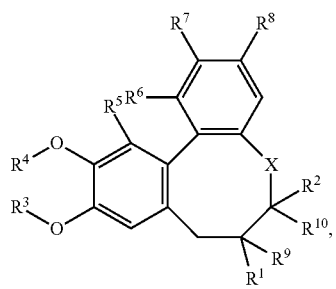
(I)

where:
X is O or CH$_2$;
R$^1$ and R$^9$ are independently selected from H, OH, C$_1$-C$_3$ alkoxy, C$_1$-C$_3$ alkyl, and (CH$_2$)$_n$OH, where n is an integer from 1 to 3;
R$^2$ and R$^{10}$ are independently selected from H, OH and C$_1$-C$_3$ alkyl;
R$^3$ and R$^4$ are independently selected from H and C$_1$-C$_3$ alkyl or together form CH$_2$;
R$^5$, R$^6$ and R$^7$ are independently selected from H and C$_1$-C$_3$ alkyoxy; and
R$^8$ is H, OH or C$_1$-C$_3$ alkyoxy.

In embodiments, R$^5$, R$^6$, R$^7$ and R$^8$ are independently C$_1$-C$_3$ alkyoxy. In embodiments, R$^5$, R$^6$, R$^7$ and R$^8$ are methoxy. In embodiments, R$^3$ and R$^4$ together form CH$_2$. In embodiments, R$^3$ and R$^4$ are independently C$_1$-C$_3$ alkyl. In embodiments, R$^3$ and R$^4$ are methyl. In embodiments, at least two of R$^1$, R$^2$, R$^9$ and R$^{10}$ are independently C$_1$-C$_3$ alkyl. In embodiments, at least two of R$^1$, R$^2$, R$^9$ and R$^{10}$ are methyl. In embodiments, X is CH$_2$.

In embodiments, X is O. In some embodiments where X is O, R$^2$ and R$^{10}$ are H. In some embodiments where X is O, two or more or R$^2$, R$^3$, R$^4$, R$^5$, R$^6$, R$^7$, and R$^{10}$ are H. In some embodiments where X is O, each of R$^2$, R$^3$, R$^4$, R$^5$, R$^6$, R$^7$, and R$^{10}$ are H. In some embodiments where X is O, R$^8$ is OH or C$_1$-C$_3$ alkoxy. In some embodiments where X is O, R$^1$ and R$^9$ are independently selected from OH, C$_1$-C$_3$ alkoxy, and (CH$_2$)$_n$OH. In some embodiments where X is O, one of R$^1$ and R$^9$ is selected from OH and C$_1$-C$_3$ alkoxy, and the other of R$^1$ and R$^9$ is (CH$_2$)$_n$OH.

In embodiments, a compound according to Formula (I) has the following structure:

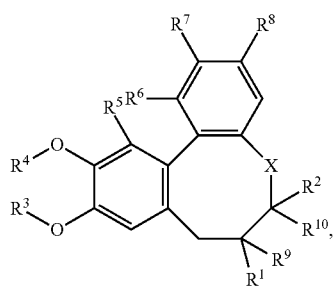
(I)

where:
X is O;
R$^1$ and R$^9$ are independently selected from H, OH, C$_1$-C$_3$ alkoxy, C$_1$-C$_3$ alkyl, and (CH$_2$)$_n$OH, where n is an integer from 1 to 3;
R$^2$ and R$^{10}$ are independently selected from H, OH and C$_1$-C$_3$ alkyl;
R$^3$ and R$^4$ are independently selected from H and C$_1$-C$_3$ alkyl;
R$^5$, R$^6$ and R$^7$ are H; and
R$^8$ is H, OH or C$_1$-C$_3$ alkyoxy.

In embodiments of a compound according to Formula (I'), R$^2$ and R$^{10}$ are H. In embodiments, each of R$^2$, R$^3$, R$^4$, R$^5$, R$^6$, R$^7$, and R$^{10}$ are H. In embodiments, R$^8$ is OH or C$_1$-C$_3$ alkoxy. In embodiments, R$^1$ and R$^9$ are independently selected from OH, C$_1$-C$_3$ alkoxy, and (CH$_2$)$_n$OH. In embodiments, one of R$^1$ and R$^9$ is selected from OH and C$_1$-C$_3$ alkoxy, and the other of R$^1$ and R$^9$ is (CH$_2$)$_n$OH.

Group J Compounds
Group J1 Compounds

In embodiments, a bioactive, taste modulating, or salty taste modulating is a compound having the following structure:

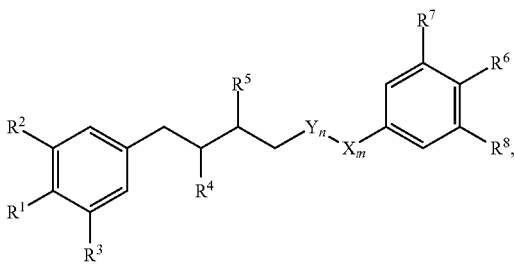
(J1)

where:

$R^1$ and $R^6$ are each independently OH, $C_1$-$C_3$ hydroxyl, $C_1$-$C_3$ alkoxy or saccharidyl;

$R^2$, $R^3$, $R^7$ and $R^8$ are each independently H, OH, $C_1$-$C_3$ hydroxyl, $C_1$-$C_3$ alkoxy;

$R^4$ and $R^5$ are each independently H, OH, $C_1$-$C_3$ alkyl, $C_1$-$C_3$ alkoxy, or $C_1$-$C_3$ hydroxyl;

Y is CHCH and n is zero or 1; and

X is $CHR^9$ and m is zero or 1, where $R^9$ is

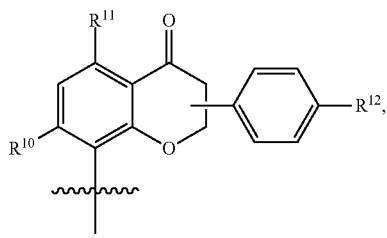

where $R^{10}$, $R^{11}$ and $R^{12}$ are each independently OH, $C_1$-$C_3$ alkoxy, or $C_1$-$C_3$ hydroxyl, provided that if n is 1, then m is 1.

In embodiments of a compound according to Formula J1, $R^1$, $R^6$, or $R^1$ and $R^6$ are saccharidyl and are

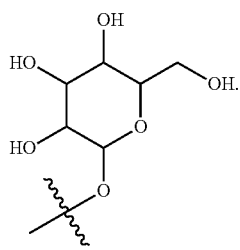 [SMILES: *OC1OC(CO)C(O)C(O)C1O]

In embodiments of a compound according to Formula J1, $R^1$ is OH. In embodiments, $R^2$, $R^3$, $R^7$ and $R^8$ are each independently H or $C_1$-$C_3$ alkoxy. In embodiments, where one of wherein $R^2$ and $R^3$ is H and the other is $C_1$-$C_3$ alkoxy, one of $R^7$ and $R^8$ is H and the other is $C_1$-$C_3$ alkoxy. In embodiments, $R^2$, $R^3$, $R^7$ and $R^8$ are each H. In embodiments, $R^{10}$ is present and is OH. In embodiments, $R^{11}$ is present and is $C_1$-$C_3$ alkoxy. In embodiments, $R^{12}$ is present and is OH. In embodiments, $R^9$ is present and is

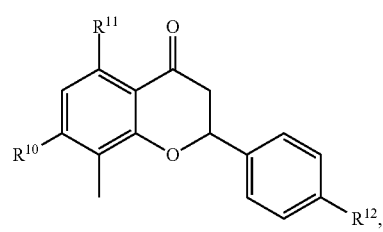

where $R^{10}$, $R^{11}$, and $R^{12}$ are as defined above.

In embodiments of a compound according to Formula J1, the compound has the following structure:

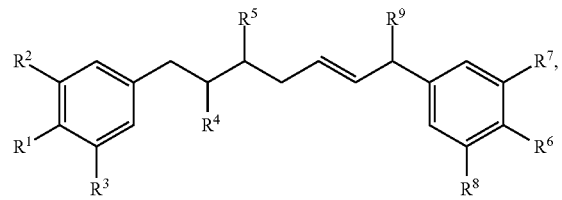

(J1″)

where $R^1$, $R^2$, $R^3$, $R^4$, $R^5$, $R^6$, $R^7$, $R^8$, and $R^9$ are as defined above.

In embodiments of a compound according to Formula J1, the compound has the following structure:

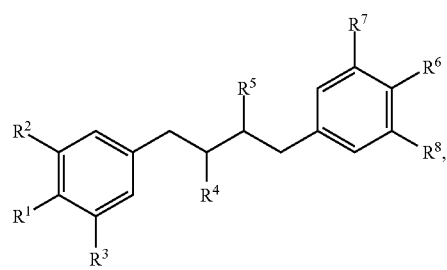

(J1′)

where $R^1$, $R^2$, $R^3$, $R^4$, $R^5$, $R^6$, $R^7$, and $R^8$ are as defined above.

In embodiments of a compound according to Formula J1, the compound has the following structure:

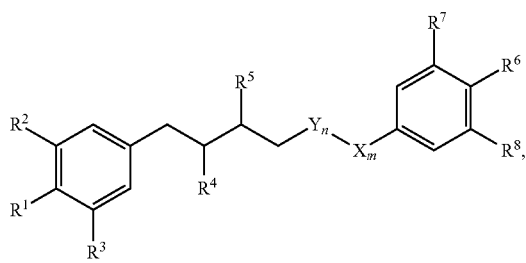

(J1)

where:

$R^1$ and $R^6$ are each independently OH, $C_1$-$C_3$ hydroxyl, $C_1$-$C_3$ alkoxy or saccharidyl;

$R^2$, $R^3$, $R^7$ and $R^8$ are each independently H, OH, $C_1$-$C_3$ hydroxyl, $C_1$-$C_3$ alkoxy;

$R^4$ and $R^5$ are each independently H, OH, $C_1$-$C_3$ alkoxy, or $C_1$-$C_3$ hydroxyl;

Y is CHCH and n is zero or 1; and
X is CHR$^9$ and m is zero or 1, where R$^9$ is

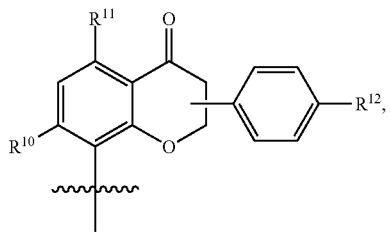

where R$^{10}$, R$^{11}$ and R$^{12}$ are each independently OH, C$_1$-C$_3$ alkoxy, or C$_1$-C$_3$ hydroxyl,
provided that if n is 1, then m is 1.

In embodiments, R$^1$, R$^6$ or R$^1$ and R$^6$ are saccharidyl and are

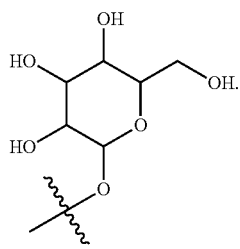 [SMILES: *OC1OC(CO)C(O)C(O)C1O]

In embodiments, R$^1$ is OH. In embodiments, R$^2$, R$^3$, R$^7$ and R$^8$ are each independently H or C$_1$-C$_3$ alkoxy. In embodiments, R$^2$ and R$^3$ is H and the other is C$_1$-C$_3$ alkoxy, and one of R$^7$ and R$^8$ is H and the other is C$_1$-C$_3$ alkoxy. In embodiments, R$^2$, R$^3$, R$^7$ and R$^8$ are each H. In embodiments, R$^{10}$ is present and is OH. In embodiments, R$^{11}$ is present and is C$_1$-C$_3$ alkoxy. In embodiments, R$^{12}$ is present and is OH. In embodiments, R$^9$ is present and is

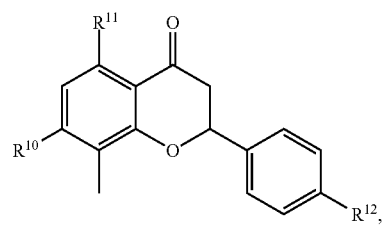

where R$^{10}$, R$^{11}$, and R$^{12}$ are as defined above.

Group J2 Compounds

In embodiments, a bioactive, taste modulating, or salty taste modulating compound is a compound having the following structure:

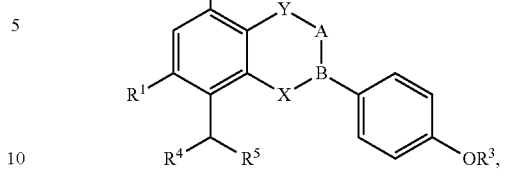

where
R$^1$ is H, OH, or saccharidyl;
R$^2$ and R$^3$ are each independently H or C$_1$-C$_3$ alkyl;
R$^4$ and R$^5$ are each independently H,

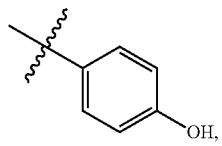

or CHC(R$^{10}$)R$^{11}$, where
R$^{10}$ and R$^{11}$ are each independently H or C$_1$-C$_5$ alkyl unsubstituted or substituted with one or more of OH and

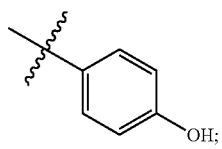

X is C=O or O;
Y is C=O or O, provided that when X is O, Y is C=O, or when X is C=O, Y is O;
A is CHR$^{12}$ or CR$^{12}$, where
R$^{12}$ is H, OH, or saccharidyl;
B is C or CH, provided that if B is C then A is CR$^{12}$.

In embodiments of a compound according to Formula J2, R$^1$ is saccharidyl and is

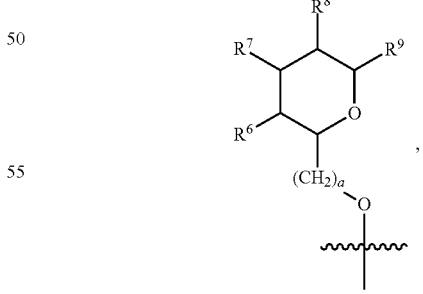

where
a is zero or 1, and
R$^6$, R$^7$, R$^8$, and R$^9$ are each independently H, OH, CH$_3$, or CH$_2$OH.

In embodiments of a compound according to Formula J2, R$^{12}$ is saccharidyl and is

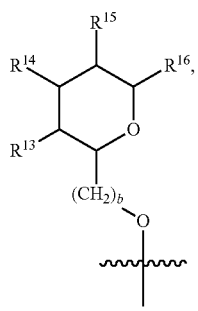

where
b is zero or 1, and
$R^{13}$, $R^{14}$, $R^{15}$, and $R^{16}$ are each independently H, OH, $CH_3$, or $CH_2OH$.

In embodiments of a compound according to Formula J2, $R^4$ is $CHC(CH_3)_2$ or

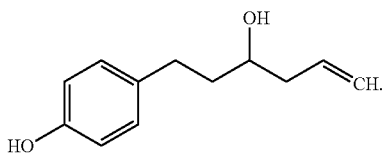

In embodiments of a compound according to Formula J2, $R^5$ is H or

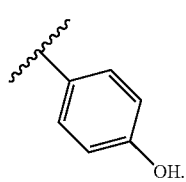 [SMILES: *c1ccc(O)cc1]

Group K Compound

In embodiments, a bioactive, taste modulating, or salty taste modulating compound is a compound having the following structure:

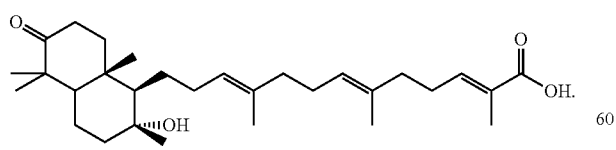
(K)

Group L Compounds

In embodiments, a bioactive, taste modulating, or salty taste modulating compound is a compound having the following structure:

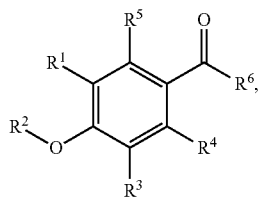
(L)

where:
$R^1$, $R^3$, $R^4$, $R^5$ and $R^6$ are each independently H, OH, $C_1$-$C_3$ hydroxyl or $C_1$-$C_3$ alkoxy; and
$R^2$ is H, $C_1$-$C_3$ alkyl, or

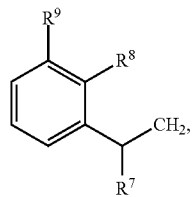

where $R^7$, $R^8$ and $R^9$ are each independently OH, $C_1$-$C_3$ hydroxyl or $C_1$-$C_3$ alkoxy.

In embodiments, $R^2$ is $C_1$-$C_3$ alkyl, such as methyl. In embodiments, $R^5$ is OH or $C_1$-$C_3$ hydroxyl. In embodiments, $R^3$ is H. In embodiments, $R^4$ is $C_1$-$C_3$ alkoxy, such as methoxy. In embodiments, $R^6$ is $C_1$-$C_3$ alkyl, such as methyl or propyl. In embodiments, $R^1$ is H. In embodiments, $R^1$ is $C_1$-$C_3$ hydroxyl, such as $C_2$ hydroxyl. In embodiments, $R^2$ is

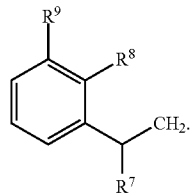

In embodiments, $R^7$, $R^8$ and $R^9$ are each independently OH or $C_1$-$C_3$ alkoxy. In embodiments, $R^7$ is OH and $R^8$ and $R^9$ are each independently $C_1$-$C_3$ alkoxy, such as methoxy.

In embodiments, $R^3$ is OH, $C_1$-$C_3$ hydroxyl, or $C_1$-$C_3$ alkoxy.
In embodiments, $R^5$ is H.
In embodiments, $R^6$ is $C_1$-$C_3$ alkoxy, such as methoxy.
In embodiments, $R^1$ is $C_1$-$C_3$ alkoxy, such as methoxy.
In embodiments, $R^4$ is H.
In embodiments of a compound according to Formula L', (i) $R^1$ is OH, $C_1$-$C_3$ hydroxyl or $C_1$-$C_3$ alkoxy; (ii) $R^2$ is H, $C_1$-$C_3$ alkyl, or

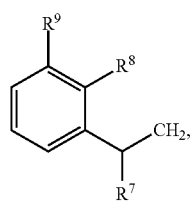

where $R^7$, $R^8$ and $R^9$ are each independently OH, $C_1$-$C_3$ hydroxyl or $C_1$-$C_3$ alkoxy; and (iii) $R^3$, $R^4$, $R^5$ and $R^6$ are each independently H, OH, $C_1$-$C_3$ hydroxyl or $C_1$-$C_3$ alkoxy. In embodiments, $R^2$ is $C_1$-$C_3$ alkyl, such as methyl. In embodiments, $R^5$ is OH or $C_1$-$C_3$ hydroxyl. In embodiments, $R^3$ is H. In embodiments, $R^4$ is $C_1$-$C_3$ alkoxy, such as methoxy. In embodiments, $R^6$ is $C_1$-$C_3$ alkyl, such as butyl. In embodiments, $R^1$ is $C_1$-$C_3$ hydroxyl. In some embodiments where $R^2$ is

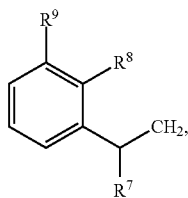

$R^7$, $R^8$ and $R^9$ may each independently be OH or $C_1$-$C_3$ alkoxy. For example, $R^7$ may be OH and $R^8$ and $R^9$ may each independently be $C_1$-$C_3$ alkoxy, such as methoxy. In some embodiments where $R^2$ is

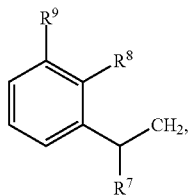

$R^3$ is OH, $C_1$-$C_3$ hydroxyl, or $C_1$-$C_3$ alkoxy. In some embodiments where $R^2$ is

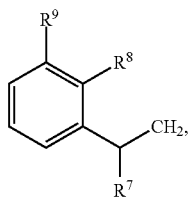

$R^5$ is H. In some embodiments where $R^2$ is

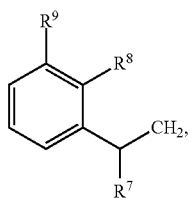

$R^6$ is $C_1$-$C_3$ alkoxy, such as methoxy. In some embodiments where $R^2$ is

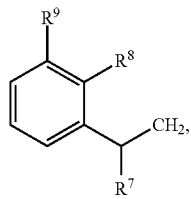

$R^1$ is $C_1$-$C_3$ alkoxy, such as methoxy. In some embodiments where $R^2$ is

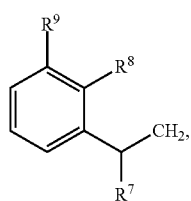

$R^4$ is H.

In embodiments, a compound according to Formula L is a compound having the following structure:

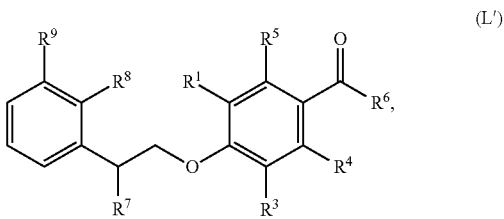

(L′)

where:

$R^1$, $R^3$, $R^4$, $R^5$ and $R^6$ are each independently H, OH, $C_1$-$C_3$ hydroxyl or $C_1$-$C_3$ alkoxy; and $R^7$, $R^8$ and $R^9$ are each independently OH, $C_1$-$C_3$ hydroxyl or $C_1$-$C_3$ alkoxy.

In embodiments of a compounds according to Formula L′, $R^7$, $R^8$ and $R^9$ are each independently OH or $C_1$-$C_3$ alkoxy. In embodiments, $R^7$ is OH and $R^8$ and $R^9$ are each independently $C_1$-$C_3$ alkoxy, such as methoxy. In embodiments, $R^3$ is OH, $C_1$-$C_3$ hydroxyl, or $C_1$-$C_3$ alkoxy. In embodiments, $R^5$ is H. In embodiments, $R^6$ is $C_1$-$C_3$ alkoxy, such as methoxy. In embodiments, $R^1$ is $C_1$-$C_3$ alkoxy, such as methoxy. In embodiments, $R^4$ is H.

Group M Compound

In embodiments, a bioactive, taste modulating, or salty taste modulating compound is a compound having the following structure:

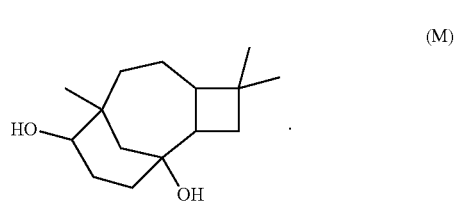 [SMILES: CC1(C)CC2C1CCC1(C)CC2(O)CCC1O]

(M)

Group N Compound

In embodiments, a bioactive, taste modulating, or salty taste modulating compound is a compound having the following structure:

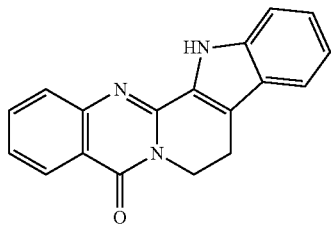

(N)

Group O Compound

In embodiments, a bioactive, taste modulating, or salty taste modulating compound is a compound having the following structure:

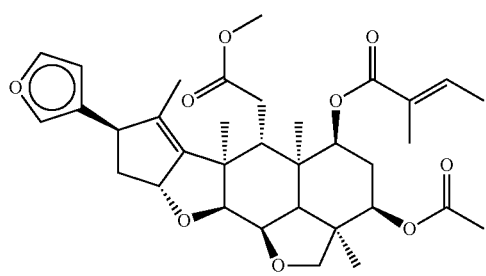

(O)

Group P Compounds
Group P1 Compounds

In embodiments, a bioactive, taste modulating, or salty taste modulating compound is a compound having the following structure:

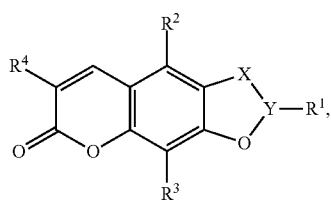

(P1)

where:
X is CH or $CH_2$;
Y is CH or C, with the caveat that if Y is C, then X is CH;
$R^1$ is H, or

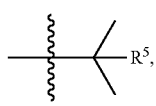

where $R^5$ is OH, C(O)OH, or $OC(O)R^6$, where $R^6$ is a $C_1$-$C_3$ alkyl;
$R^2$ and $R^3$ are independently H, or substituted with hydroxyl or unsubstituted saturated or unsaturated branched or straight $C_1$-$C_6$ alkoxy; and
$R^4$ is H, or a saturated or unsaturated branched or straight $C_1$-$C_6$ alkyl.

In embodiments, at least one of $R^2$ or $R^3$ is H. In embodiments, both $R^2$ and $R^3$ are H. In embodiments, at least one of $R^2$ and $R^3$ is a substituted saturated or unsaturated branched or straight $C_1$-$C_6$ alkoxy substituted with at least one hydroxyl group. In embodiments, both $R^2$ and $R^3$ are independently selected from a substituted saturated or unsaturated branched or straight $C_1$-$C_6$ alkoxy substituted with at least one hydroxyl group. For example, at least one of $R^2$ and $R^3$ can be methoxy. In embodiments, at least one of $R^2$ and $R^3$ is unsaturated. In embodiments, at least one of $R^2$ and $R^3$ is branched. In embodiments, $R^2$ is a straight unsubstituted saturated $C_1$-$C_3$ alkoxy; and $R^3$ is a branched unsubstituted, unsaturated $C_3$-$C_6$ alkoxy.

In embodiments, $R^4$ is saturated or unsaturated branched or straight $C_1$-$C_6$ alkyl. For example, $R^4$ can be $C_5$ alkyl. In embodiments, $R^4$ is unsaturated. In embodiments, $R^4$ is $CH(CH_3)_2CHCH_2$.

Group P2 Compounds

In embodiments, a bioactive, taste modulating, or salty taste modulating compound is a compound having the following structure:

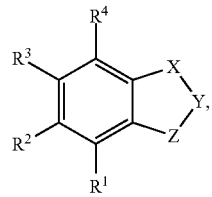

(P2)

where
X is selected from NH, O, C(O), $CR^5$ or $CR^5R^6$, where $R^5$ and $R^6$ are independently selected from H, OH, a straight or branched $C_1$ to $C_6$ hydroxyl, or a $C_1$ to $C_6$ alkyl; and
Y, and Z are independently selected from O, $CR^5$, $CR^5R^6$, where $R^5$ and $R^6$ are independently selected from H, OH, a straight or branched $C_1$ to $C_6$ hydroxyl, or a $C_1$ to $C_6$ alkyl, or

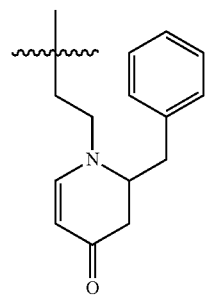

with the proviso that (i) no more than two of X, Y and Z and are O, and (ii) if Y is $CR^5$ then X or Z is also $CR^5$;
$R^1$ is H, $C_1$-$C_3$ alkoxy, $C(O)R^7$, where $R^7$ is a $C_1$ to $C_6$ straight or branched alkyl, or

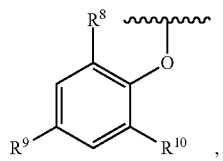

where $R^8$, $R^9$ and $R^{10}$ are independently selected from: H, OH, $C_1$ to $C_3$ hydroxyl, $C_1$ to $C_3$ alkoxy, or $C_3$ to $C_8$ alkyl;

$R^2$ is H, OH, or

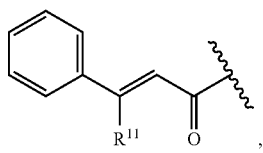

where $R^{11}$ is H, OH, or $C_1$ to $C_3$ hydroxyl;

$R^3$ is H, $C_1$-$C_3$ alkoxy, or together with $R^4$ form a six membered ring having an oxygen heteroatom to form a compound having a structure of:

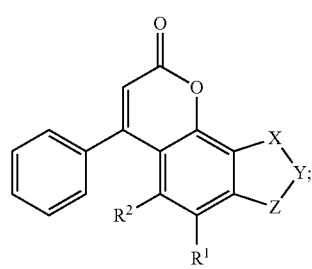
(P2′)

$R^4$ is H, $C_1$ to $C_3$ alkoxy, or together with $R^3$ forms the structure above.

In embodiments, X is $CR^5R^6$. In embodiments, X is $C(OH)(CH_2CH_2CH_2CH_3)$. In embodiments, X is O. In embodiments, X is $CH_2$.

In embodiments, Y is O. In embodiments, Y is $CR^5R^6$, where $R^5$ and $R^6$ are H and a branched $C_1$ to $C_6$ hydroxyl, such as $C(CH_3)(CH_3)OH$. In embodiments, Y is CH.

In embodiments, Z is C(O). In embodiments, Z is $CH_2$. In embodiments, Z is O.

In embodiments, $R^1$ is

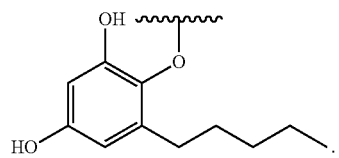

In embodiments, R1 is a $C_1$-$C_3$ alkoxy. In embodiments, $R^1$ is $C(O)R^7$, where $R^7$ is a $C_1$ to $C_6$ straight or branched alkyl.

In embodiments, $R^7$ is a branched $C_3$ alkyl.

In embodiments, $R^2$ is H. In embodiments, $R^2$ is OH. In embodiments, $R^2$ is

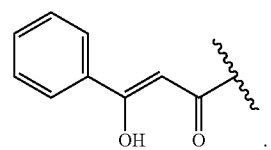 [SMILES: *C(=O)/C=C(\O)c1ccccc1]

In embodiments, $R^3$ together with $R^4$ form a six membered ring having an oxygen heteroatom to form a compound having the structure:

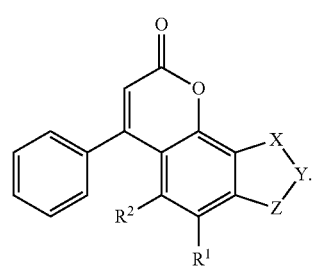
(P2′)

In embodiments, $R^3$ is H. In embodiments, $R^3$ is a $C_1$-$C_3$ alkoxy. In embodiments, $R^4$ is H.

In embodiments, X is NH.

In embodiments, Z is

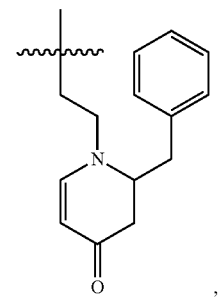 [SMILES: *CCN1C=CC(=O)CC1Cc1ccccc1]

Group P3 Compounds

In embodiments, a bioactive, taste modulating, or salty taste modulating compound is a compound having the following structure:

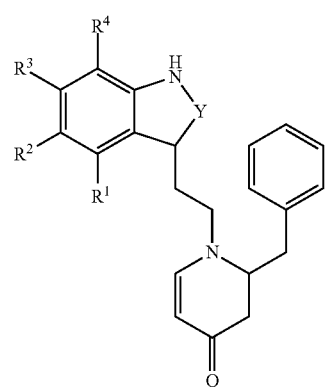
(P3)

where

Y is independently selected from $CR^5$, $CR^5R^6$, where $R^5$ and $R^6$ are independently selected from H, OH, a straight or branched $C_1$ to $C_6$ hydroxyl, or a $C_1$ to $C_6$ alkyl;

$R^1$ is H, $C_1$-$C_3$ alkoxy, $C(O)R^7$, where $R^7$ is a $C_1$ to $C_6$ straight or branched alkyl, or

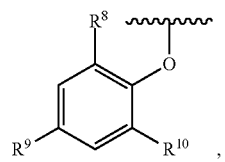

where $R^8$, $R^9$ and $R^{10}$ are independently selected from: H, OH, $C_1$ to $C_3$ hydroxyl, $C_1$ to $C_3$ alkoxy, or $C_3$ to $C_8$ alkyl;

$R^2$ is H or

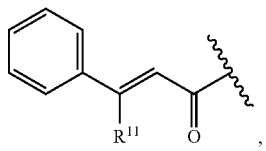

where $R^1$ is H, OH, or $C_1$ to $C_3$ hydroxyl;

$R^3$ is H, $C_1$-$C_3$ alkoxy, or together with $R^4$ form a six membered ring having an oxygen heteroatom to form a compound having a structure of:

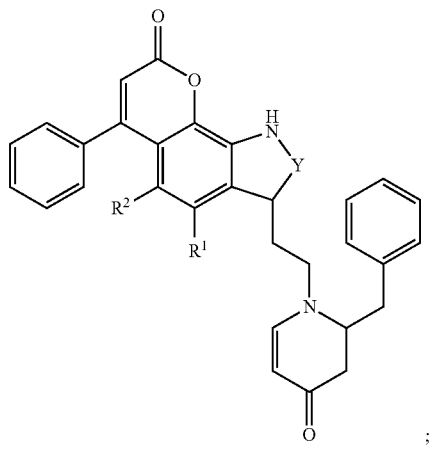

(P3')

$R^4$ is H, $C_1$ to $C_3$ alkoxy, or together with $R^3$ forms the structure above.

In embodiments, $R^1$ is $C_1$ to $C_3$ alkoxy. In embodiments, $R^1$ is H. In embodiments, $R^2$ is H. In embodiments, $R^3$ is H. In embodiments, $R^4$ is H.

Group P4 Compounds

In embodiments, a bioactive, taste modulating, or salty taste modulating compound is a compound having the following structure:

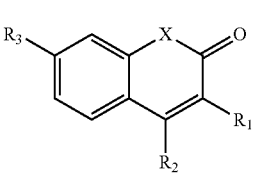

(P4)

where
$R^1$ is H or a saturated or unsaturated $C_1$ to $C_6$ alkyl;
$R^2$ is H or a $C_1$ to $C_3$ alkoxy; and
$R^3$ is H or

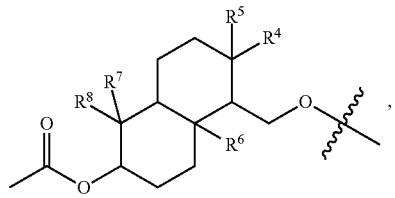

where $R^4$, $R^5$, $R^6$, $R^7$, and $R^8$ are independently selected from: H, OH, $C_1$ to $C_3$ hydroxyl, $C_1$ to $C_3$ alkoxy, and $C_1$ to $C_3$ alkyl; and X is NH or O.

In embodiments, $R^1$ is $CH_2CHC{=}(CH_3)_2$. In embodiments, $R^1$ is H. In embodiments, $R^2$ is methoxy. In embodiments, $R^2$ is H. In embodiments, $R^3$ is H. In embodiments, $R^3$ is

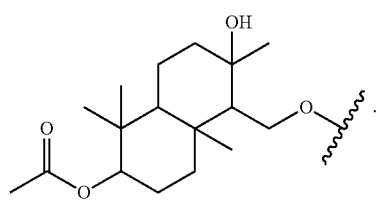 [SMILES: *OCC1C(C)(O)CCC2C(C)(C)C(OC(C)=O)CCC12C]

Group P5 Compound

In embodiments, a bioactive, taste modulating, or salty taste modulating compound is a compound having the following structure:

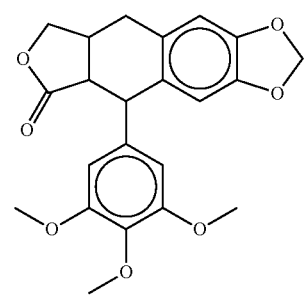

(P5, 59)

Group Q Compounds
Group Q1 Compounds

In embodiments, a bioactive, taste modulating, or salty taste modulating compound is a compound having the following structure:

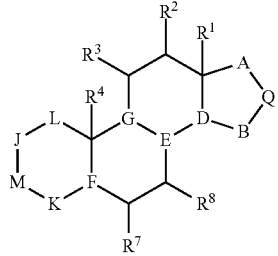

(Q1)

where A is:
a. $CR^9$ where $R^9$ is H, saturated or unsaturated $C_1$ to $C_6$ alkyl, $C_1$ to $C_3$ hydroxyl or $CHR^{10}$, where $R^{10}$ is $C_1$ to $C_6$ alkyl;
b. $CCR^{64}R^{65}R^{66}$, where $R^{64}$, $R^{65}$, and $R^{66}$ are independently selected from: $C_1$ to $C_{10}$ saturated or unsaturated, branched or straight chain alkyl, or $(CH_2)_aR^{11}$ where a is zero or 1 and $R^{11}$ is H, OH, or saccharidyl,
c. $CR^{23}$, where $R^{23}$ is saturated or unsaturated, substituted with an oxygen or unsubstituted five membered ring including at least one oxygen heteroatom,
d. $CR^{24}$, where $R^{24}$ is

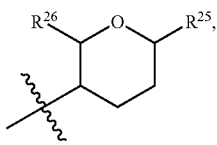

where $R^{25}$ and $R^{26}$ are independently selected from H, OH, or $C_1$ to $C_6$ branched or straight hydroxyl,
e. or along with Q and the atoms attached thereto form a ring structure of formula (Q1A) below,

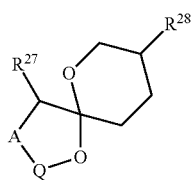

(Q1A)

where $R^{27}$ and $R^{28}$ are H, OH, $C_1$ to $C_3$ alkyl, $C_1$ to $C_3$ alkoxy, or $C_1$ to $C_3$ hydroxyl;
B is $CH_2$, or CH, with the caveat that if B is CH then D is C;
D, E, F, and G are independently selected from: C, $CR^{29}$, where $R^{29}$ is H, OH, $C_1$ to $C_3$ alkyl, or $C_1$ to $C_3$ hydroxyl, with the caveat that if D is C, then B is CH; if E is C, then G is C; and if F is C, then u is zero;
J is $C(R^{30})_vR^{31}$, where v is zero or 1 and $R^{30}$ and $R^{31}$ are independently selected from H, OH, $C_1$ to $C_3$ alkyl, $C_1$ to $C_3$ hydroxyl, or

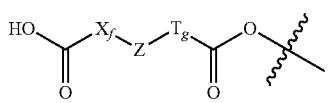

where T and X are $CH_2$ and where f and g are independently selected from zero (0), 1, or 2, and Z is selected from $CR^{32}R^{33}$, where $R^{32}$ and $R^{33}$ are independently selected from H, OH, $C_1$ to $C_3$ hydroxyl, or $C_1$ to $C_3$ alkyl, with the caveat that is v is zero then k is also zero;
K is $CR^5_uR^6$, where u is zero or 1 and $R^5$ and $R^6$ are independently selected from H, OH, $C_1$ to $C_3$ alkyl, $C_1$ to $C_3$ hydroxyl, $C_1$ to $C_3$ alkoxy, with the caveat that if u is zero than F is C;
L is $CR^{34}_kR^{35}$ where k is zero or 1 and $R^{34}$ and $R^{35}$ are independently selected from H, OH, $C_1$ to $C_3$ alkyl, $C_1$ to $C_3$ hydroxyl, with the caveat that if v is zero then k is zero;
M is C(O), $COC(O)R^{36}$ where $R^{36}$ is $C_1$ to $C_3$ alkyl, CH(OH), $CH(CH_2)_jR^{37}$ where j is zero, 1, or 2 and $R^{37}$ is H, OH, or saccharidyl;
Q is C(O), or $CR^{61}R^{62}$, where $R^{61}$ and $R^{62}$ are independently selected from H, OH, $C_1$ to $C_3$ alkyl, $C_1$ to $C_3$ hydroxyl or along with A form a five membered ring containing an oxygen heteroatom, or structure Q1A;
$R^1$, $R^3$, and $R^7$ are independently selected from H, OH or $C_1$ to $C_3$ alkyl;
$R^2$, is selected from H, O, OH or $C_1$ to $C_3$ alkyl; and
$R^4$ and $R^8$ are independently selected from H, C(O), OH, $C_1$ to $C_3$ alkyl, $C(O)R^{63}$ where $R^{63}$ is H or $C_1$ to $C_3$ alkyl, or $OC(O)R^{64}$ where $R^{64}$ is $C_1$ to $C_3$ alkyl, or H.

In embodiments, A is $CR^{23}$, wherein $R^{23}$ is saturated or unsaturated, substituted with an oxygen or unsubstituted five membered ring including at least one oxygen heteroatom.

In embodiments, $R^{23}$ is

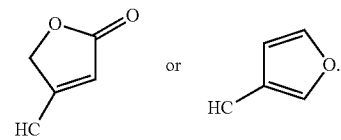

In embodiments, A is $CR^9$, where $R^9$ is H, saturated or unsaturated $C_1$ to $C_6$ alkyl, $C_1$ to $C_3$ hydroxyl or $CHR^{10}$, where $R^{10}$ is $C_1$ to $C_6$ alkyl.

In embodiments, $R^9$ is $CHR^{10}$. In embodiments, $R^{10}$ is $CH_3$.

In embodiments, A along with Q and the atoms attached thereto form a ring structure of formula (Q1A) below,

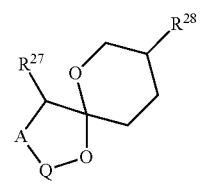

(Q1A)

where $R^{27}$ and $R^{28}$ are H, OH, $C_1$ to $C_3$ alkyl, $C_1$ to $C_3$ alkoxy, or $C_1$ to $C_3$ hydroxyl. In embodiments, $R^{27}$ and $R^{28}$ are each $CH_3$.

In embodiments, A is $CCR^{64}R^{65}R^{66}$, where $R^{64}$, $R^{65}$, and $R^{66}$ are independently selected from: $C_1$ to $C_{10}$ saturated or unsaturated, branched or straight chain alkyl, or $(CH_2)_aR^{11}$ where a is zero or 1 and $R^{11}$ is H, OH, or

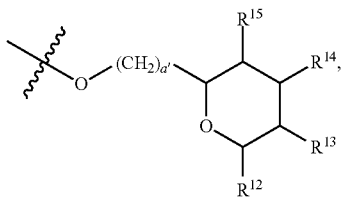

where a' is zero or 1, $R^{12}$, $R^{13}$, $R^{14}$, and $R^{15}$ are each independently H, OH, $CH_3$, $C_1$-$C_3$ hydroxyl, COOH, $(CH_2)_bOC(O)R^{16}$ where b is zero, 1, 2 or 3 and $R^{16}$ is H or $C_1$-$C_3$ alkyl, or $(CH_2)_dO(CH_2)_{d'}R^{17}$, where d and d' are independently zero (0) or 1 and $R^{17}$ is H or

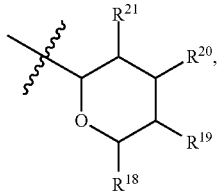

where $R^{18}$, $R^{19}$, $R^{20}$ and $R^{21}$ are each independently H, OH, $CH_3$, $C_1$-$C_3$ hydroxyl, COOH, $(CH_2)_eOC(O)R^{22}$ where e is zero, 1, 2 or 3 and $R^{22}$ is H or $C_1$-$C_3$ alkyl.

In embodiments, $R^{64}$ is $CH_3$, $R^{65}$ is a $C_3$ to $C_8$ unsaturated, branched or chain alkyl, and $R^{66}$ is $(CH_2)_aO(CH_2)_{a'}R^{11}$ where a and a' are both zero and $R^{11}$ is H or

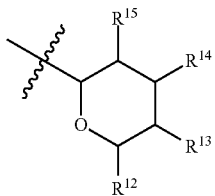

where $R^{12}$, $R^{13}$, and $R^{15}$ are each independently H, OH, $CH_3$, $C_1$-$C_3$ hydroxyl, and $R^{14}$ is $(CH_2)_dO(CH_2)_{d'}R^{17}$, where d and d' are independently zero (0) or 1 and $R^{17}$ is H or

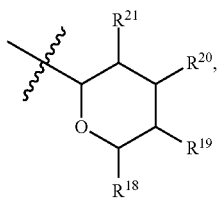

where $R^{18}$, $R^{19}$, $R^{20}$ and $R^{21}$ are each independently H, OH, $CH_3$, $C_1$-$C_3$ hydroxyl, COOH, $OC(O)R^{22}$ where $R^{22}$ is H or $C_1$-$C_3$ alkyl.

In embodiments, $R^{12}$, $R^{13}$, and $R^{15}$ are each independently OH or $CH_3$.

In embodiments, $R^{18}$, $R^{19}$, and $R^{21}$ are each independently OH or H and $R^{20}$ is $OC(O)CH_3$.

In embodiments, A is $CR^{24}$, where $R^{24}$ is

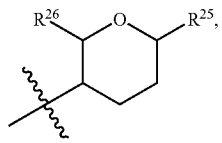

where $R^{25}$ and $R^{26}$ are independently selected from H, OH, or $C_1$ to $C_6$ branched or straight hydroxyl. In embodiments, $R^{26}$ is OH and $R^{25}$ is $C(CH_3)_2OH$.

In embodiments, Q is $CR^{61}R^{62}$, where $R^{61}$ and $R^{62}$ are independently selected from H, OH, $C_1$ to $C_3$ alkyl, $C_1$ to $C_3$ hydroxyl. In embodiments, Q is $CH_2$. In embodiments, Q is CHOH. In embodiments, Q is C(O).

In embodiments, B is $CH_2$. In embodiments, B is CH and D is C.

In embodiments, D is $CR^{29}$, where $R^{29}$ is H, OH, $C_1$ to $C_3$ alkyl, or $C_1$ to $C_3$ hydroxyl.

In embodiments, $R^{29}$ is OH. In embodiments, $R^{29}$ is H. In embodiments, $R^{29}$ is $CH_3$.

In embodiments, E is $CR^{29}$, where $R^{29}$ is H, OH, $C_1$ to $C_3$ alkyl, or $C_1$ to $C_3$ hydroxyl. In embodiments, $R^{29}$ is H. In embodiments, $R^{29}$ is $CH_3$. In embodiments, E is C and G is C.

In embodiments, G is CH.

In embodiments, F is CH. In embodiments, K is CH and F is C.

In embodiments, K is $CR^5{}_uR^6$, where u is 1 and $R^5$ and $R^6$ are independently selected from $C_1$ to $C_3$ alkyl. In embodiments, $R^5$ and $R^6$ are both $CH_3$. In embodiments, $R^5$ and $R^6$ are both H.

In embodiments, both J and L are CH. In embodiments, J is $CH_2$. In embodiments, J is $C(R^{30})_vR^{31}$, where v is 1, $R^{30}$ and $R^{31}$ is

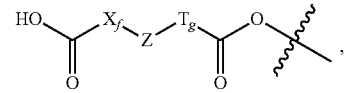

where T and X are $CH_2$ and where f and g are independently selected from zero, 1, or 2, and Z is $CR^{32}R^{33}$, where $R^{32}$ and $R^{33}$ are independently selected from H, OH, $C_1$ to $C_3$ hydroxyl, or $C_1$ to $C_3$ alkyl. In embodiments, f and g are both zero and $R^{32}$ and $R^{33}$ are OH and $C_1$ to $C_3$ alkyl.

In embodiments, L is $CH_2$.

In embodiments, M is CHOH. In embodiments, M is $CH(CH_2)_jR^{37}$ where j is zero, 1, or 2 and $R^{37}$ is H or

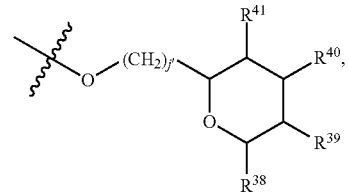

where j' is zero or 1, $R^{38}$, $R^{39}$, $R^{40}$, and $R^{41}$ are each independently selected from H, OH, $CH_3$, $C_1$-$C_3$ hydroxyl, $C_1$-$C_3$ alkoxy, COOH, $(CH_2)_mOC(O)R^{42}$ where m is zero, 1, 2 or 3 and $R^{42}$ is H or $C_1$-$C_3$ alkyl, or $(CH_2)_nO(CH_2)_{n'}R^{43}$, where n and n' are independently zero or 1 and $R^{43}$ is H or

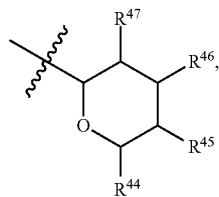

where $R^{44}$, $R^{45}$, $R^{46}$ and $R^{47}$ are each independently H, OH, $CH_3$, $C_1$-$C_3$ hydroxyl, COOH, $(CH_2)_pOC(O)R^{48}$ where p is zero, 1, 2 or 3 and $R^{48}$ is H or $C_1$-$C_3$ alkyl, or $(CH_2)_qO(CH_2)_{q'}R^{49}$ where q and q' are independently zero or 1 and $R^{49}$ is H or

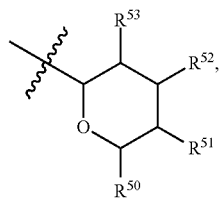

where $R^{50}$, $R^{51}$, $R^{52}$ and $R^{53}$ are each independently H, OH, $CH_3$, $C_1$-$C_3$ hydroxyl, COOH, $(CH_2)_rOC(O)R^{54}$ where r is zero, 1, 2 or 3 and $R^{54}$ is H or $C_1$-$C_3$ alkyl, or $(CH_2)_sO(CH_2)_{s'}R^{55}$ where s and s' are independently zero or 1 and $R^{55}$ is H or

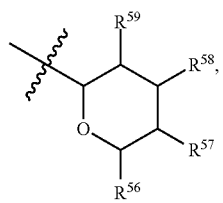

where $R^{56}$, $R^{57}$, $R^{58}$ and $R^{59}$ are each independently H, OH, $CH_3$, $C_1$-$C_3$ hydroxyl, COOH, $(CH_2)_tOC(O)R^{60}$ where t is zero, 1, 2 or 3 and $R^{60}$ is H or $C_1$-$C_3$ alkyl.

In embodiments, j and j' are both zero and $R^{38}$ is $CH_3$; $R^{39}$ is OH; $R^{40}$ is $OCH_3$; and $R^{41}$ is H. In embodiments, j and j' are both zero and $R^{39}$ is $(CH_2)_nO(CH_2)_{n'}R^{43}$, where n and n' are independently zero or 1 and $R^{43}$ is H or

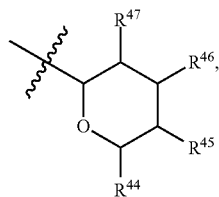

where $R^{44}$, $R^{45}$, $R^{46}$ and $R^{47}$ are each independently H, OH, $CH_3$, $C_1$-$C_3$ hydroxyl, COOH, $(CH_2)_pOC(O)R^{48}$ where p is zero, 1, 2 or 3 and $R^{48}$ is H or $C_1$-$C_3$ alkyl.

In embodiments, $R^{44}$ is $CH_2OH$; and $R^{45}$, $R^{46}$, and $R^{47}$ are all OH.

In embodiments, M is $CH(CH_2)_jR^{37}$ where $R^{37}$ is H, OH, or

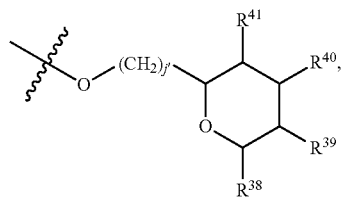

where j' is zero or 1, $R^{38}$ and $R^{41}$ are each independently selected from H, OH, $CH_3$, $C_1$-$C_3$ hydroxyl, $C_1$-$C_3$ alkoxy, COOH, $(CH_2)_mOC(O)R^{42}$ where m is zero, 1, 2 or 3 and $R^{42}$ is H or $C_1$-$C_3$ alkyl;
where $R^{39}$ is $OR^{43}$, where $R^{43}$ is H or

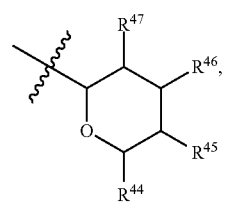

where $R^{44}$, $R^{45}$ and $R^{47}$ are each independently H, OH, $CH_3$, $C_1$-$C_3$ hydroxyl, COOH, $(CH_2)_pOC(O)R^{48}$ where p is zero, 1, 2 or 3 and $R^{48}$ is H or $C_1$-$C_3$ alkyl; and $R^{46}$ is $(CH_2)_qO(CH_2)_{q'}R^{49}$ where q and q' are independently zero or 1 and $R^{49}$ is H or

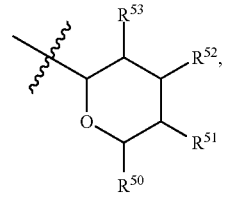

where $R^{50}$, $R^{51}$ and $R^{53}$ are each independently H, OH, $CH_3$, $C_1$-$C_3$ hydroxyl, COOH, $(CH_2)_rOC(O)R^{54}$ where r is zero, 1, 2 or 3 and $R^{54}$ is H or $C_1$-$C_3$ alkyl; and $R^{52}$ is $OR^{55}$ where $R^{55}$ is H or

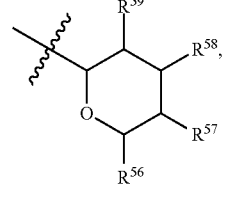

where $R^{56}$, $R^{57}$, $R^{58}$ and $R^{59}$ are each independently H, OH, $CH_3$ or $C_1$-$C_3$ hydroxyl; and $R^{40}$ is $OR^{43}$, and $R^{43}$ is H or

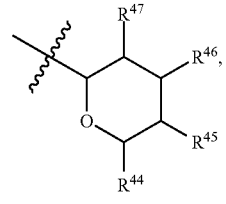

where

R$^{44}$, R$^{45}$, R$^{46}$ and R$^{47}$ are each independently OH, or C$_1$-C$_3$ hydroxyl.

In embodiments, M is CO.

In embodiments, R$^1$ is H or C$_1$-C$_3$ alkyl. In embodiments R$^1$ is CH$_3$.

In embodiments, R$^2$ is H, OH, O, or C$_1$-C$_3$ alkyl.

In embodiments, R$^3$ is H or C$_1$-C$_3$ alkyl.

In embodiments, R$^4$ is CH$_3$. In embodiments, R$^4$ is CHO.

In embodiments, R$^7$ and R$^8$ are both H. In embodiments, R$^8$ is OCOCH$_3$.

In embodiments, F is CR$^{29}$, where R$^{29}$ is H, OH, C$_1$-C$_3$ alkyl, or C$_1$-C$_3$ hydroxyl.

In embodiments, K is CR$^5$R$^6$.

In embodiments, M is C(O), COC(O)R$^{36}$, where R$^{36}$ is C$_1$-C$_3$ alkyl, CH(CH$_2$)$_j$R$^{37}$ where j is zero or 1.

Group Q1B Compounds

In embodiments, a bioactive, taste modulating, or salty taste modulating compound is a compound having the following structure:

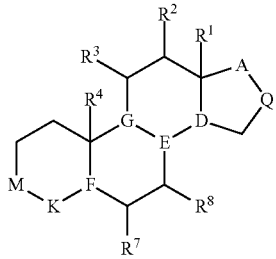
(Q1B)

where A is:
a. CCR$^{64}$R$^{65}$R$^{66}$, where R$^{64}$, R$^{65}$, and R$^{66}$ are independently selected from: C$_1$ to C$_{10}$ saturated or unsaturated, branched or straight chain alkyl, or (CH$_2$)$_a$R$^{11}$ where a is zero or 1 and R$^{11}$ is H, OH, or saccharidyl,
b. or along with Q and the atoms attached thereto form a ring structure of formula (Q1B) below,

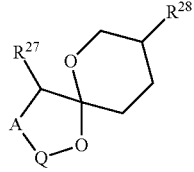
(Q1B')

where R$^{27}$ and R$^{28}$ are H, OH, C$_1$ to C$_3$ alkyl, C$_1$ to C$_3$ alkoxy, or C$_1$ to C$_3$ hydroxyl;

D, E, F, and G are independently selected from: CR$^{29}$, where R$^{29}$ is H, OH, C$_1$ to C$_3$ alkyl, or C$_1$ to C$_3$ hydroxyl;

K is CR$^5$R$^6$, where R$^5$ and R$^6$ are independently selected from H, or C$_1$ to C$_3$ alkyl;

M is CH(CH$_2$)$_j$R$^{37}$ where j is zero, 1, or 2 and R$^{37}$ is H, OH, or saccharidyl;

Q is CHOH, or along with A form a five membered ring containing an oxygen heteroatom, or structure II;

R$^1$, R$^2$ R$^3$, R$^4$, R$^5$, R$^6$, R$^7$ and R$^8$ are independently selected from H, OH, O, or C$_1$ to C$_3$ alkyl.

In embodiments, A along with Q and the atoms attached thereto form a ring structure of formula (Q1B') below,

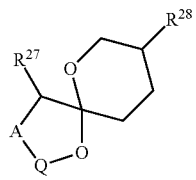
(Q1B')

where R$^{27}$ and R$^{28}$ are H, OH, C$_1$ to C$_3$ alkyl, C$_1$ to C$_3$ alkoxy, or C$_1$ to C$_3$ hydroxyl. In embodiments R$^{27}$ and R$^{28}$ are each CH$_3$.

In embodiments, A is CCR$^{64}$R$^{65}$R$^{66}$, where R$^{64}$, R$^{65}$, and R$^{66}$ are independently selected from: C$_1$ to C$_{10}$ saturated or unsaturated, branched or straight chain alkyl, or (CH$_2$)$_a$O (CH$_2$)$_{a'}$R$^{11}$ where a and a' are independently zero or 1 and R$^{11}$ is saccharidyl and is:

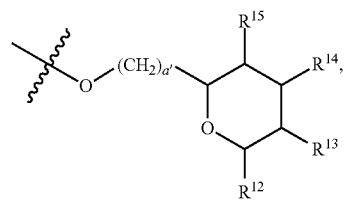

where a' is zero or 1, R$^{12}$, R$^{13}$, R$^{14}$, and R$^{15}$ are each independently H, OH, CH$_3$, C$_1$-C$_3$ hydroxyl, COOH, (CH$_2$)$_b$OC(O)R$^{16}$ where b is zero, 1, 2 or 3 and R$^{16}$ is H or C$_1$-C$_3$ alkyl, or (CH$_2$)$_d$O(CH$_2$)$_{d'}$R$^{17}$, where d and d' are independently zero (0) or 1 and R$^{17}$ is H or

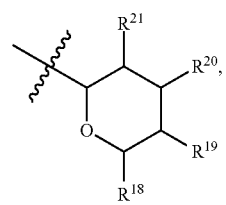

where R$^{18}$, R$^{19}$, R$^{20}$ and R$^{21}$ are each independently H, OH, CH$_3$, C$_1$-C$_3$ hydroxyl, COOH, (CH$_2$)$_e$OC(O)R$^{22}$ where e is zero, 1, 2 or 3 and R$^{22}$ is H or C$_1$-C$_3$ alkyl.

In embodiments, R$^{64}$ is CH$_3$, R$^{65}$ is a C$_3$ to C$_8$ unsaturated, branched or chain alkyl, and R$^{66}$ is (CH$_2$)$_a$O(CH$_2$)$_{a'}$R$^{11}$ where a and a' are both zero and R$^{11}$ is saccharidyl and is:

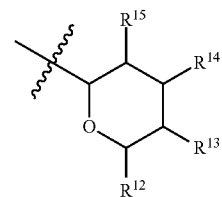

where R$^{12}$, R$^{13}$, and R$^{15}$ are each independently H, OH, CH$_3$, C$_1$-C$_3$ hydroxyl, and R$^{14}$ is (CH$_2$)$_d$O(CH$_2$)$_{d'}$R$^{17}$, where d and d' are independently zero (0) or 1 and R$^{17}$ is H or

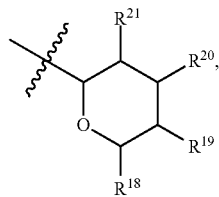

where $R^{18}$, $R^{19}$, $R^{20}$ and $R^{21}$ are each independently H, OH, $CH_3$, $C_1$-$C_3$ hydroxyl, COOH, $OC(O)R^{22}$ where $R^{22}$ is H or $C_1$-$C_3$ alkyl.

In embodiments, $R^{12}$, $R^{13}$, and $R^{15}$ are each independently OH or $CH_3$.

In embodiments, $R^{18}$, $R^{19}$, and $R^{21}$ are each independently OH or H and $R^{20}$ is $OC(O)CH_3$.

In embodiments, M is $CH(CH_2)_j R^{37}$ where j is zero, 1, or 2 and $R^{37}$ is saccharidyl and is:

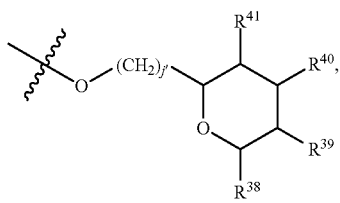

where j' is zero or 1, $R^{38}$, $R^{39}$, $R^{40}$, and $R^{41}$ are each independently selected from H, OH, $CH_3$, $C_1$-$C_3$ hydroxyl, $C_1$-$C_3$ alkoxy, COOH, $(CH_2)_m OC(O)R^{42}$ where m is zero, 1, 2 or 3 and $R^{42}$ is H or $C_1$-$C_3$ alkyl, or $(CH_2)_n O(CH_2)_{n'} R^{43}$, where n and n' are independently zero (0) or 1 and $R^{43}$ is H or

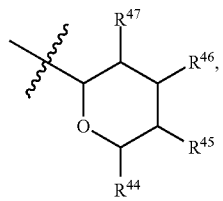

where $R^{44}$, $R^{45}$, $R^{46}$ and $R^{47}$ are each independently H, OH, $CH_3$, $C_1$-$C_3$ hydroxyl, COOH, $(CH_2)_p OC(O)R^{48}$ where p is zero, 1, 2 or 3 and $R^{48}$ is H or $C_1$-$C_3$ alkyl, or $(CH_2)_q O(CH_2)_{q'} R^{49}$ where q and q' are independently zero or 1 and $R^{49}$ is H or

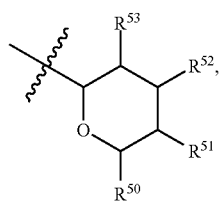

where $R^{50}$, $R^{51}$, $R^{52}$ and $R^{53}$ are each independently H, OH, $CH_3$, $C_1$-$C_3$ hydroxyl, COOH, $(CH_2)_r OC(O)R^{54}$ where r is zero, 1, 2 or 3 and $R^{54}$ is H or $C_1$-$C_3$ alkyl, or $(CH_2)_s O(CH_2)_{s'} R^{55}$ where s and s' are independently zero or 1 and $R^{55}$ is H or

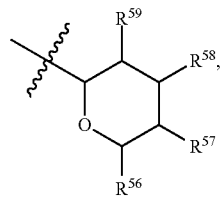

where $R^{56}$, $R^{57}$, $R^{58}$ and $R^{59}$ are each independently H, OH, $CH_3$, $C_1$-$C_3$ hydroxyl, COOH, $(CH_2)_t OC(O)R^{60}$ where t is zero, 1, 2 or 3 and $R^{60}$ is H or $C_1$-$C_3$ alkyl.

In embodiments, j and j' are both zero and $R^{38}$ is $CH_3$; $R^{39}$ is OH; $R^{40}$ is $OCH_3$; and $R^{41}$ is H.

In embodiments, j and j' are both zero and $R^{39}$ is $(CH_2)_n O(CH_2)_{n'} R^{43}$, where n and n' are independently zero or 1 and $R^{43}$ is saccharidyl and is:

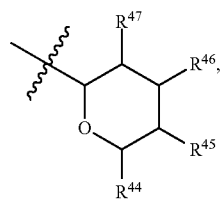

where $R^{44}$, $R^{45}$, $R^{46}$ and $R^{47}$ are each independently H, OH, $CH_3$, $C_1$-$C_3$ hydroxyl, COOH, $(CH_2)_p OC(O)R^{48}$ where p is zero, 1, 2 or 3 and $R^{48}$ is H or $C_1$-$C_3$ alkyl.

In embodiments, $R^{44}$ is $CH_2OH$; and $R^{45}$, $R^{46}$, and $R^{47}$ are all OH.

In embodiments, D is $CR^{29}$, where $R^{29}$ is $C_1$ to $C_3$ alkyl.
In embodiments, E is $CR^{29}$, where $R^{29}$ is $C_1$ to $C_3$ alkyl.
In embodiments, G is CH.
In embodiments, F is CH.
In embodiments, K is CH and F is C.
In embodiments, K is $CR^5_u R^6$, where u is 1 and $R^5$ and $R^6$ are independently selected from $C_1$ to $C_3$ alkyl. In embodiments, $R^5$ and $R^6$ are both $CH_3$.
In embodiments, $R^2$, $R^4$, $R^8$, and $R^9$ are all H.
In embodiments, $R^1$ is $C_1$-$C_3$ alkyl. In embodiments, $R^1$ is H.
In embodiments, $R^3$ is O. In embodiments, $R^3$ is H.

Group Q2 Compounds

In embodiments, a bioactive, taste modulating, or salty taste modulating compound is a compound having the following structure:

(Q2)

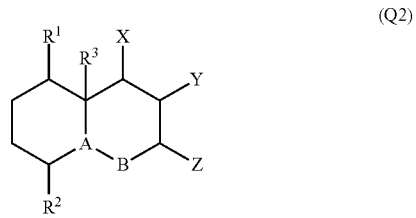

where A is C or $CR^4$, where $R_4$ is H, OH, $C_1$ to $C_3$ alkyl, with the caveat that if A is C, then B is $CR^6$;

B is $CR^5_a R^6$, where a is zero (0) or 1, and $R^5$ and $R^6$ are independently selected from H, OH, $C_1$ to $C_3$ alkyl, with the caveat that if A is C, then B is $CR^6$;

X is H, or along with Y and the atoms attached thereto form a ring structure having formula (Q2A) below,

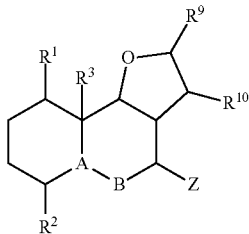
(Q2A)

where $R^9$ and $R^{10}$ are independently selected from O and $CH_2$;

Z is H or along with Y and the atoms attached thereto form a ring structure having formula (Q2B) below,

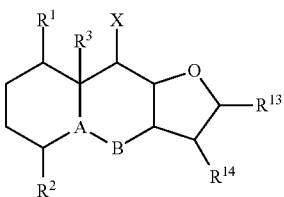
(Q2B)

where $R^{13}$ and $R^{14}$ are independently selected from O and $CH_2$;

Y together with either X or Z forms a ring structure of formula Q2A or Q2B above; and $R^1$, $R^2$ and $R^3$ are independently selected from H, $CH_2$, $C_1$ to $C_3$ alkyl.

In embodiments, A is $CH_3$. In embodiments, $R^1$ is $CH_2$. In embodiments, $R^2$ is H. In embodiments, $R^3$ is H. In embodiments, A is $CR^4$, where $R^4$ is $C_1$ to $C_3$ alkyl. In embodiments, B is $CH_2$.

In embodiments, X and Y along with the atoms attached thereto form a ring structure having formula (Q2A) below,

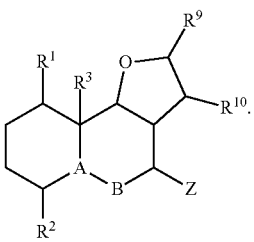
(Q2A)

In embodiments, $R^9$ is O and $R^{10}$ is $CH_2$.

In embodiments, Y and Z along with the atoms attached thereto form a ring structure having formula (Q2B) below,

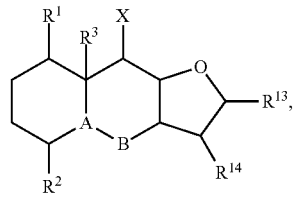
(Q2B)

where $R^{13}$ and $R^{14}$ are independently selected from O and $CH_2$. In embodiments, $R^3$ is $CH_3$. In embodiments, $R^1$ is H. In embodiments, $R^2$ is $CH_2$. In embodiments, $R^2$ is $CH_3$.

Group Q3 Compounds

In embodiments, a bioactive, taste modulating, or salty taste modulating compound is a compound having the following structure:

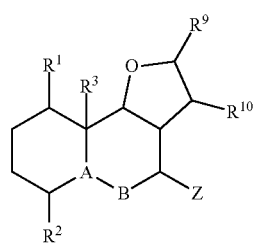
(Q3)

where A is C or $CR^4$, where $R_4$ is H, OH, $C_1$ to $C_3$ alkyl, with the caveat that if A is C, then B is $CR^6$;

B is $CR^5_aR^6$, where a is zero or 1, and $R^5$ and $R^6$ are independently selected from H, OH, $C_1$ to $C_3$ alkyl;

Z is H or $CR^{11}R^{12}$ where $R^{11}$ and $R^{12}$ are independently selected from H, OH, $C_1$ to $C_3$ alkyl;

$R^1$, $R^2$ and $R^3$ are independently selected from H, $CH_2$, or a saturated or unsaturated $C_1$ to $C_6$ alkyl; and $R^9$ and $R^{10}$ are independently selected from O or $CH_2$.

In embodiments, A is $CCH_3$. In embodiments, B is $CH_2$. In embodiments, Z is H. In embodiments, $R^1$ is $CH_2$. In embodiments, $R_2$ is H. In embodiments, $R_3$ is H. In embodiments, $R^9$ is O. In embodiments, $R^{10}$ is $CH_2$.

Group R Compounds

Group R1 Compounds

In embodiments a bioactive, taste modulating, or salty taste modulating compound is a compound having the following structure:

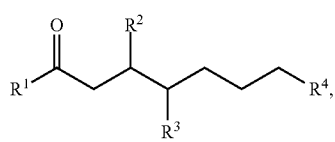
(R1)

where $R^1$ is OH or saccharidyl;

$R^2$ and $R^3$ are independently H, OH, and COOH; and $R^4$ is $C_3$-$C_{14}$ saturated or unsaturated alkyl optionally substituted with one or more hydroxyls.

In embodiments $R^1$ is OH. In embodiments $R^2$ is H. In embodiments, $R^2$ is OH. In embodiments, $R^3$ is H. In embodiments, $R^3$ is COOH. In embodiments, $R^4$ is $C_9$ to $C_{13}$ unsaturated alkyl. In embodiments, $R^4$ is $C_9$ to $C_{13}$ unsaturated alkyl with at least one hydroxyl. In embodiments, $R^4$ is $C_{10}$ to $C_{12}$ alkyl with at least two double bonds, such as $C_{11}$ with at least two double bonds. In embodiments, $R^4$ is $C_{11}$ with three double bonds. In embodiments, $R^4$ is $C_{11}$ with three double bonds and one hydroxyl. In embodiments, $R^4$ is $C_3$ to $C_7$ with at least one double bond.

In embodiments of a compound according to Formula R1 is a compound where $R^2$ and $R^3$ are independently H, OH, and COOH; and $R^4$ is $C_3$-$C_{10}$ saturated or unsaturated alkyl optionally substituted with one or more hydroxyls. In embodiments, $R^2$ is OH. In embodiments, $R^3$ is COOH. In embodiments, $R^4$ is $C_3$ to $C_7$ with at least one double bond.

Group R2 Compounds

In embodiments a bioactive, taste modulating, or salty taste modulating compound is a compound having the following structure:

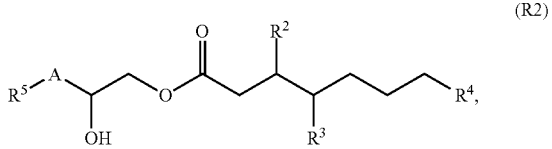

(R2)

where

A is $(CH_2)_x$, where x is 0 or 1;

$R^5$ is saccharidyl;

$R^2$ and $R^3$ are independently H, OH, and COOH; and $R^4$ is $C_8$-$C_{16}$ saturated or unsaturated alkyl optionally substituted with one or more hydroxyls.

In embodiments, a compound of formula R2 the following structure:

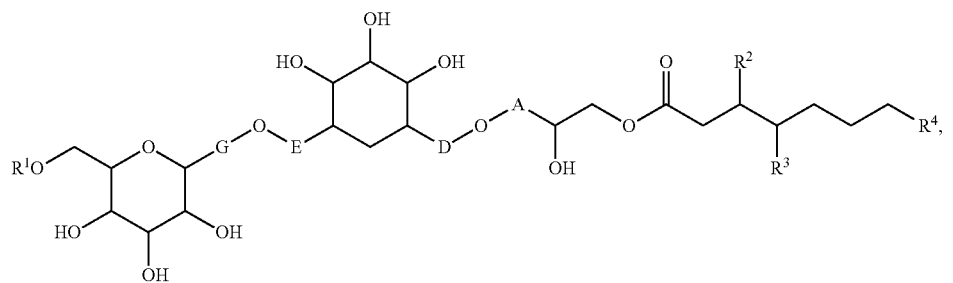

where

A, D, E and G are independently $(CH_2)_x$, where x is 0 or 1;

$R^1$ is H or saccharidyl;

$R^2$ and $R^3$ are independently H, OH, and COOH; and $R^4$ is $C_8$-$C_{16}$ saturated or unsaturated alkyl optionally substituted with one or more hydroxyls.

In embodiments, $R^1$ is H. In embodiments, $R^2$ is H. In embodiments, $R^3$ is H. In embodiments, $R^4$ is $C_8$ to $C_{14}$ unsaturated alkyl optionally substituted with one or more hydroxyls, such as $C_{10}$ to $C_{13}$ unsaturated alkyl optionally substituted with one or more hydroxyls. In embodiments, $R^4$ is $C_{11}$ unsaturated alkyl optionally substituted with one or more hydroxyls. In embodiments, $R^4$ is $C_{11}$ unsaturated alkyl with one double bond optionally substituted with one or more hydroxyls.

In embodiments, x is one in A and E; and x is zero in D and E.

Group R3 Compounds

In embodiments a bioactive, taste modulating, or salty taste modulating compound is a compound having the following structure:

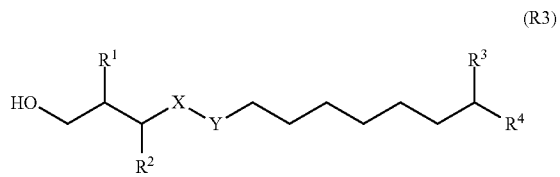

(R3)

where $R^1$ is H, or OH;

$R^2$ and $R^3$ are independently H, OH, or $CH_2OH$;

X is O or CHOH;

Y is C=O or $CH_2$; and $R^4$ is $C_3$-$C_{12}$ unsaturated alkyl.

In embodiments, $R^1$ is OH. In embodiments, $R^2$ is H. In embodiments, X is CHOH. In embodiments, Y is $CH_2$. In embodiments, $R^3$ is H.

In embodiments, $R^4$ is a $C_3$ to $C_7$ unsaturated alkyl. In embodiments, $R^4$ is a $C_5$ unsaturated alkyl. In embodiments, $R^4$ is a $C_5$ alkyl with one double bond.

In embodiments, $R^3$ is OH.

In embodiments, $R^4$ is a $C_8$ to $C_{12}$ unsaturated alkyl. In embodiments, $R^4$ is a $C_{10}$ unsaturated alkyl. In embodiments, $R^4$ is a $C_{10}$ alkyl with one double bond.

Group R4 Compounds

In embodiments a bioactive, taste modulating, or salty taste modulating compound is a compound having the following structure:

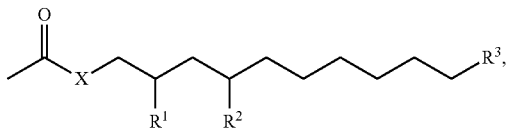

(R4)

where

X is O or NH;

$R^1$ is H, OH, or $CH_2OH$;

$R^2$ is H or $OCOR^5$, wherein $R^5$ is a $C_1$-$C_3$ alkyl; and $R^3$ is H or $C_1$-$C_{10}$ saturated or unsaturated alkyl.

In embodiments, X is O. In embodiments, $R^1$ is OH. In embodiments, $R^2$ is $OCOR^5$. In some embodiments where $R^2$ is $OCOR^5$, $R^5$ is $CH_3$. In embodiments, $R^3$ is $C_5$ to $C_9$ saturated or unsaturated alkyl, such as $C_7$ unsaturated alkyl. In embodiments, $R^3$ is $C_7$ alkyl with one double bond.

In embodiments, X is NH. In some embodiments where X is NH, $R^1$ and $R^2$ are both H. In some embodiments where X is NH, $R^3$ is H.

Group S Compounds

In embodiments a bioactive, taste modulating, or salty taste modulating compound is a compound having the following structure:

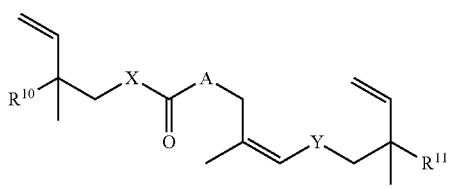

(S)

where:
- X and Y are each independently $C_7$-$C_{20}$ straight or branched chain unsaturated alkyl unsubstituted or substituted with one or more OH;
- A is saccharidyl; and
- $R^{10}$ and $R^{11}$ are each independently H, OH or saccharidyl.

In embodiments a compound according to Formula S has the following structure:

In embodiments, one or both of $R^{10}$ and $R^{11}$ are saccharidyl and are independently

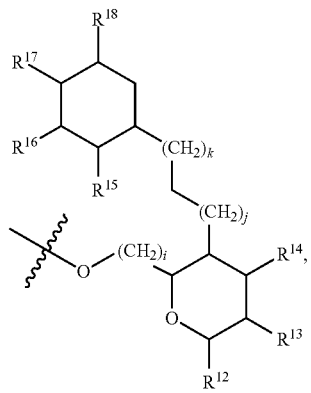

where
- i, j and k are each independently zero or 1, and
- $R^{12}$, $R^{13}$, $R^{14}$, $R^{15}$, $R^{16}$, $R^{17}$ and $R^{18}$ are each independently H, OH, $CH_3$, $CH_2CH_3$ and $CH_2OH$.

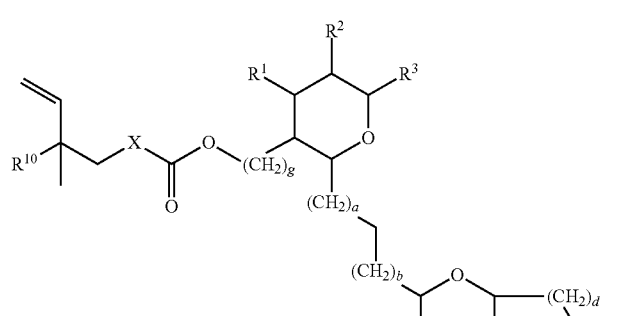

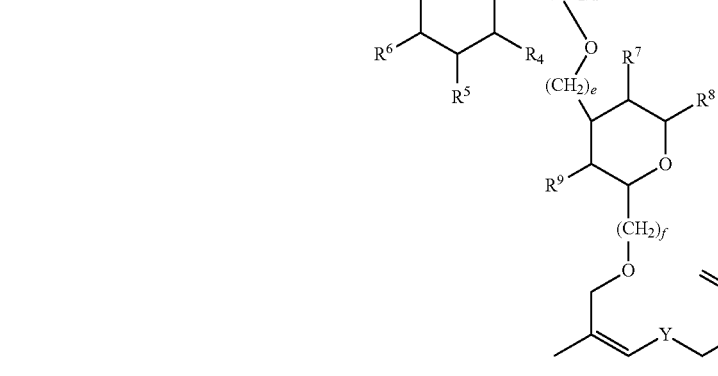

(S')

where:
- a, b, d, e, f and g are each independently zero or 1;
- X and Y are each independently $C_7$-$C_{20}$ straight or branched chain unsaturated alkyl unsubstituted or substituted with one or more OH;
- $R^1$, $R^2$, $R^3$, $R^4$, $R^5$, $R^6$, $R^7$, $R^8$, and $R^9$ are each independently H, OH, $CH_3$, $CH_2CH_3$, and $CH_2OH$; and
- $R^{10}$ and $R^{11}$ are each independently H, OH or saccharidyl.

In embodiments, X and Y are each independently $C_8$-$C_{16}$ straight or branched chain unsaturated alkyl unsubstituted or substituted with one or more OH and having 2 to 6 double bounds. In embodiments, X and Y are each independently $C_{10}$-$C_{15}$ straight or branched chain unsaturated alkyl unsubstituted or substituted with one or more OH and having 2 to 4 double bounds.

In embodiments a compound according to Formula S has the following structure:

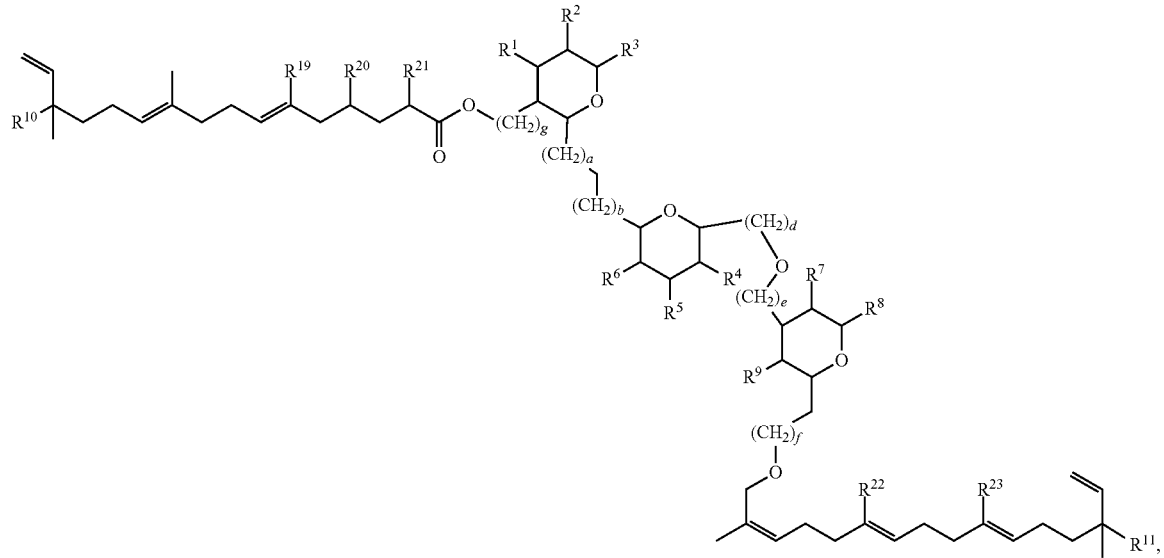
where a, b, d, e, f and g, and $R^1$, $R^2$, $R^3$, $R^4$, $R^5$, $R^6$, $R^7$, $R^8$, $R^9$, $R^{10}$ and $R^{11}$ are as defined above; and wherein $R^{19}$, $R^{20}$, $R^{21}$, $R^{22}$ and $R^{23}$ are each independently H, $CH_3$ or OH.
In embodiments a compound according to Formula S has the following structure:
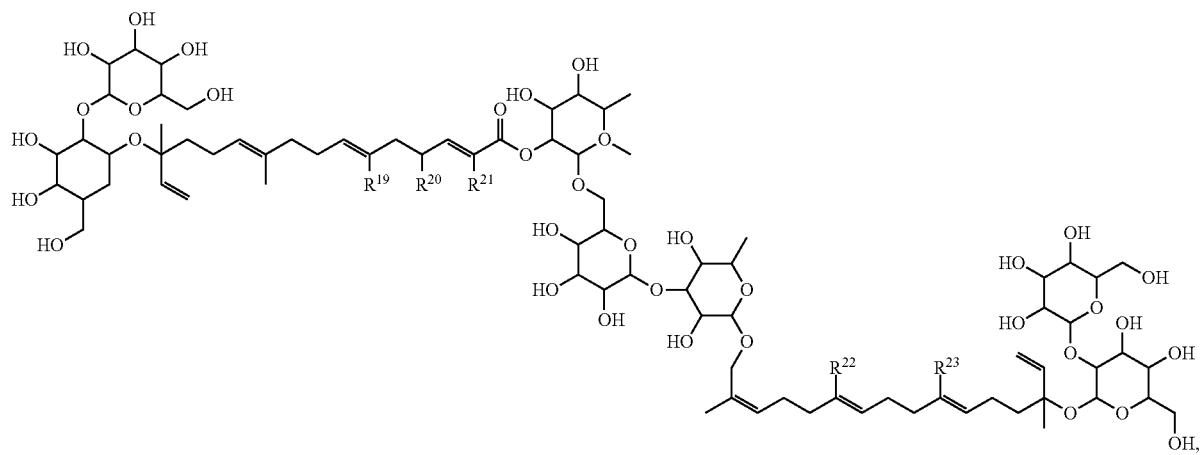

where $R^{19}$, $R^{20}$, $R^{21}$, $R^{23}$ and $R^{24}$ are each independently H, $CH_3$ or OH.

Group T Compounds

In embodiments, a bioactive, taste modulating, or salty taste modulating compound is a compound having the following structure:

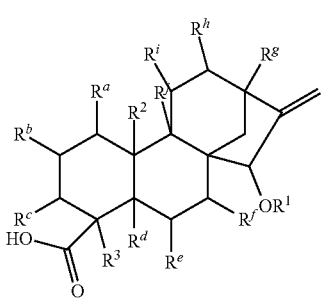

(T)

where:
- $R^1$ is H, or $COR^4$ where $R^4$ is H, or saturated or unsaturated $C_1$-$C_6$ straight or branched alkyl; and
- $R^2$, $R^3$, $R^a$, $R^b$, $R^c$, $R^d$, $R^e$, $R^f$, $R^g$, $R^h$, $R^i$, and $R^j$ are independently selected from H, or saturated or unsaturated $C_1$-$C_3$ alkyl.

In embodiments, $R^2$, $R^3$, $R^a$, $R^b$, $R^c$, $R^d$, $R^e$, $R^f$, $R^g$, $R^h$, $R^i$, and $R^j$ are independently selected from H, or saturated or unsaturated $C_1$-$C_3$ alkyl with the caveat that saturated or unsaturated $C_1$-$C_3$ alkyl substituents are not directly adjacent each other.

In embodiments, $R^2$ is a saturated or unsaturated $C_1$-$C_3$ alkyl, such as methyl. In embodiments, $R^3$ is a saturated or unsaturated $C_1$-$C_3$ alkyl, such as methyl. In embodiments, $R^2$ is $CH_3$ and $R^3$ is $CH_3$.

In embodiments, $R^1$ is H. In embodiments, $R^1$ is $COCH_3$. In embodiments, $R^1$ is $COR^4$ and $R^4$ is

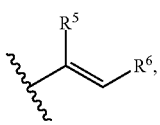

where $R^5$ and $R^6$ are independently selected from H, or saturated or unsaturated $C_1$-$C_4$.

In embodiments, $R^5$ and $R^6$ are both $CH_3$.

In embodiments a compound according to Formula T is a compound where (i) $R^2$, $R^3$, $R^a$, $R^b$, $R^c$, $R^d$, $R^e$, $R^f$, $R^g$, $R^h$, $R^i$, and $R^j$ are independently selected from H, or saturated or unsaturated $C_1$-$C_3$ alkyl; and (ii) $R^7$ is H or saturated or unsaturated $C_1$-$C_3$ alkyl. In such embodiments, $R^7$ may be $CH_3$. $R^2$, $R^3$, $R^a$, $R^b$, $R^c$, $R^d$, $R^e$, $R^f$, $R^g$, $R^h$, $R^i$, and $R^j$ may independently be selected from H, or saturated or unsaturated $C_1$-$C_3$ alkyl with the caveat that saturated or unsaturated $C_1$-$C_3$ alkyl substituents are not directly adjacent each other. $R^2$ may be a saturated or unsaturated $C_1$-$C_3$ alky, such as methyl. $R^3$ may be a saturated or unsaturated $C_1$-$C_3$ alkyl, such as methyl.

In some of such embodiment, $R^2$ is $CH_3$ and $R^3$ is $CH_3$.

In embodiments, a bioactive, taste modulating, or salty taste modulating compound is a compound having the following structure:

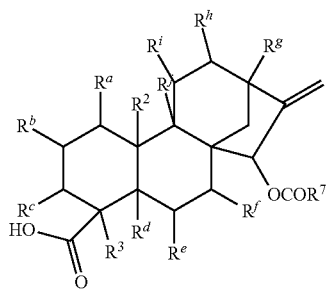

(T2)

where
- $R^2$, $R^3$, $R^a$, $R^b$, $R^c$, $R^d$, $R^e$, $R^f$, $R^g$, $R^h$, $R^i$, and $R^j$ are independently selected from H, or saturated or unsaturated $C_1$-$C_3$ alkyl; and
- $R^7$ is H or saturated or unsaturated $C_1$-$C_3$ alkyl.

Group U Compounds

In embodiments, a bioactive, taste modulating, or salty taste modulating compound is a compound having the following structure:

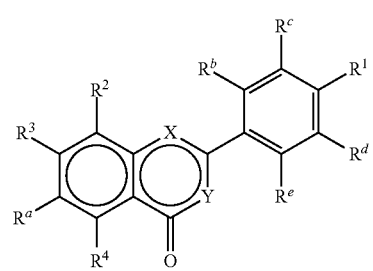

(U)

where:
- $R^1$ is H, OH, or $C_1$-$C_3$ alkoxy;
- $R^a$, $R^b$, $R^c$, $R^d$, and $R^e$ are each independently selected from: H, OH, or $C_1$-$C_3$ alkoxy;
- $R^2$ is H, OH, $C_1$-$C_3$ alkoxy, or $R^2$ and $R^3$ together form

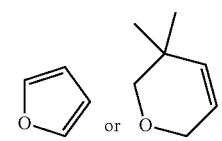

to form a compound of the following structure

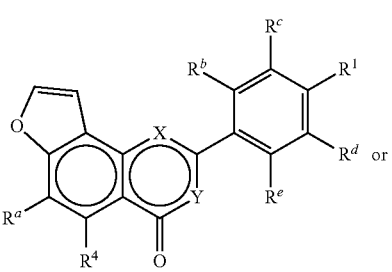

(U')

-continued

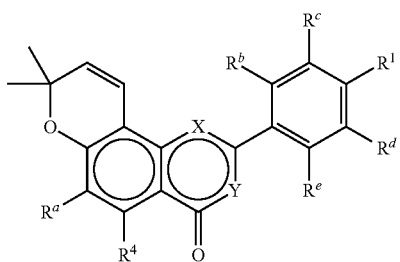
(U″)

$R^3$ is H, OH, $C_1$-$C_3$ alkoxy, or $R^2$ and $R^3$ together form a ring structure as indicated above;

$R^4$ is H, OH, or $C_1$-$C_3$ alkoxy;

X is O or CH; and

Y is O or $CR^5$, where $R^5$ is H or

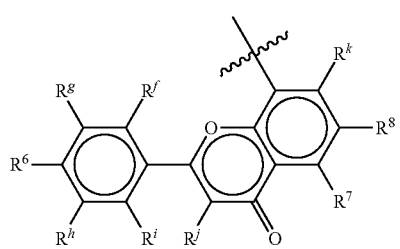

where
  $R^6$, $R^7$, and $R^8$ are each independently selected from: H, OH, or $C_1$-$C_3$ alkoxy;
  $R^f$, $R^g$, $R^h$, $R^i$, $R^j$, and $R^k$ are each independently selected from: H, OH, or $C_1$-$C_3$ alkoxy,
  wherein the at least one compound of formula U is present in the food product in an amount sufficient to enhance a perception of saltiness of the food product.

In embodiments, $R^1$ is H. In embodiments, $R^1$ is —$OCH_3$. In embodiments, $R^2$ is H. In embodiments, $R^3$ is H. In embodiments, both $R^2$ and $R^3$ are H.

In embodiments where $R^2$ and $R^3$ together form

to form a compound of the following structure

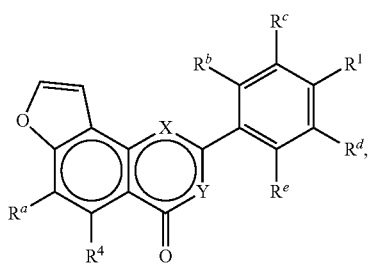
(U′)

$R^4$ is H.

In embodiments where $R^2$ and $R^3$ form

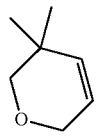

to form a compound of the following structure

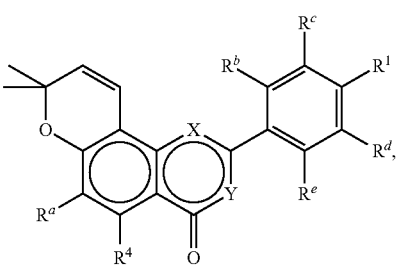
(U″)

$R^4$ is H.

In embodiments, $R^a$, $R^b$, $R^c$, $R^d$, and $R^e$ are independently H or OH.

In embodiments, Y is O. In embodiments, Y is $CR^5$, where $CR^5$ is

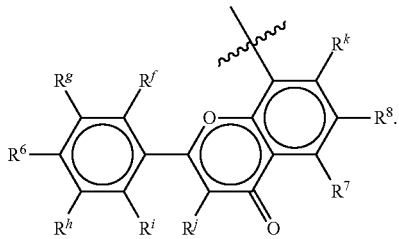

$R^6$ may be OH. $R^7$ may be OH. $R^8$ may be OH. $R^f$, $R^g$, $R^h$, $R^i$, $R^j$, or $R^k$ may independently be H or OH.

In embodiments, a compound according to Formula U is a compound having the following structure:

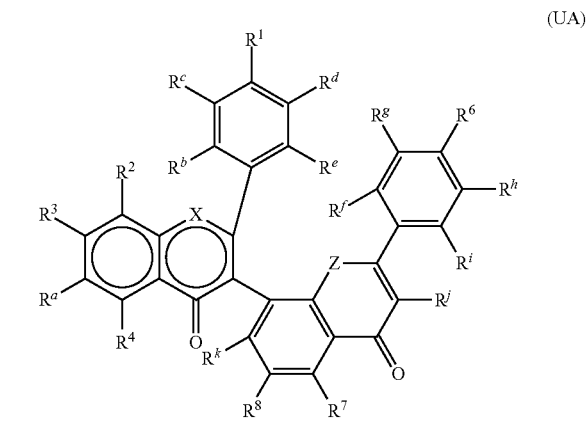
(UA)

where:
- $R^1$, $R^2$, $R^3$, $R^4$, $R^6$, $R^7$, and $R^8$ are each independently H, OH, or $C_1$-$C_3$ alkoxy;
- X and Z are each independently O or CH; and
- $R^a$, $R^b$, $R^c$, $R^d$, $R^e$, $R^f$, $R^g$, $R^h$, $R^i$, $R^j$, and $R^k$ are each independently H, OH, or $C_1$-$C_3$ alkoxy.

In embodiments, a compound of Formula UA is a compound where $R^1$ is OH or $C_1$-$C_3$ alkoxy. In embodiments, $R^2$ is H. In embodiments, $R^3$ is OH or $C_1$-$C_3$ alkoxy. In embodiments, $R^4$ is OH or $C_1$-$C_3$ alkoxy. In embodiments, $R^6$ is OH or $C_1$-$C_3$ alkoxy. In embodiments, $R^7$ is OH or $C_1$-$C_3$ alkoxy. In embodiments, $R^a$, $R^b$, $R^c$, $R^d$, $R^e$, $R^f$, $R^g$, $R^h$, $R^i$, $R^j$, and $R^k$ are each independently H or OH. In embodiments, $R^a$, $R^b$, $R^c$, $R^d$, $R^e$, $R^f$, $R^g$, $R^h$, $R^i$, $R^j$, and $R^k$ are each H. In embodiments, X is O. In embodiments, Z is O.

For purpose of convenience, Table 2A lists the initially selected 99 compounds (with compounds 12 and 20 being the same compound isolated from different sources) and indicates which categories and subcategories, if appropriate, into which each of the compounds falls. Table 2B lists the categories and the compound that fall within each category.

TABLE 2A

Listing of compounds according to category

| Compound | Category | Sub-Categories |
|---|---|---|
| 1 | A | — |
| 2 | | — |
| 3 | | — |
| 4 | | — |
| 5 | | — |
| 6 | | — |
| 7 | | — |
| 8 | A and B | B1, B3 |
| 9 | A | — |
| 10 | B | B1, B3 |
| 11 | | B1, B3 |
| 12 | | B1, B3 |
| 13 | | B1 |
| 14 | | B1' |
| 15 | | B1' |
| 16 | | B2, B4 |
| 17 | | B2, B4 |
| 18 | | B1' |
| 19 | | B1, B3 |
| 20 | | B1, B3 |
| 21 | | B1 |
| 22 | | B1' |
| 23 | C | C'', C''' |
| 24 | | C'', C''', C'''' |
| 25 | | C'', C''' |
| 26 | | C', C''' |
| 27 | | C' |
| 28 | | — |
| 29 | D | — |
| 30 | | — |
| 31 | | — |
| 32 | E | — |
| 33 | | — |
| 34 | F | — |
| 35 | | F', F'' |
| 36 | | F' |
| 37 | Q | Q1, Q1A, Q1B |
| 38 | | Q1, Q1B |
| 39 | F | F' |
| 40 | G | — |
| 41 | H | — |
| 42 | F | — |
| 43 | | — |
| 44 | I | — |
| 45 | | — |
| 46 | | — |
| 47 | | I' |

TABLE 2A-continued

Listing of compounds according to category

| Compound | Category | Sub-Categories |
|---|---|---|
| 48 | J | J1, J1'' |
| 49 | | J1, J1'' |
| 50 | | J1, J1', J2 |
| 51 | | J2 |
| 52 | K | — |
| 53 | L | |
| 54 | | |
| 55 | | L' |
| 56 | M | — |
| 57 | N | — |
| 58 | O | — |
| 59 | P | P5 |
| 60 | | P2, P2' |
| 61 | | P4 |
| 62 | | P1 |
| 63 | | P1 |
| 64 | | P1 |
| 65 | | P1 |
| 66 | | P4 |
| 67 | | P2 |
| 68 | | P2, P3 |
| 69 | | P2 |
| 70 | | P1 |
| 71 | | P1 |
| 72 | | P1 |
| 73 | Q | Q1 |
| 74 | | Q1 |
| 75 | | Q1 |
| 76 | | Q1 |
| 77 | | Q1 |
| 78 | | Q1 |
| 79 | | Q2, Q2A, Q3 |
| 80a | | Q2, Q2B |
| 80b | | Q2, Q2B |
| 81 | R | R1 |
| 82 | | R3 |
| 83 | | R4 |
| 84 | | R4 |
| 85 | | R1 |
| 86 | | R1 |
| 87 | | R3 |
| 88 | | R1 |
| 89 | | R1 |
| 90 | | R2 |
| 91 | S | — |
| 92 | | — |
| 93 | T | — |
| 94 | | T2 |
| 95 | | — |
| 96 | U | U' |
| 97 | | UA |
| 98 | | U'' |
| 99 | | — |

TABLE 2B

Listing of compounds according to category

| Category | Compounds |
|---|---|
| A | 1-9 |
| B | 8, 10-22 |
| C | 23-28 |
| D | 29-31 |
| E | 32, 33 |
| F | 34-36, 39, 42, 43 |
| G | 40 |
| H | 41 |
| I | 44-47 |
| J | 48-51 |
| K | 52 |
| L | 53-55 |
| M | 56 |

TABLE 2B-continued

Listing of compounds according to category

| Category | Compounds |
|---|---|
| N | 57 |
| O | 58 |
| P | 59-72 |
| Q | 37, 38, 73-79, 80a, 80b |
| R | 81-90 |
| S | 91, 92 |
| T | 93-95 |
| U | 96-99 |

As can be seen from the structures of the compounds provided above, many of the compounds have structural similarities. Accordingly, it is believed that structural derivatives of the specific compounds presented above would also have the ability to elicit the perception of saltiness or enhance saltiness. Combinations of the compounds could also serve to elicit the perception of saltiness or enhance saltiness. In addition or alternatively, one or more of the compounds may elicit the perception of other simple or complex flavors, other than or in addition to saltiness.

Many of the structural similarities between the compounds are reflected in the compounds of Formulas A through U, as well as subclasses thereof, presented above. It will be further understood, based on the compounds identified herein, that one or more of gingerols, alkyl substituted phenols, acridone alcaloids, labdanes, primaranes, saponines, neolignans, pentacyclic triterpenes, 2,2'-cycholignans, dibenzylbutane lignans, bicyclic triterpenes, phloroglucines, carylophyllenes, beta-carbolines, limnoids, cumarines, cardanolide steroids, fatty acids, and derivatives may be candidates for taste modulating compounds. It will be further understood that other structural similarities of the compounds presented herein may be exploited to develop taste modulating compounds.

By way of example, many of the compounds presented herein have unsaturated carbon chains of at least 11 carbons with attached hydroxyl groups and may be amphiphilic, with hydrophobic head portions and hydrophobic tails. Other compounds having, for example $C_5$-$C_{20}$ alkane or alkene tails may elicit or enhance saltiness. Similarly, other compounds with differently substituted carboxyl or hydroxyl groups may elicit or enhance the perception of saltiness.

Many compounds presented herein have large numbers of cyclic groups having a central portion that may be hydrophobic and peripheral regions that may be hydrophilic. More specifically, some compounds include pentacyclohexane with hydroxyl groups, attached sugars and at least one ester linkage. Substitution of the central hydrophobic ring structure with, for example, $C_5$-$C_{20}$ hydrophobic alkyl or alkene groups, may result in compounds that may elicit or enhance saltiness. Alternative substitution of hydroxyl groups at the peripheral regions or substitution with carboxylic groups may also result in compounds that elicit or enhance the perception of saltiness.

Many of the compounds presented above have one or more aromatic ring structures, with some being substituted and some being unsubstituted. Similar substitution or unsubstitution of such compounds may result in compounds that enhance or elicit saltiness.

A plurality of compounds presented herein include saturated carbon chains of at least 9 carbons and one oxygen containing group such as hydroxyl, carbonyl, carboxyl, or ester. Other compounds having unsaturated carbon chains of, for example, 5 to 15 carbons and an oxygen group may have similar effects with regard to salty taste.

Many compounds presented herein have at least one phenol group with an ether group and a carbon side chain comprising at least seven carbons. Other similar compounds may have similar effects with regard to salty taste.

A number of compounds presented herein have a benzyl heterocyclic furan with various attached groups containing unsaturated carbon linkages and at least one carbonyl group. Other similar compounds may have similar activity with regard to salty taste.

A plurality of compounds presented above contain a cyclopentaphenthrene group. Other compounds having a cyclopentaphenthrene and similar substituents may have similar activity with regard to salty taste.

A number of the compounds presented herein include a benzopyranone group. Other compounds having a benzopyranone and similar substituents may have similar activity with regard to salty taste.

Some compounds presented above have unsubstituted carbon chain with a minimum of 13 carbons and at least one carbonyl group. Other similar compounds may have similar activity with regard to salty taste.

A plurality of compounds presented herein have a methoxymethyltetrahydrobenzo-cyclooctabenzo-dioxole or -annulene group. Other compounds having such groups may have similar activity with regard to salty taste.

A number of compounds presented above have tetracyclohexane with an attached ester or carbonyl moiety. Other similar compounds may have similar activity with regard to salty taste.

Many of the compounds can be classified as lactones, lignol-like compounds, oxylipins, polyisoprene glycosides, triterpenoid glycosides, alkylamides, or gamma pyrenes. Other similar compounds may also elicit or enhance salty taste perception.

It will be understood that derivations of the compounds discussed above are provided for purposes of example and that other derivatives or derivations may be made based on structural similarities between the various compounds, resulting in compounds that elicit or enhance perception of saltiness.

Evaluation of Salty Taste or Salty Taste Enhancement

Many of the identified compounds were tested by tasters and rated for perception of saltiness in combination with reduced amounts of sodium chloride and were assigned a rating (DAP score) for saltiness. Briefly, each individual tested compound was placed in water and in sodium solution to test saltiness and saltiness enhancement potential. Tests in water were executed in a compound concentration of 10 ppm. Tests in sodium solution were executed in compound concentrations of 0.1, 1 and 10 ppm. Two control sodium solutions with known organoleptic salt intensities were provided as references for each test. The test for individual compounds was also conducted using simple broth instead of sodium solution. A number of compound combinations identified from the Na-solution DAP test were used for the broth DAP test. Tests were executed with a trained panel of 9-12 assessors. For Na-solution DAP tests, a DAP score of greater than 3.1 indicates saltiness or salt enhancement. The DAP score can be correlated with a sodium reduction potential by subtracting 3.1 from the DAP score. For example, a DAP score of 4.0 would result in a 9% sodium reduction potential ((4.0–3.1)*10=9%), which means that 9% less sodium may be present in a food product having the salty compound relative to a substantially similar food product that does not have the salty compound while producing a similar saltiness. For broth DAP tests, a DAP score of greater than 7.6 indicates saltiness or salt enhancement. The DAP score can be correlated with a sodium reduction potential by subtracting 7.6 from the DAP score. For example, a DAP score of 8.5 would result in a 9% sodium reduction potential ((8.5−7.6)*10=9%), which means that 9% less sodium may be present in a food product having the salty compound relative to a substantially similar food product that does not have the salty compound while producing a similar saltiness.

A summary of the compounds, the channels for which in vitro thresholds were identified, and the DAP scores are provided below in Table 3.

TABLE 3

Activity of identified compounds in Na-Solution and in simple broth

| Compound | DAP in Na-Sol. | DAP in Broth |
|---|---|---|
| 1 | 3.6 | 7.8 |
| 2 | 3.5 | 7.8 |
| 3 | 4.1 | 8.8 |
| 4 | 3.5 | N.T. |
| 5 | 3.6 | N.T. |
| 6 | 3.8 | N.T. |
| 7 | 3.7 | N.T. |
| 8 | 4 | N.T. |
| 9 | 3.8 | N.T. |
| 10 | 3.9 | 7.9 |
| 11 | 2.6 | 8.1 |
| 12 | 4 | 7.6 |
| 13 | 3.8 | 7.9 |
| 14 | 3.6 | N.T. |
| 15 | 3.5 | 8.1 |
| 16 | 3.3 | 8.0 |
| 17 | 3.6 | 8.2 |
| 18 | 3.8 | 8.1 |
| 19 | N.T. | N.T. |
| 20 | 4 | N.T. |
| 21 | 4 | N.T. |
| 22 | N.T. | N.T. |
| 23 | 2.9 | 8.3 |
| 24 | N.T. | N.T. |
| 25 | 3.9 | N.T. |
| 26 | 3.4 | N.T. |
| 27 | 3.4 | N.T. |
| 28 | 3.6 | N.T. |
| 29 | 3.5 | 8.0 |
| 30 | 3.1 | N.T. |
| 31 | 3.2 | N.T. |
| 32 | 3.5 | 8.1 |
| 33 | 3.4 | 7.7 |
| 34 | 3.9 | 7.7 |
| 35 | 3.7 | 8.1 |
| 36 | 3.9 | 8.2 |
| 37 | 3.7 | 8.1 |
| 38 | 3.9 | 8.1 |
| 39 | N.T. | N.T. |
| 40 | 3.5 | 7.8 |
| 41 | 3.9 | 7.5 |
| 42 | 3.1 | 8.1 |
| 43 | 3.7 | 8.0 |
| 44 | 3.8 | 8.6 |
| 45 | 3.5 | 8.2 |
| 46 | 3.6 | 7.8 |
| 47 | N.T. | N.T. |
| 48 | 3.7 | 7.8 |
| 49 | 3.6 | 8.2 |
| 50 | 4 | N.T. |
| 51 | N.T. | N.T. |
| 52 | 3.6 | N.T. |
| 53 | 3.7 | 8.5 |
| 54 | 3.4 | 8.1 |
| 55 | N.T. | N.T. |
| 56 | 4 | 7.7 |
| 57 | 3.1 | N.T. |
| 58 | 3.3 | 8.0 |
| 59 | 3.3 | 7.9 |
| 60 | 3.8 | 8.1 |
| 61 | 3.6 | N.T. |
| 62 | 3.9 | 8.0 |
| 63 | 3.5 | 8.0 |
| 64 | 3.7 | 7.8 |
| 65 | 3.3 | 7.9 |
| 66 | 3.2 | 7.8 |
| 67 | N.T. | N.T. |
| 68 | N.T. | N.T. |
| 69 | N.T. | N.T. |
| 70 | N.T. | N.T. |
| 71 | N.T. | N.T. |
| 72 | N.T. | N.T. |
| 73 | 3.5 | 8.0 |
| 74 | 3.2 | 7.7 |
| 75 | 3.6 | N.T. |
| 76 | 3.2 | 8.0 |
| 77 | 3.4 | 8.1 |
| 78 | N.T. | N.T. |
| 79 | N.T. | N.T. |
| 80a | 3.9 | N.T. |
| 80b | 3.9 | N.T. |
| 81 | 3.2 | 7.8 |
| 82 | 3.8 | 8.3 |
| 83 | 4.2 | 8.1 |
| 84 | 3.8 | 8.1 |
| 85 | 2.9 | N.T. |
| 86 | 3.9 | 8.0 |
| 87 | 3.9 | 8.0 |
| 88 | 3.2 | 8.0 |
| 89 | 3.7 | 7.6 |
| 90 | N.T. | N.T. |
| 91 | 3.7 | N.T. |
| 92 | 4 | N.T. |
| 93 | N.T. | N.T. |
| 94 | 4.2 | N.T. |
| 95 | N.T. | N.T. |
| 96 | N.T. | N.T. |
| 97 | N.T. | N.T. |
| 98 | N.T. | N.T. |
| 99 | 4.1 | N.T. |

In Table 3 above, "N.T.," with regard to a DAP score, means the compound was not taste tested.

The data in Table 3 above reflect the best DAP score for the tested concentrations of 0.1 parts per million (ppm), 1 ppm and 10 ppm. The highest concentrations did not always result in the highest DAP scores.

Compounds in water with no sodium were also tested. The compounds in water with no sodium elicited no appreciably discernable salty taste, even at the 10 ppm concentration (data not shown).

DAP score testing results for various pairs of compounds are presented in FIG. 1 (sodium solution) and FIG. 2 (broth). Certain combinations were tested twice. For these combinations, two DAP scores are shown in the tables presented in FIGS. 1-2. As shown in the results presented in FIGS. 1-2, certain combinations of compounds can enhance the perception of saltiness. Some combinations resulted in DAP scores as high as 4.5 in some tests. See, for example, the combination of compound 83 and 13 in FIG. 1 (sodium solution) and the combination of compound 12 and 18 in FIG. 2 (broth). Such DAP scores may result in a sodium reduction potential of about 14%. The combinations tested in FIGS. 1-2 are representative of the combinations that may be used in a food product to enhance the perception of saltiness or reduce sodium content. It will be understood that any other suitable combination of compounds may be employed.

Additional testing of combinations of pairs of compounds was performed in sodium solution. The DAP scores from this additional testing is shown below in Table 4.

TABLE 4

Activity of a combination of bioactive compounds in sodium solution

|  | Compound 66: (0.1 ppm) | Compound 29: (10 ppm) | Compound 16: (1 ppm) | Compound 33: (1 ppm) | Compound 73: (1 ppm) |
|---|---|---|---|---|---|
| Compound 83: (1 ppm) | 3.7 | 4.0 | 3.8 | 3.6 | 4.0 |
| Compound 10: (1 ppm) | 3.3 | 3.7 | 3.8 | 2.9 | 3.6 |
| Compound 45: (10 ppm) | 3.2 | 3.3 | 3.8 | 3.7 | 4.2 |

In addition, more than two bioactive, taste modulating or salty taste modulating compounds described herein may be included in a food product. By way of example, Table 5 below shows DAP scores obtained from testing sodium solutions and chicken broth containing a combination of compounds 12, 13 and 83. As shown in Table 5, such a combination resulted in a DAP score of 5.3 when tested in a sodium solution. Accordingly, such a combination may result in a sodium reduction potential of about 22%. Of course, other suitable combinations of three or more compounds may be used or included in a food product to enhance the perception of saltiness or to reduce sodium content.

TABLE 5

Activity of a combination of bioactive compounds in sodium solution and broth

| Compound | Conc. | In Na Solution | In Broth |
|---|---|---|---|
| 12 | 1 ppm | 5.3 | 8.1 |
| 13 | 10 ppm | | |
| 83 | 1 ppm | | |

Some illustrative examples of combinations of compounds that may produce desired or beneficial effect, for example when incorporated in a food product, include combinations that include at least one compound selected from the group consisting of compounds 3, 10, 12, 13, 16, 18, 29, 33, 36, 37, 41, 43, 44, 45, 48, 53, 56, 62, 66, 73, 82, 83, and 84. Another illustrative example is a combination that includes at least one compound selected from the group consisting of compounds 10, 12, 13, 18, 36, 45, 56, 82, and 83. Yet another illustrative example is a combination that includes compounds 12, 13 and 83. Of course, any other suitable or desirable combination may be used.

DAP scores for combinations of three different compounds in broth are shown in Table 6 below.

TABLE 6

Activity of a combination of bioactive compounds in broth

| Compound (concentration) | DAP score |
|---|---|
| 3 (0.1 ppm) | 7.8 |
| 36 (0.1 ppm) | |
| 44 (10 ppm) | |
| 3 (0.1 ppm) | 7.7 |
| 36 (0.1 ppm) | |
| 53 (1 ppm) | |
| 3 (0.1 ppm) | 7.9 |
| 36 (0.1 ppm) | |
| 18 (10 ppm) | |
| 13 (10 ppm) | 8.1 |
| 84 (1 ppm) | |
| 44 (10 ppm) | |
| 13 (10 ppm) | 7.9 |
| 84 (1 ppm) | |
| 53 (1 ppm) | |
| 13 (10 ppm) | 8.0 |
| 84 (1 ppm) | |
| 3 (0.1 ppm) | |
| 18 (10 ppm) | 8.1 |
| 12 (1 ppm) | |
| 44 (10 ppm) | |
| 18 (10 ppm) | 8.2 |
| 12 (1 ppm) | |
| 53 (1 ppm) | |
| 18 (10 ppm) | 8.3 |
| 12 (1 ppm) | |
| 3 (0.1 ppm) | |

Sourcing

Natural sources of the mentioned taste modulating or salty taste modulating compounds can be extracted by a variety of methods such as, but not exclusive to, water, solvent extractions (ethanol/water combinations), or supercritical carbon dioxide or other volatilization methods. These concentrated extracts or isolates could be stabilized physically by encapsulation, for example, or chemical reaction to non-reactive compounds such as simple sugars or small chain fatty acids. Compounds may be altered for their solubility in aqueous solutions by hybridization to larger sized molecules and additionally processed or reacted to create an impacting ingredient in either a dry or aqueous form.

In embodiments, a composition comprises a bioactive, taste modulating or salty taste modulating compound described herein. The composition may be included in a food product. In embodiments, the composition comprises one or more natural extracts. In another embodiment, the extract is selected from a plant or microbial (e.g., fungi or bacterial) source. Examples of suitable natural extracts include extracts derived from *Aesculus hippocastaneum; Alchemilla xanthochlora; Angelica archangelica; Apocynum cannabinum; Azadirachta indica; Actinomycete* bacteria (Strain code: 01702axxx000002); *Capsicum annuum; Cimicifuga racemosa; Commiphora mukul; Embelia ribes; Evodia rutaecarpa; Ferula assa-foetida*; Fungi (Strain code: 02295fxxx000001; Strain code: 01469fxxx000005); *Gleditschia australis; Kaempferia galanga; Lavandula officinalis; Marrubium vulgare; Mesua ferrea; Nephelium cuspidatum; Orthosiphon stamineus; Persea gratissima; Petroselinum stativum; Piper longum; Pithecoctenium echinatum; Podophyllum peltatum; Psidium guajava; Ricinus communis; Salvia miltiorrhiza; Schisandea chinensis; Teclea trichocarpa; Vitex agnus; Xysmalobium undulatum; Yucca gloriosa; Zanthoxylum piperitum; Zingiber officinalis* and others. The composition may be in a dry or liquid form. The liquid composition may be a solution, suspension, colloidal suspension, microencapsulated suspension, emulsion, or the like, or combinations thereof. The dry composition may be a microencapsulation solid, agglomeration, or the like or combinations thereof.

In embodiments, a bioactive, taste modulating or salty taste modulating compound described herein is included in a composition comprising a carrier. The composition comprising the carrier may be incorporated into a food product. Any suitable carrier may be used. Examples of suitable carriers include propylene glycol, ethanol, water, or oil. In embodiments, the carrier is a starch, such as a starch comprising carbohydrate, a maltodextrin, a cyclodextrin or another dextrin, or a liposome. In embodiments, the carrier is an encapsulant or the carrier may comprise an embedded bioactive, taste modulating or salty taste modulating compound.

Definitions

All scientific and technical terms used herein have meanings commonly used in the art unless otherwise specified. The definitions provided herein are to facilitate understanding of certain terms used frequently herein and are not meant to limit the scope of the present disclosure.

As used in this specification and the appended claims, the singular forms "a", "an", and "the" encompass embodiments having plural referents, unless the content clearly dictates otherwise.

As used in this specification and the appended claims, the term "or" is generally employed in its sense including "and/or" unless the content clearly dictates otherwise. The term "and/or" means one or all of the listed elements or a combination of any two or more of the listed elements.

As used herein, "have", "having", "include", "including", "comprise", "comprising" or the like are used in their open ended sense, and generally mean "including, but not limited to". It will be understood that "consisting essentially of", "consisting of", and the like are subsumed in "comprising" and the like. As used herein, "consisting essentially of," as it relates to an composition, product, method or the like, means that the components of the composition, product, method or the like are limited to the enumerated components and any other components that do not materially affect the basic and novel characteristic(s) of the composition, product, method or the like.

The words "preferred" and "preferably" refer to embodiments of the invention that may afford certain benefits, under certain circumstances. However, other embodiments may also be preferred, under the same or other circumstances. Furthermore, the recitation of one or more preferred embodiments does not imply that other embodiments are not useful, and is not intended to exclude other embodiments from the scope of the disclosure, including the claims.

Also herein, the recitations of numerical ranges by endpoints include all numbers subsumed within that range (e.g., 1 to 5 includes 1, 1.5, 2, 2.75, 3, 3.80, 4, 5, etc. or 10 or less includes 10, 9.4, 7.6, 5, 4.3, 2.9, 1.62, 0.3, etc.). Where a range of values is "up to" a particular value, that value is included within the range.

As used herein, a "bioactive compound" is a compound that alters the flow of ions through one or more channels associated with the perception of salty taste or another taste associated with consumption of sodium chloride.

As used herein, a "taste modulating compound" is a compound that modifies the taste of a food product. By way of example, a taste modulating compound may modify the taste of a food product due to a particular taste imparted by the taste modulating compound, due to a modification of the perceived taste of the food product, or a component thereof, or the like. In embodiments, a taste modulating compound is a salty taste modulating compound.

As used herein a "salty taste modulating compound" is a compound that, when ingested, elicits or enhances a perception of salty taste alone or in the presence of a salt, such as sodium chloride.

As used herein, a composition that is "substantially similar" to another composition contains substantially the same concentration of components (e.g., within about 5%) except for the specifically enumerated components that make the compositions different. For example, a composition that includes a salty compound may be substantially similar to a composition that does not have the salty compound, if the components of the compositions, other than the salt and the salty compound, are present in a substantially similar concentration.

As used herein, a compound "derived" from a natural product is a compound that exists in a natural product, whose identity is verified. The compound derived from the natural product may be extracted from, for example, a plant or microbial source as opposed to being produced synthetically. Extraction or isolation of the naturally-derived compound may be facilitated by simple chemical reactions such as acidification, basification, ion exchange, hydrolysis, and salt formation as well as microbial fermentation, and the like. In embodiments, a taste modulating or salty taste modulating compound is derived from natural sources such as natural plant, fungi, and bacterial sources. Examples of such natural sources include, but are not limited to *Aesculus hippocastaneum; Alchemilla xanthochlora; Angelica archangelica; Apocynum cannabinum; Azadirachta indica; Actinomycete* bacteria (Strain code: 01702axxx000002); *Capsicum annuum; Cimicifuga racemosa; Commiphora mukul; Embelia ribes; Evodia rutaecarpa; Ferula assafoetida*; Fungi (Strain code: 02295fxxx000001; Strain code: 01469fxxx000005); *Gleditschia australis; Kaempferia galanga; Lavandula officinalis; Marrubium vulgare; Mesua ferrea; Nephelium cuspidatum; Orthosiphon stamineus; Persea gratissima; Petroselinum stativum; Piper longum; Pithecoctenium echinatum; Podophyllum peltatum; Psidium guajava; Ricinus communis; Salvia miltiorrhiza; Schisandea chinensis; Teclea trichocarpa; Vitex agnus; Xysmalobium undulatum; Yucca gloriosa; Zanthoxylum piperitum; Zingiber officinalis*; and others. In embodiments, one or more compounds derived from *Persea gratissima* are combined with one or more compounds derived from *Kaempferia galanga* or one or more compounds derived from *Capsicum annuum*; and others.

As used herein, an "isolated" or "purified" compound is a compound that is substantially separated from other components of the source of the compound. For example, if the source of the compound is a natural product, an isolated or purified compound may be a compound that is separated from its naturally occurring environment. If the compound is synthesized, the compound may be separated from unreacted reagents, reaction byproducts, solvents, or the like.

As used herein a "synthetic compound" is a compound that is synthesized via chemical reaction in vitro. A compound that is "synthesized" is a synthetic compound. A synthesized compound may be identical to a compound derived from a natural product.

For the purposes of this disclosure, reference to a compound includes reference to salts of the compound, hydrates of the compound, polymorphs of the compound, isomers of the compound (including constitutional isomers and stereoisomers such as enantiomers and diasteriomers), and the like.

For the purposes of the present disclosure, it will be understood that a ring structure having a structure of

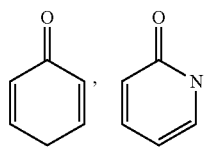

or the like, will be considered to be aromatic.

It will be understood that compounds disclosed herein may be glycosylated or may be substituted with one or more saccharides. In various embodiments, specific or generic compounds substituted with one or more saccharides are disclosed. However, it will be understood that other saccharide substitutions are possible and are contemplated.

As used herein, a "saccharide" is a monosaccharide or an oligosaccharide. A monosaccharide may be a diose, a triose, a tetrose, a pentose, a hexose, a heptose, and so one. Monosaccharides include aldoses and ketoses. Examples of monosaccharides include glyceraldehyde, dihydroxyacetone, erythrose, threose, erythrulose, arabinose, lyxose, ribose, xylose, ribulose, xylulose, allose, altrose, galactose, glucose, gulose, idose, nannose, talose, fructose, psicose, sorbose, tagatose, mannoheptulose, sedoheptulose, 2-keto-3-deoxy-manno-actonate, and sialose. Monosaccharides may be acyclic or cyclic. Cyclic isomers include furanoses and pyranoses.

As used herein, "monosaccharide" includes deoxygenated variants of monosaccharides that are deoxygenated at one or more positions. As used herein, "monosaccharide" includes monosaccharides having carbon atoms of a monosaccharide chain or ring that are substituted with one or more of the following: H(H), $CH_2OH$, OH, COOH, $OCOR^{100}$, $CH_3$, $OCH_3$, $C(CH_3)_2OH$, and

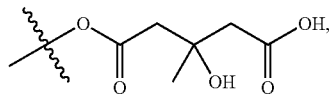

where $R^{100}$ is selected from the group consisting of

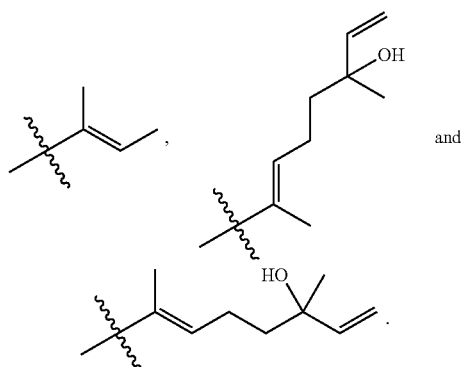

An "oligosaccharide" is a chain of two or more monosaccharides where each monosaccharide is bound by a glycosidic bond.

As used herein, "saccharidyl" means a monosaccharide or oligosaccharide substituent. The monosaccharide or oligosaccharide substituent may be a terminal substituent or an internal substituent. That is, a saccharidyl group may be bound to one or more parent compounds (e.g., parent structure 1-saccharidyl or parent structure 1-saccharidyl-parent structure 2).

For purposes of example, a generic structure representing a monosaccharide is presented below:

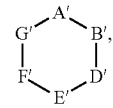

where one of A', B', D', E', F' and G' is O and where each of the rest of A', B', D', E', F' and G' is independently selected from the group consisting of $CH_2$, CHOH, $CHCH_2OH$, $CHCH_3$, CHCOOH, $CHOCOR^{101}$, $CHOCH_3$, $CHC(CH_3)_2OH$, and

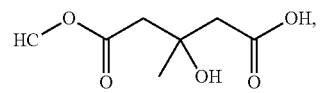

where $R^{101}$ is selected from the group consisting of

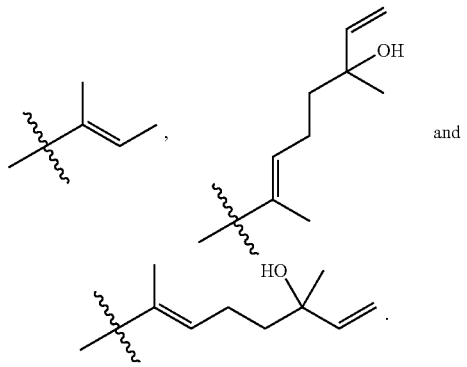

For purposes of Example, a generic structure representing an embodiment of an oligosaccharide that is a disaccharide is presented below:

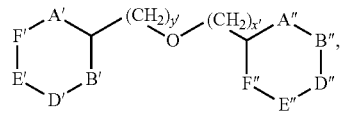

(i) where (a) one of A', B', D', E', and F' is O, (b) one of A", B", D", E", and F" is O, and (c) each of the rest of A', B', D', E', F', A", B", D", E", and F" is independently selected from the group consisting of $CH_2$, CHOH, $CHCH_2OH$, $CHCH_3$, CHCOOH, $CHOCOR^{102}$, $CHOCH_3$, $CHC(CH_3)_2OH$, and

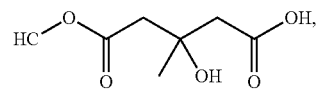

where $R^{102}$ is selected from the group consisting of

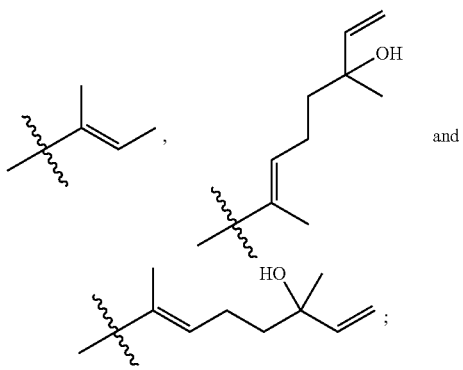

and (ii) where x' and y' are independently selected from zero or 1. Typically, the oxygen heteroatom of a monosaccharide ring will be in an ortho or meta position relative to a saccharide substitution.

For purposes of example, a generic structure representing an embodiment of an oligosaccharide that is a trisaccharide is presented below:

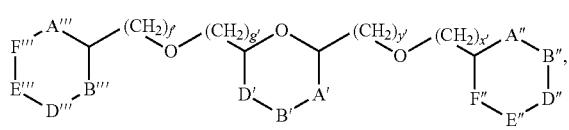

(i) where (a) one of A''', B''', D''', E''', and F'''' is O, (b) one of A'', B'', D'', E'', and F''' is O, and (c) each of the rest of A', B', D', A'', B'', D'', E'', F'', A''', B''', D''', E''', and F'''' is independently selected from the group consisting of $CH_2$, CHOH, $CHCH_2OH$, $CHCH_3$, CHCOOH, $CHOCOR^{103}$, $CHOCH_3$, $CHC(CH_3)_2OH$, and

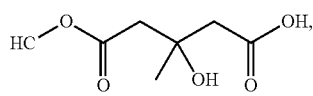

where $R^{103}$ is selected from the group consisting of

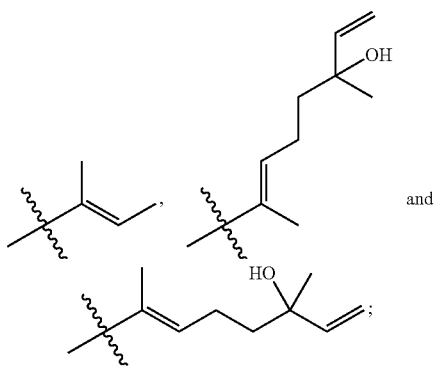

and (ii) where f', g', x' and y' are independently selected from zero or 1. In the structure depicted above, the oxygen heteroatom of a monosaccharide ring is in an ortho position relative to the other saccharide substitutions. Of course, trisaccharides (or tetra-, penta-, etc-saccharides) where the where substitutions of the other saccharides are ortho/meta, ortho/para, meta/para or meta/meta relative to the oxygen of the central ring are also possible. Typically, trisaccharides (or tetra-, penta-, etc-saccharides) will be ortho/ortho, meta/meta, or ortho/meta regarding the saccharide substitutions relative to the oxygen heteroatom of a central ring.

For purposes of example, a generic structure representing an embodiment of an oligosaccharide that is a tetrasaccharide is presented below:

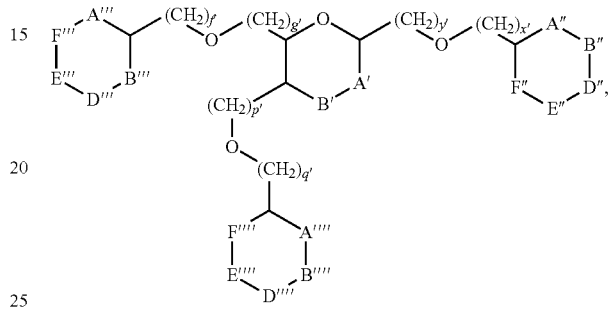

(i) where (a) one of A''', B''', D''', E''', and F'''' is O, (b) one of A''', B''', D''', E''', and F''' is O, (c) one of A'', B'', D'', E'', and F'' is O, and (d) each of the rest of A', B', A'', B'', D'', E'', F'', A''', B''', D''', E''', F''', A'''', B'''', D'''', E'''', and F'''' is independently selected from the group consisting of $CH_2$, CHOH, $CHCH_2OH$, $CHCH_3$, CHCOOH, $CHOCOR^{104}$, $CHOCH_3$, $CHC(CH_3)_2OH$, and

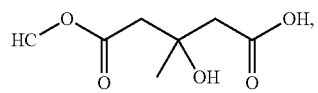

where $R^{104}$ is selected from the group consisting of

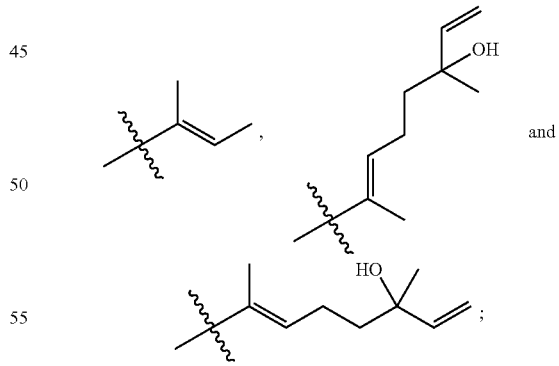

and (ii) where f', g', p', q', x' and y' are independently selected from zero or 1. In the structure depicted above, the oxygen heteroatom of a monosaccharide ring is in an ortho position relative to the other saccharide substitutions. The example of a tetrasaccharide depicted below is a branched chain saccharide. However, tetrasaccharides (or penta-, hexa, etc-saccharides) may have linear chains.

It will be understood that the structures of the saccharides presented above are examples of saccharides and that other saccharides are contemplated herein. Any compound described herein may be optionally saccharidyl substituted at any suitable position. Examples of some saccharidyl substituents are presented herein below (e.g., with regard to compounds 34-39, 41, 48, 51, 76, 77, and 90-92). However, it will be understood that similar compounds with different saccharide substitutions are contemplated herein.

INCORPORATION BY REFERENCE

Any patent or non-patent literature cited herein is hereby incorporated herein by reference in its entirety to the extent that it does not conflict with the disclosure presented herein.

In the detailed description above several specific embodiments of compounds, compositions, products and methods are disclosed. It is to be understood that other embodiments are contemplated and may be made without departing from the scope or spirit of the present disclosure. The detailed description, therefore, is not to be taken in a limiting sense.

The invention claimed is:

1. A food product comprising: at least one ingredient; at least one salt that imparts a salty taste; and at least one compound according to Formula R4:

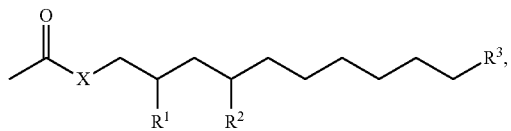

(R4)

wherein:

X is O;

$R^1$ is OH;

$R^2$ is $OCOR_5$:

$R^3$ is $C_1$ to $C_{10}$ unsaturated alkyl; and $R^5$ is $CH_3$.

2. The food product of claim 1, wherein the compound according to Formula R4

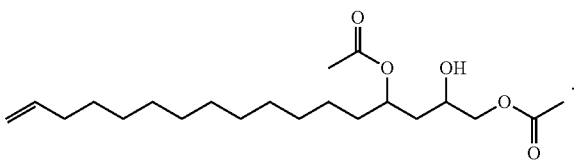

(83)

3. A food product according to claim 1, wherein the at least one compound of Formula R4 is present in the food product.

4. A food product according to claim 1, wherein the food product has a water content of at least about 30% by weight.

5. A food product according to claim 1, wherein the food product is selected from the group consisting of a soup, a seasoning, and a ready-to-eat breakfast cereal.

* * * * *